United States Patent
Shapiro

(10) Patent No.: US 9,863,139 B2
(45) Date of Patent: Jan. 9, 2018

(54) BUILDING MODULE, A METHOD FOR MAKING SAME, AND A METHOD FOR USING SAME TO CONSTRUCT A BUILDING

(76) Inventor: Darek Shapiro, Carbondale, CO (US)

( * ) Notice: Subject to any disclaimer, the term of this patent is extended or adjusted under 35 U.S.C. 154(b) by 0 days.

(21) Appl. No.: 13/564,578

(22) Filed: Aug. 1, 2012

(65) Prior Publication Data
US 2013/0167456 A1 Jul. 4, 2013

Related U.S. Application Data

(60) Provisional application No. 61/514,005, filed on Aug. 1, 2011, provisional application No. 61/540,898, filed on Sep. 29, 2011.

(51) Int. Cl.
| | |
|---|---|
| *E04B 1/61* | (2006.01) |
| *E04B 1/00* | (2006.01) |
| *E04F 13/08* | (2006.01) |
| *E04B 1/76* | (2006.01) |
| *E04D 7/00* | (2006.01) |

(Continued)

(52) U.S. Cl.
CPC .............. *E04B 1/61* (2013.01); *E04B 1/0007* (2013.01); *E04B 1/7069* (2013.01); *E04B 1/7637* (2013.01); *E04D 7/00* (2013.01); *E04D 12/006* (2013.01); *E04D 13/1618* (2013.01); *E04F 13/0837* (2013.01); *E04F 21/1877* (2013.01); *E04G 21/14* (2013.01); *F16M 13/02* (2013.01);

(Continued)

(58) Field of Classification Search
USPC ......... 52/366, 379, 420, 423, 433, 434, 435, 52/568, 634, 636, 649.6, 649.7, 649.8, 52/650.1, 563.1, 653.2, 831, 835, 842, 52/850
See application file for complete search history.

(56) References Cited

U.S. PATENT DOCUMENTS

| | | | | |
|---|---|---|---|---|
| 2,087,941 A | * | 7/1937 | Weaver ........................... | 52/710 |
| 2,780,936 A | * | 2/1957 | Hillberg .......................... | 52/710 |
| 3,005,292 A | * | 10/1961 | Reiland ............................. | 52/99 |
| 3,243,930 A | * | 4/1966 | Slowinski ....................... | 52/364 |
| 3,382,639 A | * | 5/1968 | Smith et al. .................... | 52/844 |
| 4,052,831 A | | 10/1977 | Roberts et al. | |

(Continued)

OTHER PUBLICATIONS

International Search Report and Written Opinion dated Oct. 25, 2012 from corresponding PCT/US2012/049208, 17 pages.

(Continued)

*Primary Examiner* — Jessica Laux
(74) *Attorney, Agent, or Firm* — Ohlandt, Greeley, Ruggiero & Perle. L.L.P.

(57) ABSTRACT

A building module. The building module has a rigid inner construction panel defining a planar surface thereon; one or more rigid brackets each affixed by one or more mechanical fasteners to the planar surface of the construction panel; a rigid, closed-cell, spray foam or an adhesive matrix contiguous to and substantially covering the planar surface of the construction panel and contacting and embedding at least a major portion of the one or more brackets. Each of the one or more brackets bears a planar surface facing substantially away from the planar surface of the construction panel. The surface area of the planar surface of each of the one or more brackets is substantially smaller than the surface area of the planar surface of the construction panel to which it is affixed. There are also other embodiments of building modules. There are also other embodiments of brackets useful in building modules. There are also other embodiments for making building modules.

10 Claims, 34 Drawing Sheets

(51) Int. Cl.
*E04D 12/00* (2006.01)
*E04D 13/16* (2006.01)
*E04B 1/70* (2006.01)
*E04F 21/18* (2006.01)
*E04G 21/14* (2006.01)
*F16M 13/02* (2006.01)

(52) U.S. Cl.
CPC ....... *E04B 1/7675* (2013.01); *Y10T 29/49947* (2015.01)

(56) References Cited

U.S. PATENT DOCUMENTS

| | | | | |
|---|---|---|---|---|
| 4,156,999 | A * | 6/1979 | Avery | E04G 11/48 52/376 |
| 4,159,604 | A * | 7/1979 | Burrell | E04G 11/50 52/376 |
| 4,223,505 | A * | 9/1980 | Krebel et al. | 52/509 |
| 4,394,807 | A * | 7/1983 | Carroll | E04B 7/00 52/332 |
| 4,918,899 | A * | 4/1990 | Karytinos | 52/690 |
| 5,440,854 | A * | 8/1995 | Hohmann | 52/489.1 |
| 5,634,300 | A * | 6/1997 | Huebner | E04B 2/7407 52/281 |
| 5,904,022 | A * | 5/1999 | Zadok | 52/650.1 |
| 5,930,966 | A * | 8/1999 | Wood | E04G 11/10 249/189 |
| 6,668,495 | B1 * | 12/2003 | Prince | 52/63 |
| 6,959,520 | B2 | 11/2005 | Hartman | |
| 7,191,570 | B1 | 3/2007 | Eaton | |
| 7,654,057 | B2 * | 2/2010 | Zambelli et al. | 52/710 |
| 7,690,161 | B2 * | 4/2010 | McPherson | B62D 27/065 52/208 |
| 7,877,962 | B2 * | 2/2011 | Teffenhart, Jr. | 52/844 |
| 8,019,256 | B2 | 9/2011 | Lange | |
| 8,074,416 | B2 * | 12/2011 | Andrews | 52/241 |
| 8,640,415 | B2 * | 2/2014 | Pilz et al. | 52/481.1 |
| 8,726,606 | B2 * | 5/2014 | Strickland | E04C 3/07 52/636 |
| 2007/0227086 | A1 | 10/2007 | Beavers et al. | |
| 2008/0141612 | A1 * | 6/2008 | Schierding | 52/634 |
| 2010/0236158 | A1 | 9/2010 | Carbonaro | |
| 2010/0307086 | A1 | 12/2010 | Hibbs | |

OTHER PUBLICATIONS

International Preliminary Report on Patentability from the International Bureau from corresponding PCT/US2012/049208 dated Feb. 13, 2014 (11 Pages).

* cited by examiner

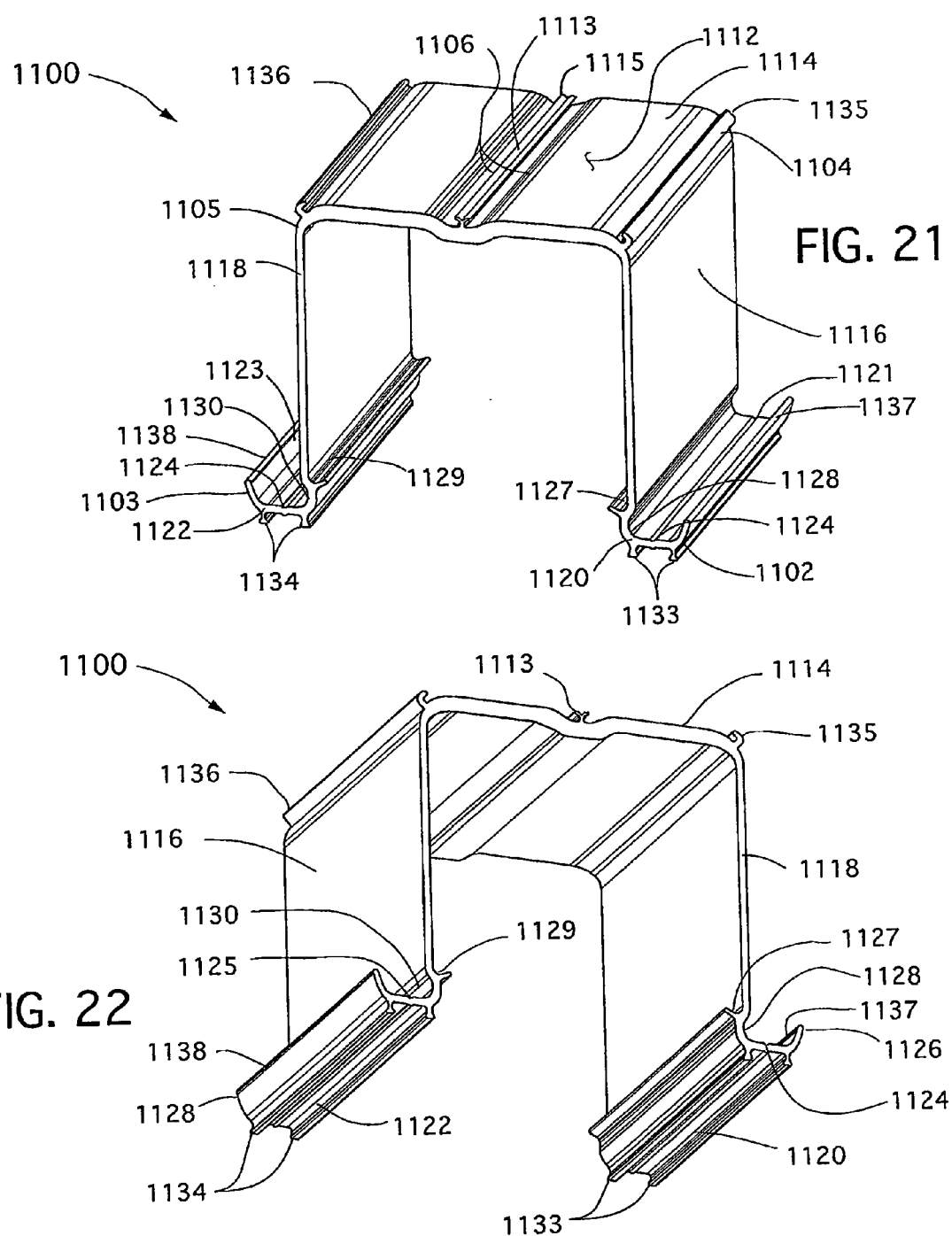

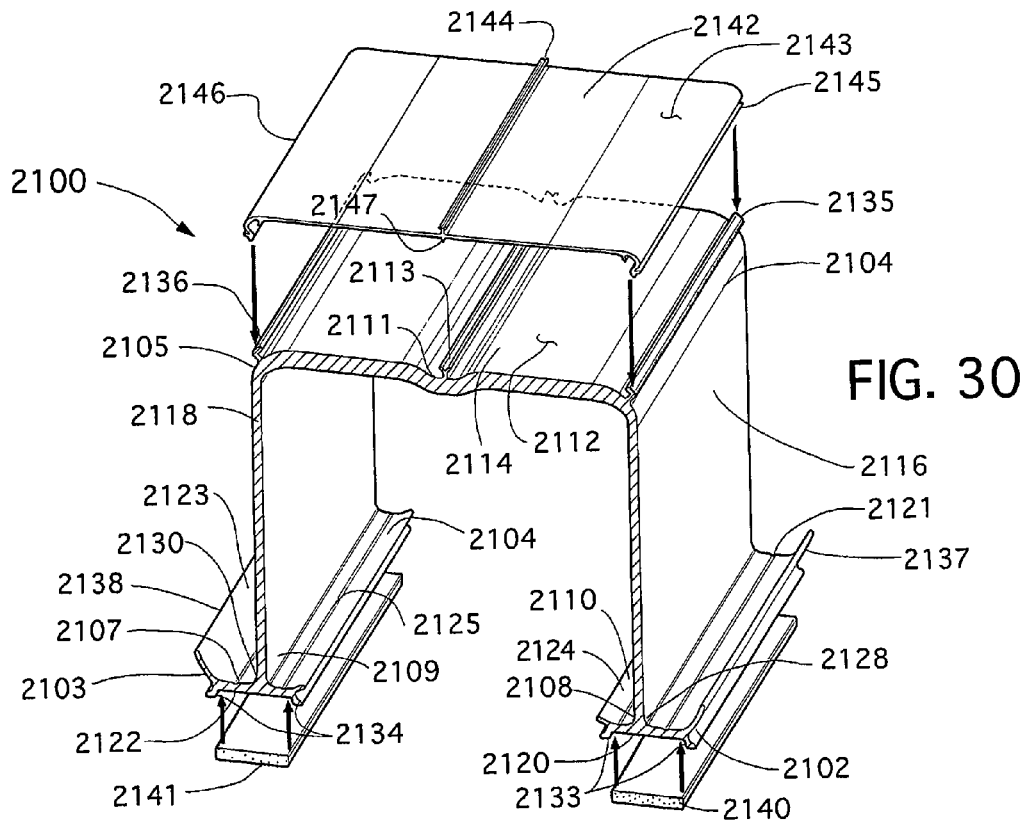
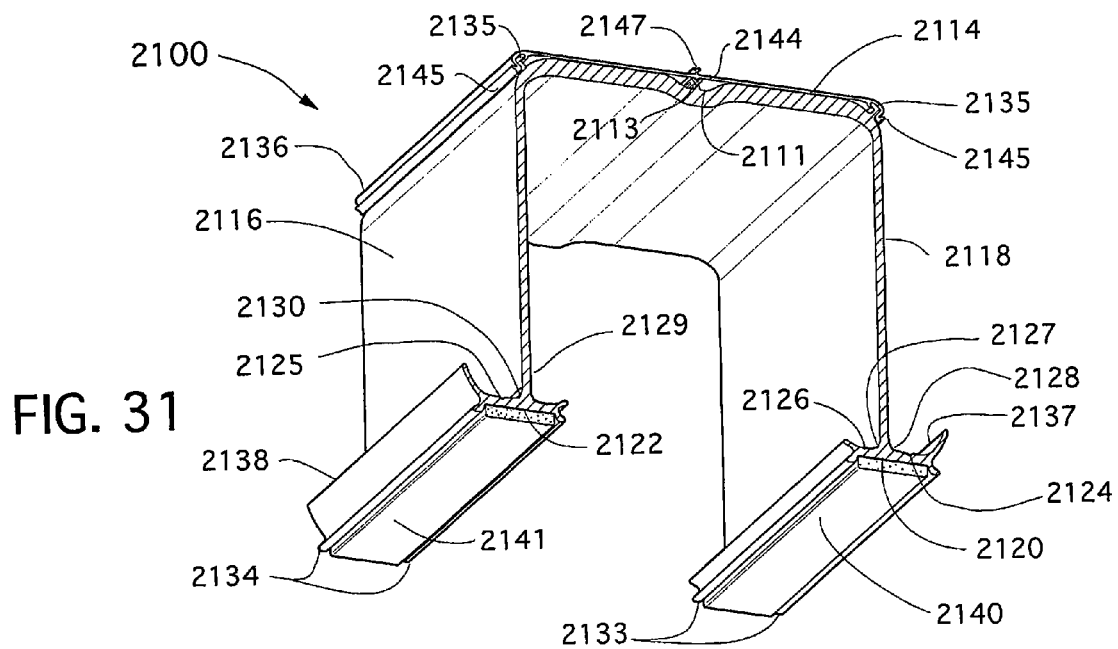

BUILDING MODULE, A METHOD FOR MAKING SAME, AND A METHOD FOR USING SAME TO CONSTRUCT A BUILDING

CROSS-REFERENCE TO RELATED APPLICATIONS

The present application claims priority based upon U.S. Provisional Application No. 61/540,898, filed Sep. 29, 2011, and U.S. Provisional Application No. 61/514,005, filed Aug. 1, 2011, both of which are incorporated herein by reference.

BACKGROUND OF THE DISCLOSURE

1. Field of the Disclosure

The present disclosure relates to a building module. The present disclosure further relates to a method for constructing a building module. The present disclosure also relates to a method for constructing a building using a building module.

2. Description of the Prior Art

There is a need for better methods of construction for conserving energy and preventing air infiltration, condensation, and moisture migration in buildings. It would be desirable to have methods for reducing energy losses associated with existing old and/or poorly designed thermal insulation and leaky building envelopes.

There are methods known in the construction industry for insulating the exteriors of buildings, such as application of foam insulation board followed by application of siding. However, the previous methods do not provide the combination of high strength, high insulation capability, effective air/water barrier, and resistance to moisture buildup.

SUMMARY OF THE DISCLOSURE

According to the present disclosure, there is provided a building module. The building module has a rigid inner construction panel defining a planar surface thereon; one or more rigid brackets each affixed by one or more mechanical fasteners to the planar surface of the construction panel; a rigid, closed-cell, spray foam or an adhesive matrix contiguous to and substantially covering the planar surface of the construction panel and contacting and embedding at least a major portion of the one or more brackets. Each of the one or more brackets bears a planar surface facing substantially away from the planar surface of the construction panel. The surface area of the planar surface of each of the one or more brackets is substantially smaller than the surface area of the planar surface of the construction panel to which it is affixed.

Further according to the present disclosure, there is provided a method for making a building module. The method has the steps of (a) affixing one or more rigid brackets to a planar surface of a rigid inner construction panel by one or more mechanical fasteners and (b) applying a sprayed rigid, closed-cell structural foam (such as a sprayed or foam-in-place foam) or an adhesive contiguous to the construction panel and contacting and surrounding and/or embedding at least a major portion of the one or more brackets. The one or more brackets each bears a planar surface facing substantially away from the planar surface of the construction panel. The surface area of the planar surface of each of the one or more brackets is substantially smaller than the surface area of the planar surface of the construction panel to which it is affixed.

Still further according to the present disclosure, there is provided another embodiment of a bracket. The bracket includes first and second slidably coextensive unitary components. The first unitary component includes a back panel, a bottom ledge, and first and second side panels. The back panel intersects the first and second side panels at substantially right angles. The first and second side panels intersect the bottom ledge at substantially right angles. The first and second side panels each have an outer surface. The first and second side panels each have a plurality of splines protruding at their outer surface extending generally from top to bottom. The back panel is flush and contiguous with respect to the planar surface of the interior construction panel. The back panel is affixed to the planar surface of the interior construction panel. The second unitary component has a face panel, third and fourth side panels, and a rim. The face panel intersects the third and fourth side panels at substantially right angles. The rim extends around the upper edges of the outer panel and the third and fourth side panels. The face panel bears the planar surface of each of the one or more brackets. The third and fourth side panels each have an inner surface. The third and fourth side panels each have a plurality of splines protruding at their inner surface extending generally from top to bottom. The plurality of splines of the first and second side panels is slidably coextensive with the splines of the third and fourth side panels.

Still further according to the present disclosure, there is provided another embodiment of a bracket. The bracket has a platform bearing a planar surface, four legs appending from the platform away from the planar surface, and at least one fastening tab appending from each of the four legs. The at least one fastening tab is actuatable with respect to the leg from which it appends. The platform and the legs are formed from metal sheet defining a plurality of orifices therein and therethrough substantially over the entirety thereof.

Still further according to the present disclosure, there is provided another embodiment of a bracket. A bracket has a first component and a second component. The first component includes a first platform bearing a first planar surface and first and second side panels. The first and second panels are generally parallel with respect to each other and that append generally perpendicularly from the first platform and away from the first planar surface. The first and second side panels define first and second groups of protrusions along their respective leading edges. The first and second groups of protrusions extend generally perpendicularly from the first and second side panels, respectively, and extend away from each other. The first component is formed from flexible metal sheet defining a plurality of orifices therein and therethrough substantially over the entirety of the flexible metal sheet. The second component includes a second platform bearing a second planar surface and third and fourth side panels. The third and fourth side panels are generally parallel with respect to each other and append generally perpendicularly from the second platform and away from the second planar surface. The third and fourth side panels define third and fourth groups of protrusions along their respective leading edges. The third and fourth groups of protrusions extend generally perpendicularly from the third and fourth side panels and extend generally away from each other. The second component is formed from flexible metal sheet defining a plurality of orifices therein and therethrough substantially over the entirety of the flexible metal sheet. The first component is inserted a desired distance into the second component such that the first and second groups of protrusions interlock with orifices through inner surfaces of the third and fourth sides, respectively.

Further according to the present disclosure, there is provided another embodiment of a building module. The module has an inner construction panel defining a planar surface thereon, one or more rigid brackets each affixed by one or more mechanical fasteners to the planar surface of the construction panel, and an exterior panel affixed to the planar surface of each of the one or more brackets. Each of the one or more brackets bears a planar surface facing substantially away from the planar surface of the construction panel. The surface area of the planar surface of each of the one or more brackets is substantially smaller than the surface area of the planar surface of the construction panel to which the one or more brackets is affixed. The one or more brackets is substantially free of a rigid structural foam or an adhesive matrix, wherein the one or more brackets is the one or more brackets set forth in any of claims 24, 25, and 28.

Further according to the present disclosure, there is provided another embodiment of a building module. The module has (a) an inner construction panel defining a planar surface thereon, (b) one or more rigid brackets each affixed by one or more mechanical fasteners to the planar surface of the inner construction panel, and (c) a rigid, closed-cell, spray polyurethane foam or an adhesive matrix contiguous to and substantially covering the planar surface of the inner construction panel and filling to and surround and/or embed at least a major portion of the one or more brackets. Each of the one or more brackets includes a platform bearing a planar surface facing substantially away from the planar surface of the inner construction panel. The surface area of the planar surface of each of the one or more brackets is substantially smaller than the surface area of the planar surface of the inner construction panel to which the one or more brackets is affixed. The one or more rigid brackets is generally U-shaped with two sides appending from the platform. The one or more brackets are preferably constructed from a solid, non-mesh metal. The two sides are each affixed to the planar surface of the inner construction panel.

Further according to the present disclosure, there is provided a method for constructing a building. The method has the step of joining a plurality of the building modules described above.

Further according to the present disclosure, there is provided another embodiment of a method for making a building module. The method has the steps of (a) affixing one or more rigid brackets to a planar surface of an rigid inner construction panel by one or more mechanical fasteners and (b) applying a rigid, closed-cell, spray polyurethane foam or adhesive contiguous to substantially cover the planar surface of the inner construction panel and fill and surround and/or embed at least a major portion of the one or more brackets. The one or more brackets each bears a planar surface facing substantially away from the planar surface of the inner construction panel. The surface area of the planar surface of the one or more brackets is substantially smaller than the surface area of the planar surface of the inner construction panel to which it is affixed.

Further according to the present disclosure, there is provided another embodiment of a bracket. The bracket has a platform bearing a planar surface and two sides appending from the platform away from the planar surface. Each of the two sides define a base flange at its distal end extending generally laterally with respect to the platform and away from the base flange of the other of the two sides. Each of the base flanges define an arcuate well on which a planar substrate may be positioned.

Further according to the present disclosure, there is another embodiment of a bracket. The bracket has a platform bearing a substantially planar top surface, two sides appending from the platform away from the planar surface, and a shield having a substantially planar bottom surface. The shield is detachably fitted to the platform at the top surface thereof and substantially covers the top surface thereof. The bracket is generally U-shaped.

Further according to the present disclosure, there is another embodiment of a building module. The module has a roof panel, an interior construction panel in proximity to and spaced-apart from the roof panel, a plurality of brackets affixed to the interior construction panel at a surface thereof and oriented to the roof panel, a spray insulating foam at the surface of the interior construction panel and partially embedding the plurality of brackets, and one or more vents therein. Each bracket includes a platform bearing a substantially planar top surface oriented to the roof panel and two sides appending from the platform away from the planar surface. Each bracket is generally U-shaped. The module defines an airway space between the foam and the roof panel. The airway space is in air communication with an environment outside the module through the one or more vents.

Further according to the present disclosure, there is another embodiment of a building module. The module has a wall panel, an interior construction panel in proximity to and spaced-apart from the wall panel, a plurality of brackets affixed to the interior construction panel at a surface thereof and oriented to the wall panel, a spray insulating foam at the surface of the interior construction panel and partially embedding the plurality of brackets, one or more vents therein, and a drain therefrom. Each bracket includes a platform bearing a substantially planar top surface oriented to the wall panel and two sides appending from the platform away from the planar surface. Each bracket is generally U-shaped. The module defines an airway space between the foam and the roof panel. The airway space is in air communication with an environment outside the module through the one or more vents. The drain is adapted to drain accumulated water within the airspace to the environment.

Further according to the present disclosure, there is another embodiment of a bracket. The bracket has a platform bearing a substantially planar surface and first and second sides appending from the platform away from the planar surface. Each of the first and second sides defines a proximal portion and a distal portion therealong. The distal portion of the first side is inwardly directed toward the distal portion of the second side.

Further according to the present disclosure, there is a building module. The module has an inner construction panel defining a planar surface thereon and one or more rigid brackets each affixed by one or more mechanical fasteners to the planar surface of the inner construction pane. Each of the one or more brackets includes a platform bearing a planar surface facing substantially away from the planar surface of the inner construction pane. The surface area of the planar surface of the one or more brackets is substantially smaller than the surface area of the planar surface of the inner construction panel to which the one or more brackets is affixed. The one or more brackets includes first and second sides appending from the platform thereof. Each of the first and second sides defines a proximal portion and a distal portion therealong. The distal portion of the first side is inwardly directed toward the distal portion of the second side.

BRIEF DESCRIPTION OF THE FIGURES

FIG. 21 is a perspective view of another embodiment of a bracket according to the present disclosure.

FIG. 22 is a different perspective view of the bracket of FIG. 21.

FIG. 30 is a first perspective view of another embodiment of a bracket useful in a building module according to the present disclosure.

FIG. 31 is a second perspective view of the bracket shown in FIG. 30.

DETAILED DESCRIPTION OF THE DISCLOSURE

Figure 1A:
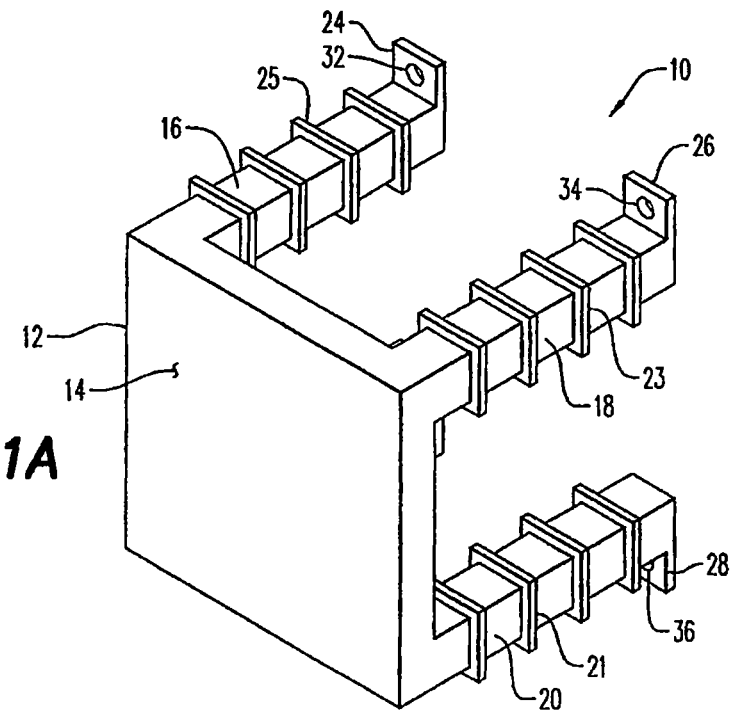
FIG. 1A is a first perspective view of a bracket useful in a building module according to the present disclosure.
Figure 1B:
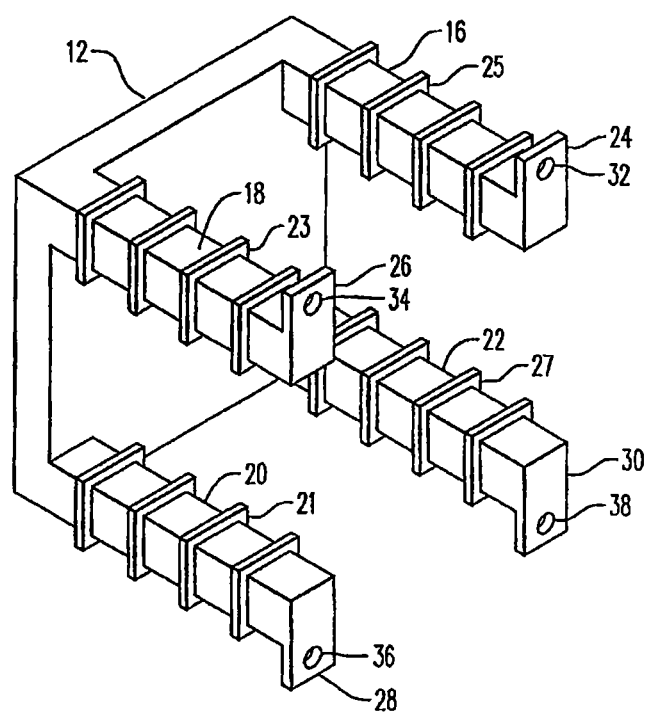
FIG. 1B is a second perspective view of the bracket shown FIG. 1A.

A bracket useful in the building module of the present disclosure is depicted in FIGS. 1A and 1B and generally referenced by the numeral 10. Bracket 10 has a platform 12 that bears a planar surface 14. Bracket 10 has legs 16, 18, 20, and 22 extending away from planar surface 14. Legs 16, 18, 20, and 22 have protruding fins 21, 23, 25, and 27, which act to further immobilize bracket 10 in a foam or adhesive matrix. Legs 16, 18, 20, and 22 define fastening tabs 24, 26, 28, and 30, respectively, through which bracket 10 can be affixed to an inner construction panel (not shown) through orifices 32, 34, 36, and 38, respectively, by means of mechanical fasteners (not shown).

Figure 2A:
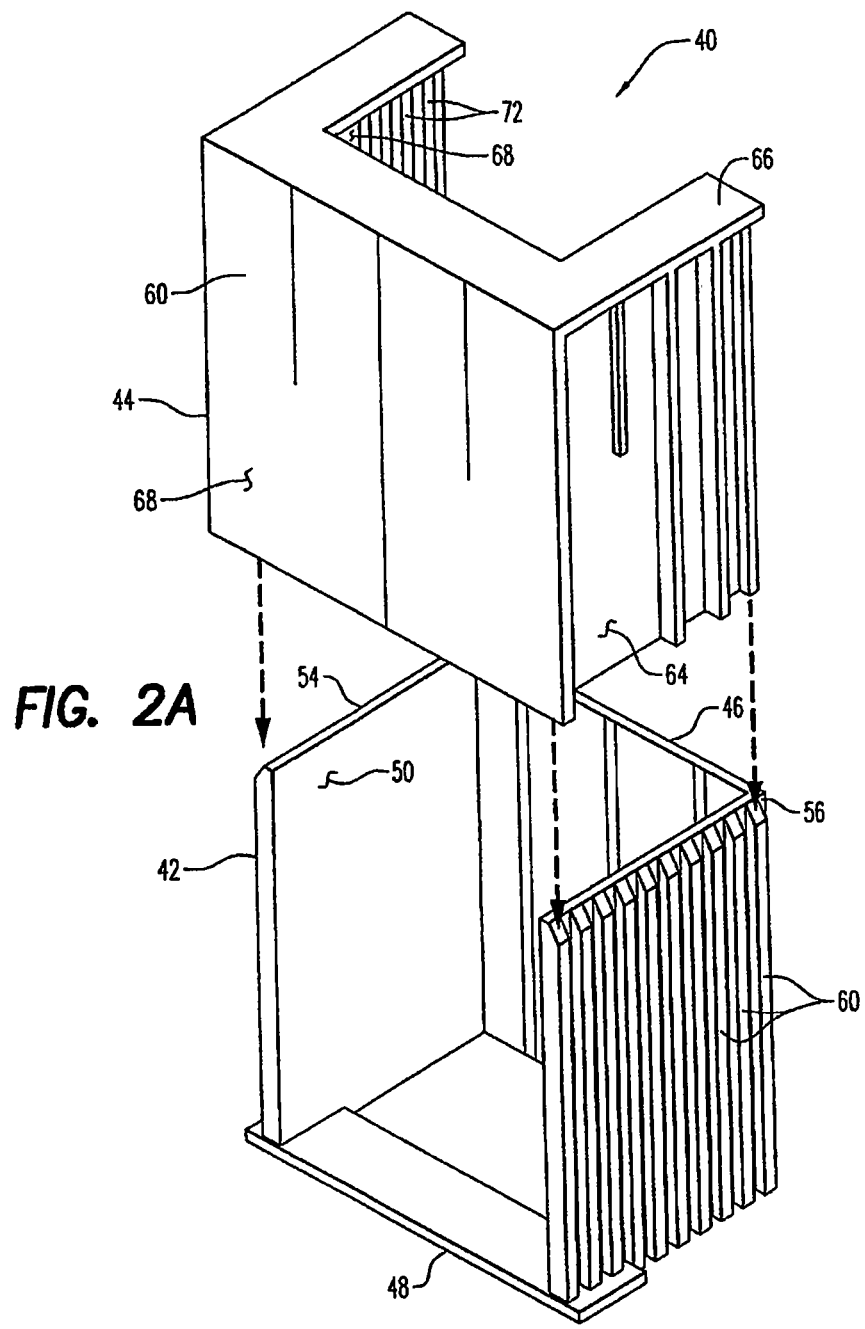
FIG. 2A is a first perspective, exploded view of another embodiment of a bracket useful in a building module according to the present disclosure.
Figure 2B:
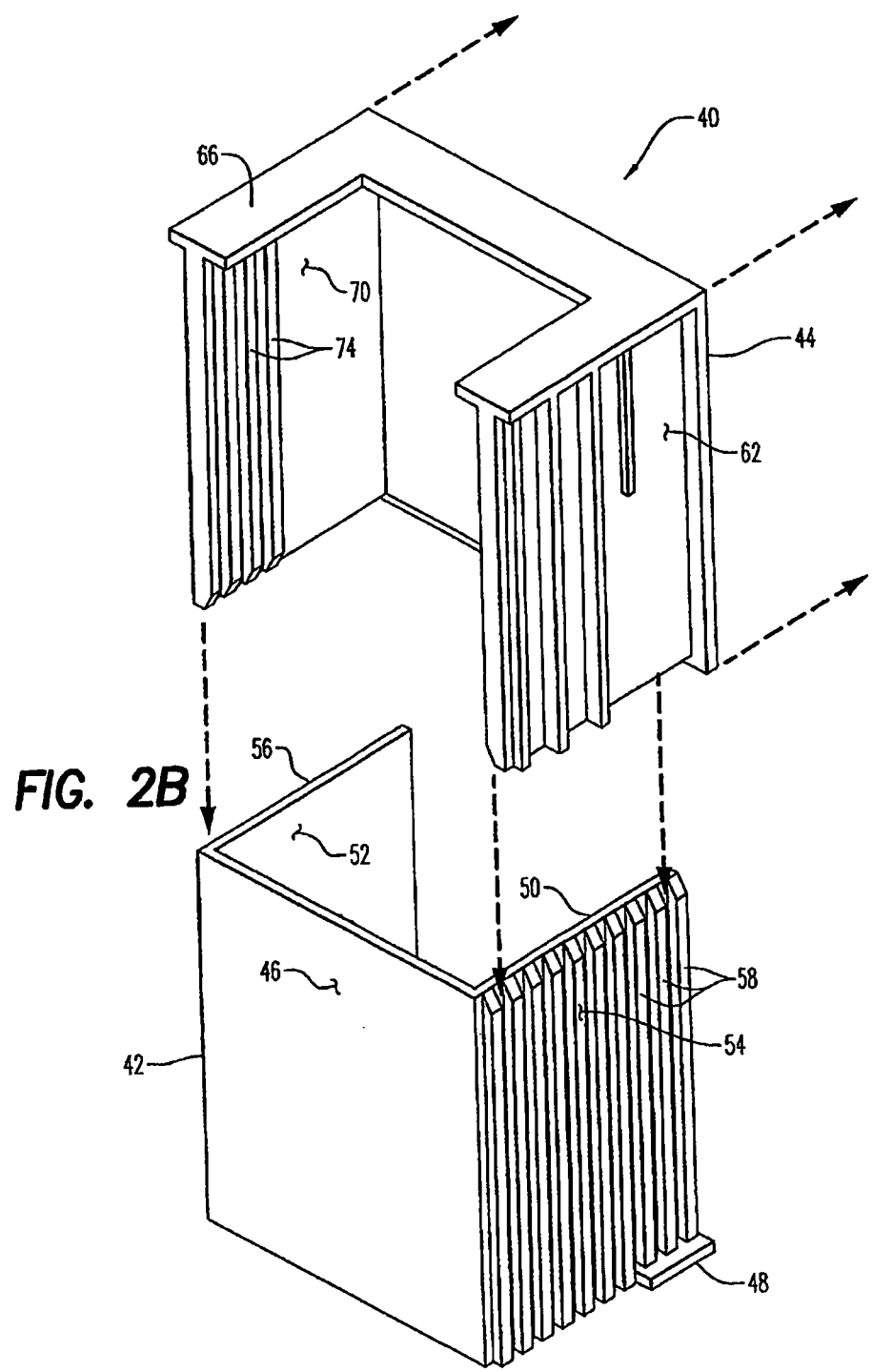
FIG. 2B is a second perspective, exploded view of another embodiment of the bracket shown in FIG. 2B.

Another embodiment of a bracket useful in the building module of the present disclosure is depicted in FIGS. 2A and 2B and generally referenced by the numeral 40. Bracket 40 has first and second components 42 and 44. Components 42 and 44 are each preferably unitary in construction and are slidably coextensive, i.e., may be slid one into the other.

Components 42 and 44 are preferably of an injected molded plastic, e.g., acrylonitrilebutadiene-styrene (ABS), polypropylene, and polycarbonates. Base component 42 has a back panel 46, a bottom ledge 48, and first and second side panels 50 and 52. Back panel 46 intersects side panels 50 and 52 at substantially right angles. Side panels 50 and 52 intersect bottom ledge 48 at substantially right angles. There is open space between ledge 48 and back panel 46 along the bottom of side panels 50 and 52; thus, base component 42 is partially open along its bottom. Side panels 50 and 52 have outer surfaces 54 and 56, respectively. Side panels 50 and 52 have pluralities of splines 58 and 60 (groups of splines), respectively, protruding from outer surfaces 54 and 56, respectively. Splines 58 and 60 extend generally from top to bottom of side panels 50 and 52, respectively. The width of individual splines with the groups of splines 58 and 60 taper outward slightly as splines 58 and 60 course upward along outer surfaces 54 and 56. The tapering outward creates a self-tightening assembly between base component 42 and cap component 44. Back panel 46 is adapted to contact and be positioned flush with and affixed to a surface of an inner construction panel (not shown).

Cap component 44 has a face panel 60, third and fourth side panels 62 and 64, and a rim 66. Face panel 60 intersects third and fourth side panels 62 and 64 at substantially right angles. Rim 66 extends around the upper edges of outer panel 60 and side panels 62 and 64. Face panel 60 bears a planar surface 68 adapted to receive, contact, and be flush with and affixed to exterior sheathing, panels, or masonry (not shown). Side panels 62 and 64 have inner surfaces 68 and 70, respectively. Side panels 62 and 64 have pluralities of splines 72 and 74 (two groups), respectively, protruding inward from inner surfaces 68 and 70, respectively. Splines 72 and 74 extend generally from top to bottom of side panels 62 and 64, respectively. The width of individual splines within the groups of splines 72 and 74 taper inward slightly as splines 72 and 74 course downward along inner surfaces 68 and 70. The tapering inward creates a selftightening assembly between base component 42 and cap component 44. Splines 58 and 60 of component 42 are slidably coextensive with splines 72 and 74 of cap component 44.

An advantage of bracket 40 of FIGS. 2A and 2B is that its adjustability allows use of uneven surfaces and dissimilar materials. An installer can adjust the distance face panel 60 is from the surface of any existing uneven or out-of-plumb wall, construction panel, floor, roof or other planar construction material or curved structural surface. This is accomplished by attaching the bracket base, e.g., component 42 at back panel 46 to the construction surface using fasteners or adhesives, sliding the bracket cap, e.g., component 44, off of component 42, and reinserting it into the component 42 when the outside face of the component 42 is in proper alignment. Alignment can be achieved, for example, through the use of a level, a laser alignment tool, or other alignment tool. Bracket 40, when properly aligned, will then provide an aligned structure adapted to receiving new exterior sheathing or panel materials.

Figure 3:
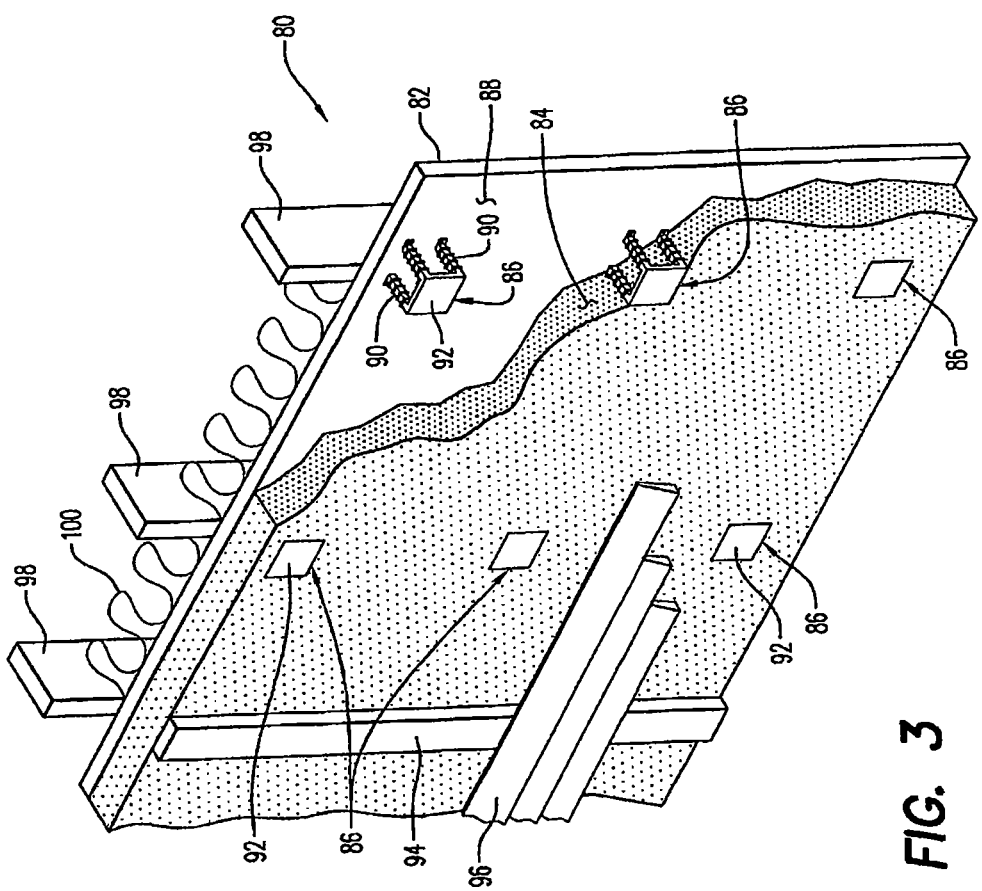
FIG. 3 is a perspective, cutaway view of a building module according to the present disclosure utilizing brackets of the type set forth in FIG. 1.

An embodiment of a building module according to the present disclosure is depicted in FIG. 3 and generally reference by the numeral 80. Module 80 has a rigid inner construction panel 82 defining a planar surface 88. Panel 82 has a plurality of rigid brackets 86 each with four legs 90 affixed to planar surface 88 by screws (not shown) through fastening tabs (not shown) on legs 90. Brackets 86 define planar surfaces 92 thereon. A rigid, spray foam 84 is contiguous to and substantially covering planar surface 88 of panel 82 and contacting and embedding brackets 86 except for planar surfaces 92. Exterior sheathing is shown by way of representation in the form of vertically disposed wood plank 94 affixed to brackets 86 underneath plank 94 via screws (not shown) and horizontally disposed siding 96 attached to plank 94 via screws (not shown). The embodiment has ancillary structure in the form of studs 98, to which panel 82 is affixed, and batt insulation 100 between studs 98.

Figure 4:
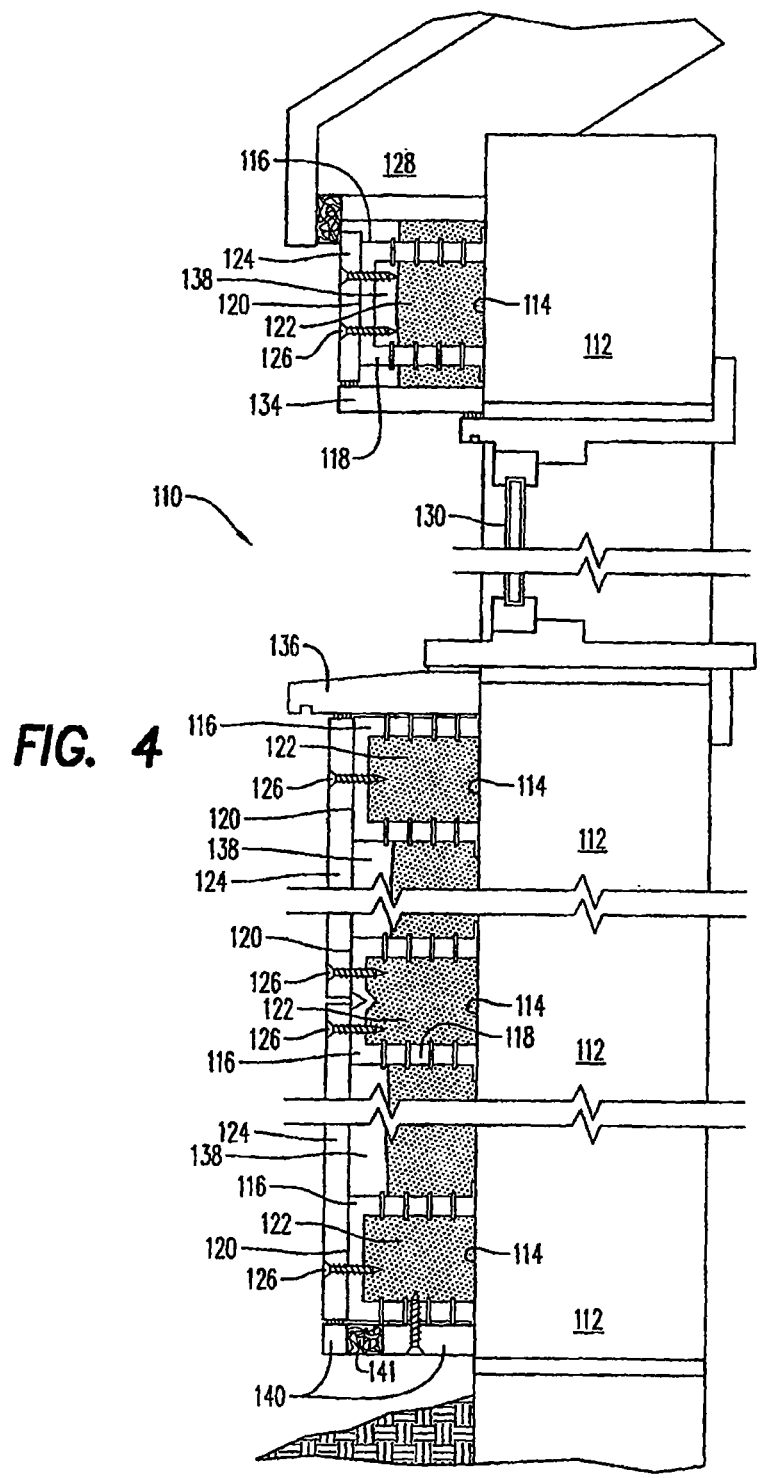
FIG. 4 is a broken, vertical section view of another embodiment of a building module according to the present disclosure utilizing a plurality of the bracket of the type set forth in FIG. 1.

An embodiment of a building module according to the present disclosure is depicted in FIG. 4 in the form of a vertical wall section and generally reference by the numeral 110. Module 110 has a rigid wall 112 defining a planar surface 114. Wall 112 has a plurality of rigid brackets 116 each with four legs 118 affixed to planar surface 114 by screws (not shown). Brackets 116 define planar surfaces 120 thereon. A rigid, spray foam 122 is contiguous to and substantially covering planar surface 114 of wall 112 and contacting and surrounding brackets 116 except for planar surfaces 120. The gaps between foam 122 and exterior panel 124 take the form of airspaces 138, which function as a rainscreen by providing a substantially continuous airspace to vent 141. Exterior sheathing is shown by way of representation in the form of vertically disposed panel 124 affixed to brackets 116 via screws 126 or adhesive (not shown). There is additional structure shown in FIG. 4 in the form of roof structure 128, window 130, head and sill barriers 134 and 136, and base soffit barrier 140.

Figure 5:
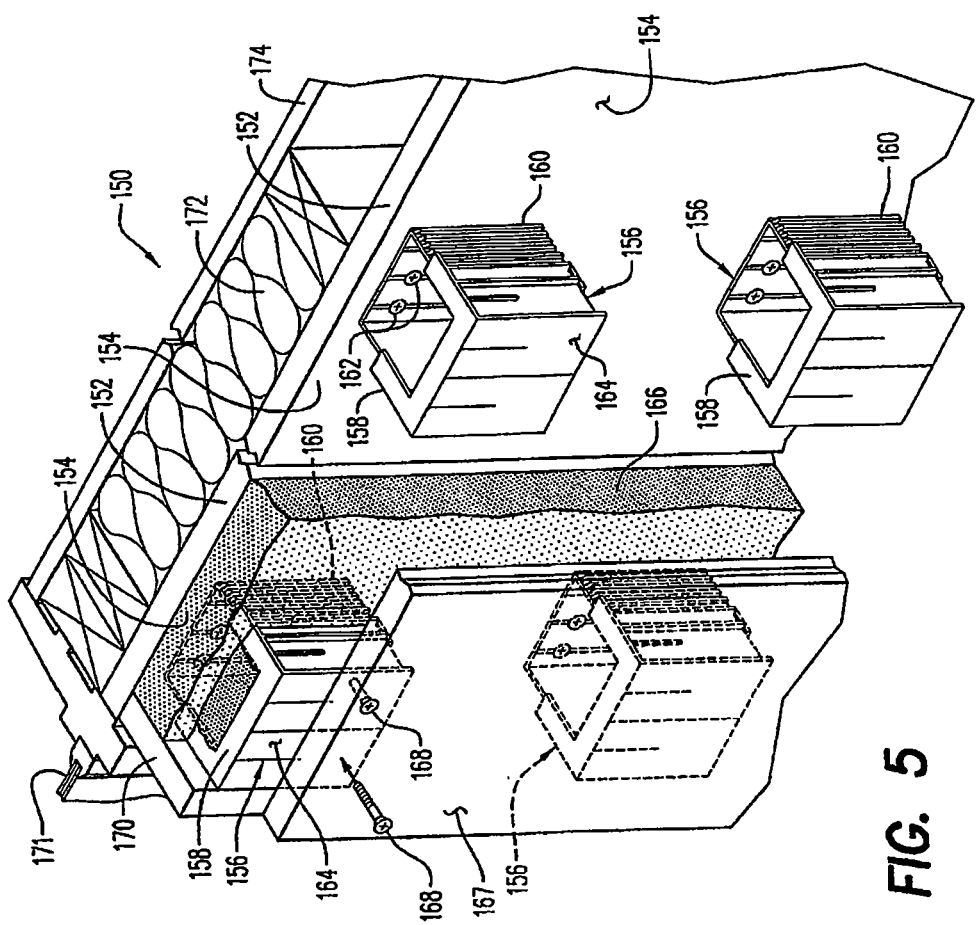
FIG. 5 is a broken, perspective plan section view of another embodiment of a building module according to the present disclosure utilizing a plurality of the bracket of the type set forth in FIG. 2.

An embodiment of a building module according to the present disclosure is depicted in FIG. 5 and generally reference by the numeral 150. Module 150 has an inner panel 152 defining a planar surface 154. Panel 152 has a plurality of rigid brackets 156 each having slidably coextensive cap component 158 and base component 160. Brackets 156 are of the type depicted in FIG. 2. Base components 160 are affixed to planar surface 154 by screws 162. Cap components 158 define planar surfaces 164 thereon. A rigid, spray foam 166 is contiguous to and substantially covering planar surface 154 of panel 152 and contacting and embedding brackets 156 except for planar surfaces 164. Module 150 has a panel of new exterior panels 167 affixed to brackets 156 via screws 168 or adhesive (not shown). There is additional structure shown in FIG. 5 in the form of window extension casing 170, window 171, batt insulation 172, and interior panel 174.

Figure 6:
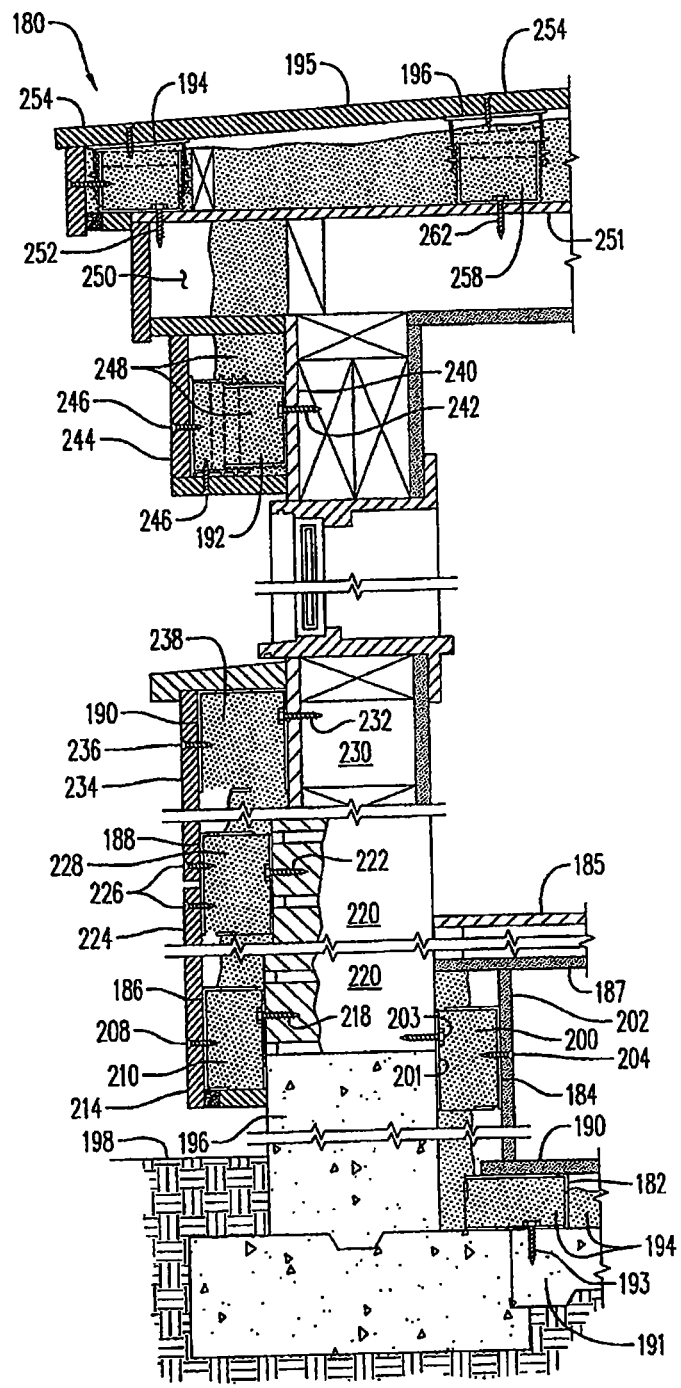
FIG. 6 is a broken, vertical section view of another embodiment of a building module according to the present disclosure utilizing a plurality of the bracket of the type set forth in FIG. 2.

An embodiment of a building module according to the present disclosure is depicted in FIG. 6 and generally reference by the numeral 180. Module 180 has eight different configurations of brackets in the form of brackets 182, 184, 186, 188, 190, 192, 194, and 196.

The several brackets are of the type depicted in FIG. 2. The several brackets are affixed with various types of screws to planar or uneven surfaces of various construction materials. Bracket 182 elevates, levels, and insulates a floor 190 above a basement slab 191 and is affixed to slab 191 with a screw 193. Insulation and waterproofing is provided by spray foam 194. Bracket 184 is affixed to an interior basement wall 201 with a screw 203. Bracket 184 insulates and waterproofs a foundation wall 196 below or above external grade 198. There is adjacent structure in the form of floor 185 and ceiling 187. Insulation and waterproofing is provided by spray foam 200. Bracket 186 is affixed to wall 220 with a screw 218 and exterior panel 214 is attached to bracket 186 with a screw 208. Insulation is provided by spray foam 210. Bracket 188 is adjusted deeper and affixed to an uneven masonry-surfaced wall 220 with a screw 222 and exterior panel 224 with screws 226 on each side of panel joint. Insulation is provided by spray foam 228. Bracket 190 is affixed to a wood wall 230 with a screw 232 and exterior sheathing 234 with a screw 236. Bracket 190 is actuated deeper to match changes in the existing exterior surface building of module 180 at wall 230. Insulation is provided by spray foam 238. Bracket 192 is affixed to a wall 240 with a screw 242 and exterior panel 244 with screws 246. Bracket 192 is oriented sideways due to lack of clearance to slide the bracket cap down from above. Insulation is provided by spray foam 248. Bracket 194 is secured to a roof joist 250 with a screw 252. Roof sheathing 254 is secured to bracket 194 with uneven (angled) bracket cap spline engagement with base piece to create pitch. Insulation is provided by foam 258. Bracket 196 is secured to a roof sheathing 251 and, if desired, roof joist 250 with a screw 262 and roof 254. Sheathing is attached to bracket 196 with angled engagement and wider gap than bracket 194 to continue pitch. Insulation is provided by spray foam 258. Air space 255 above foam 258 provides roof ventilation from inlet 253 providing a "cold roof" assembly.

Figure 7:
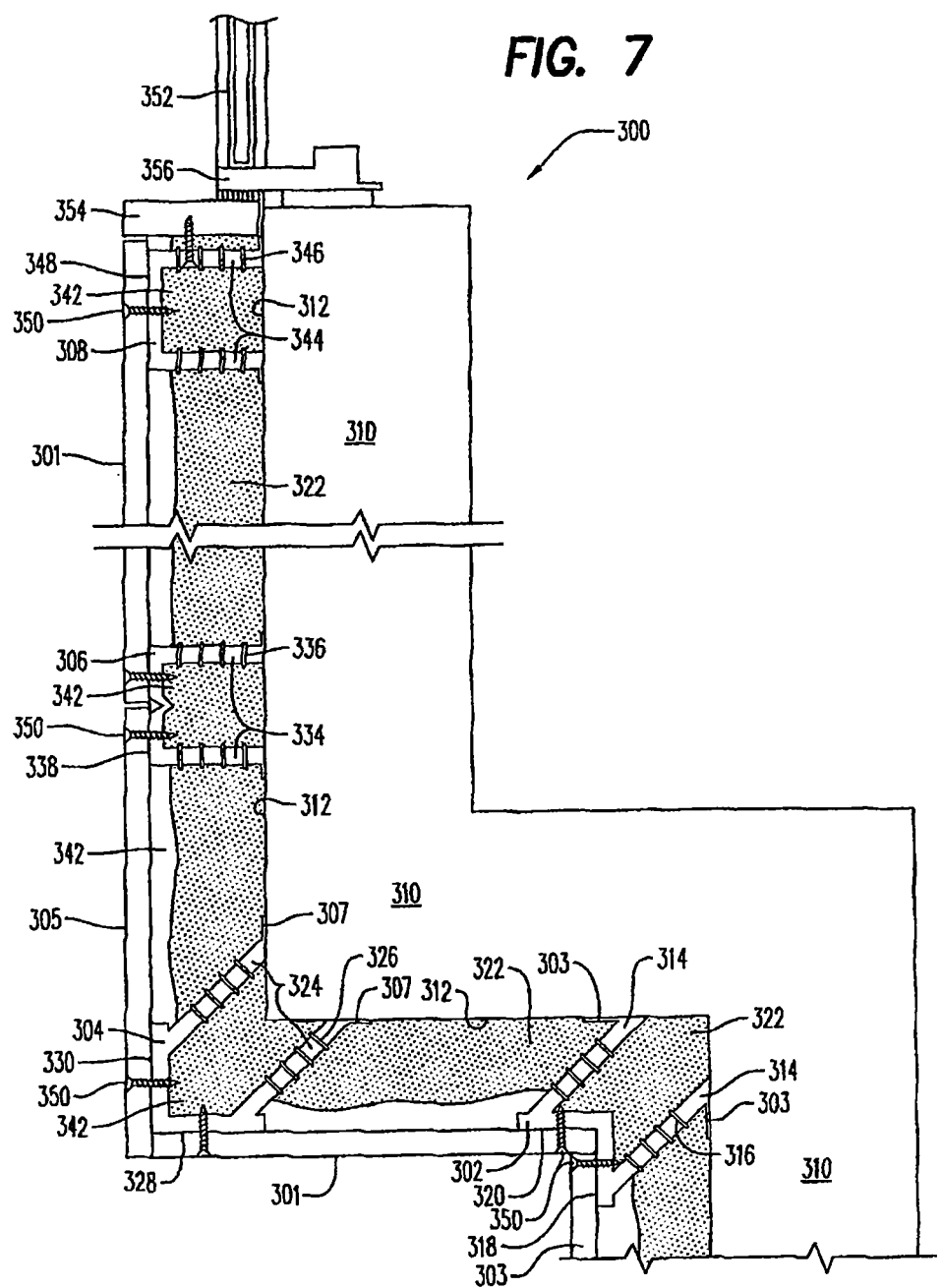
FIG. 7 is a broken, plan section view of another embodiment of a building module according to the present disclosure utilizing a plurality of the bracket of the type set forth in FIG. 1.

An embodiment of a building module according to the present disclosure is depicted in FIG. 7 and generally reference by the numeral 300. Module 300 has different configurations of brackets in the form of brackets 302, 304, 306, and 308. Brackets 302, 304, 306, and 308 are of the type generally depicted in FIG. 1. Brackets 302, 304, 306, and 308 are adapted to receiving and being affixed to exterior panels 301, 303, and 305. Module 300 has a rigid wall 310 defining a planar surface 312. Bracket 302 has legs (four) 314 each with a plurality of fins 316 and planar surfaces 318 and 320 to provide inside corner support for exterior panels 301 and 303, which are affixed to it. Legs 314 are secured to wall 310 via a plurality of fastening tabs 303 affixed thereto with screws (not shown). Bracket 304 has legs (four) 324 each with a plurality of fins 326 and planar surfaces 328 and 330. Bracket 304 forms an outside corner support for exterior panels 301 and 305. Legs 324 are secured to wall 310 via a plurality of fastening tabs 307 affixed thereto with screws (not shown). Bracket 306 has legs (four) 334 each with a plurality of fins 336 and a planar surface 338. Legs 334 are secured to wall 310 via a plurality of fastening tabs (not shown) affixed thereto with screws (not shown). Bracket 308 has legs (four) 344 each with a plurality of fins 346 and a planar surface 348. Legs 344 are secured to wall 310 via a plurality of fastening tabs (not shown) affixed thereto with screws (not shown).

A rigid, spray foam 322 is contiguous to and substantially covering planar surface 312 of wall 310 and contacting and surrounding brackets 302, 304, 306, and 308 except for planar surfaces 318, 320, 328, 330, 338, and 348. The gaps between foam 322 and exterior panels 301 and 303 take the form of airspaces 342, which may also act as a rainscreen, if desired. Exterior panels are affixed to brackets 302, 304, 306, and 308 via a plurality of screws 350. There is additional structure shown in FIG. 7 in the form of window 352, extension window casing 354, and window jamb 356.

Figure 8:
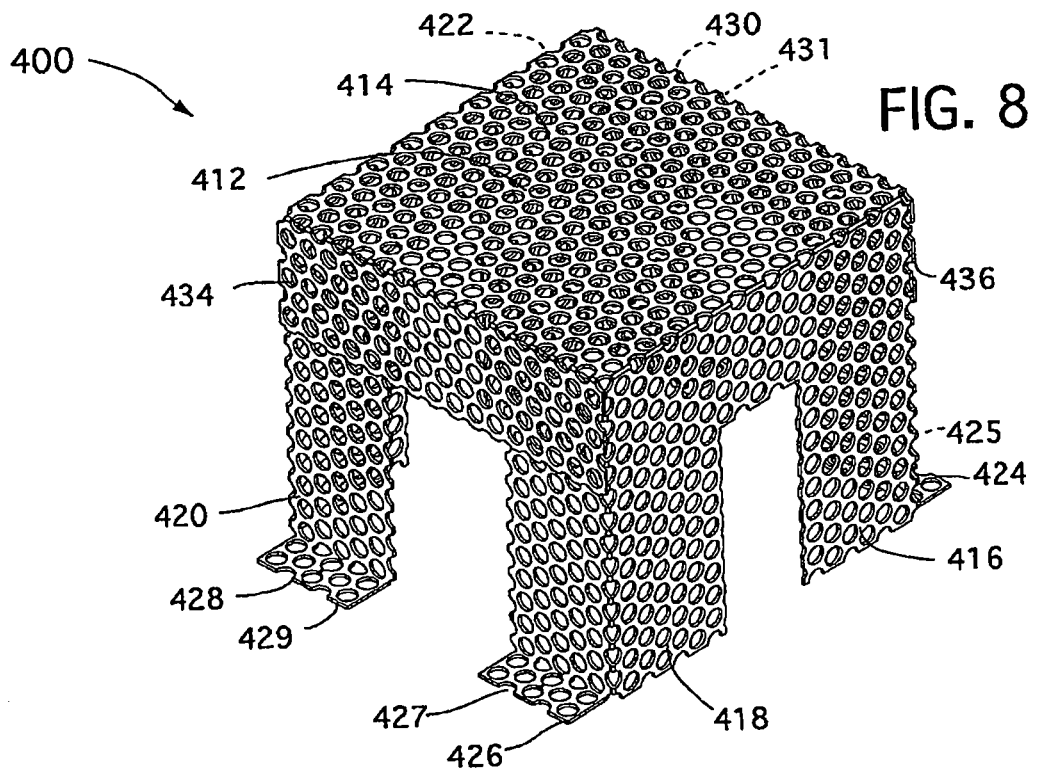
FIG. 8 is a perspective view of another embodiment of a bracket useful in a building module according to the present disclosure.
Figure 9:
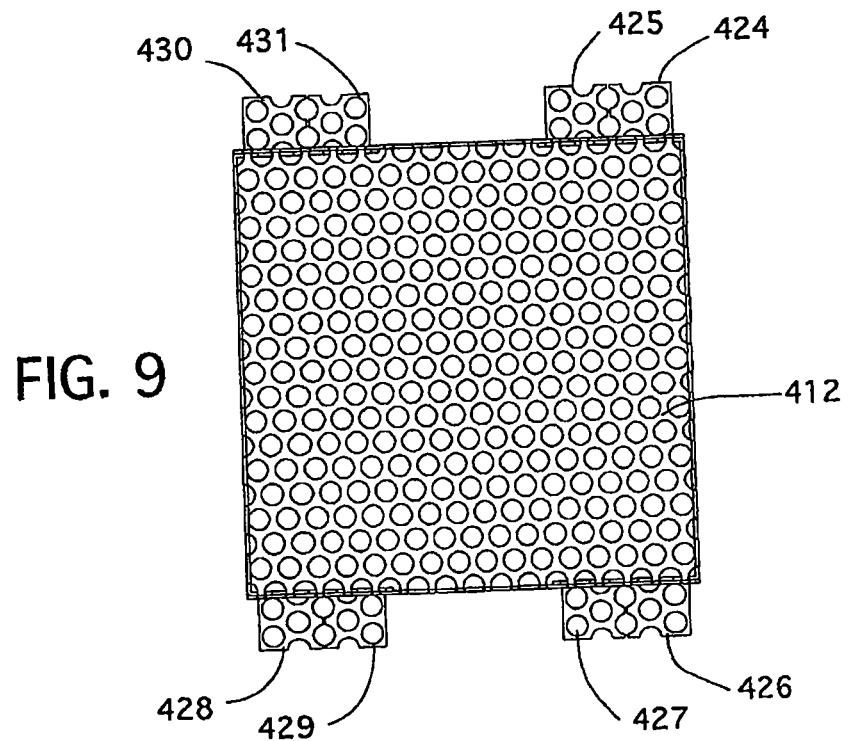
FIG. 9 is a plan view of the bracket of FIG. 8.

Another bracket useful in the building module of the present disclosure is depicted in FIGS. 8 and 9 and generally referenced by the numeral 400. Bracket 400 is constructed entirely of a perforated metal, such as galvanized or stainless steel or other rigid structural material, and is preferably formed from a single, integral piece of perforated sheet metal (not shown). The perforations therein take the form of a plurality of orifices therein and therethrough. Bracket 400 has a platform 412 that bears a perforated planar surface 414. Bracket 400 has overlap members 434 and 436 that are preferably integral to platform 412 and provide additional strength and rigidity to bracket 400. Bracket 400 has legs 416, 418, 420, and 422 appending substantially equilaterally from platform 412 and extending away from planar surface 414. Leg 416 has fastening tabs 424 and 425. Fastening tabs 424 and 425 are adjacent but not interconnected. Leg 418 has fastening tabs 426 and 427. Fastening tabs 426 and 427 are adjacent but not interconnected. Leg 420 has fastening tabs 428 and 429. Fastening tabs 428 and 429 are adjacent but not interconnected. Leg 422 has fastening tabs 430 and 431. Fastening tabs 430 and 431 are adjacent but not interconnected. Fastening tabs are preferably flexible yet exhibit deadfold with respect to the legs from which they append and can be actuated independently of each other and positioned differently with respect to construction surfaces to which the bracket may be attached. Bracket 400 can be affixed to an inner construction panel (not shown) through orifices in the fastening tabs by means of mechanical fasteners, such as screws, nails, and staples (not shown), or by adhesives.

Figure 10:
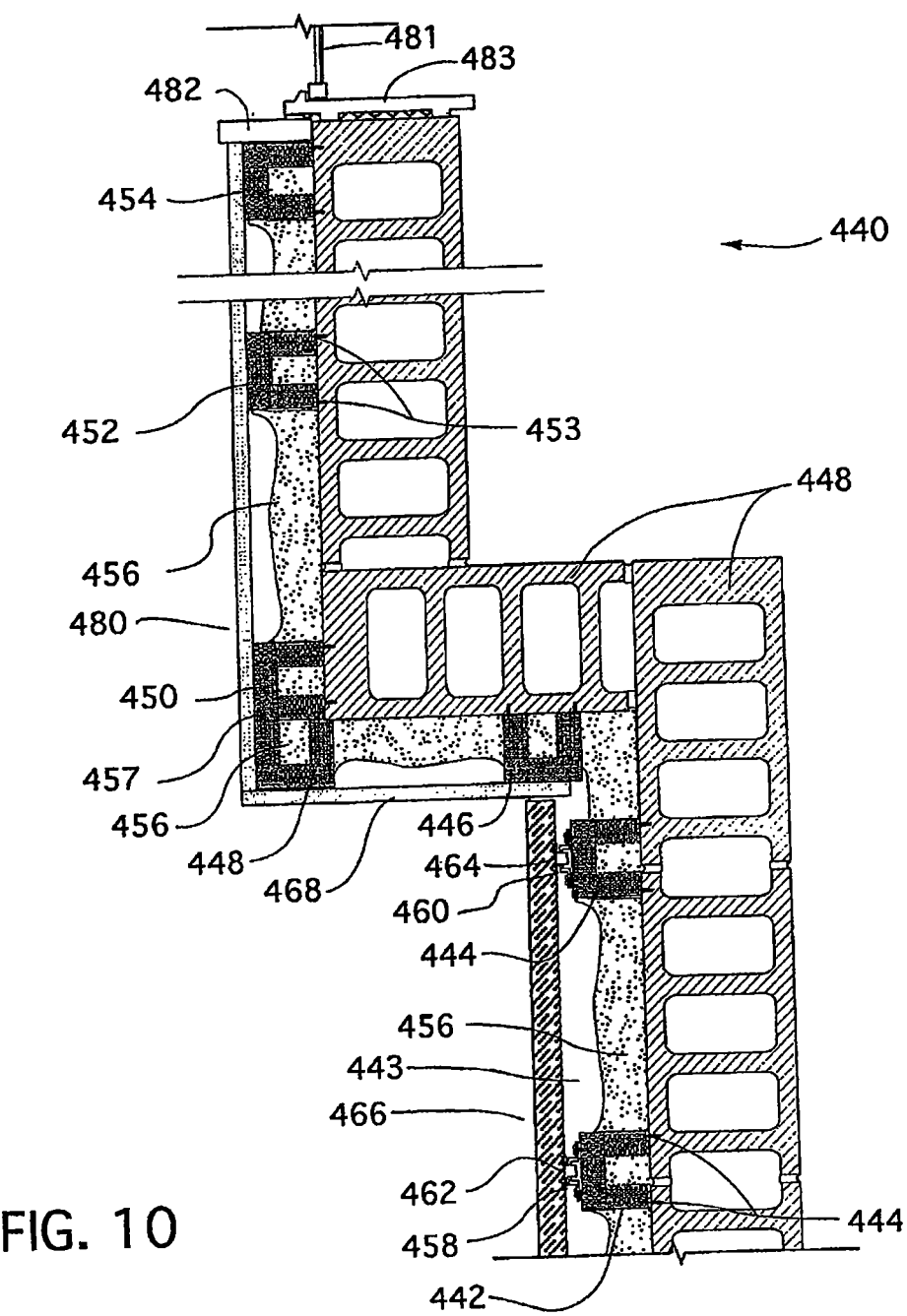
FIG. 10 is a broken, plan view of an embodiment of a building module according to the present disclosure utilizing a plurality of the bracket of the type set forth in FIG. 8.

An embodiment of a building module according to the present disclosure is depicted in FIG. 10 and generally reference by the numeral 440. Module 440 has a rigid wall of a plurality of concrete blocks 448. Module 440 has a plurality of rigid brackets 442, 444, 446, 448, 450, 452, and 454 affixed to the concrete block wall via a plurality of screws 453 through orifices in their respective fastening tabs. The several brackets are of the type and structure depicted in FIG. 9. A rigid, spray foam 456 embeds at least a major part of the depth of brackets 442, 444, 446, 448, 450, 452, and 454. The gaps between foam 456 and exterior panels 466, 468, and 480 take the form of airspaces 443, which function as a rainscreen behind by providing ventilation behind the exterior panels. Exterior panel 466 is affixed to brackets 442 and 444 via male latches 462 and 464, which mate with female grooves 458 and 460 affixed to brackets 442 and 444. Bracket 448 is attached to bracket 450 in order to form the outside corner. The fastening tab from bracket 448 is bent horizontal so it can be affixed to top corners of bracket 450 with screw 457 and other screws. Spray foam 456 then embeds and reinforces the outside corner. There is additional structure shown in FIG. 10 in the form of window 481, window jamb 483, and extension casing barrier 482.

Figure 11:
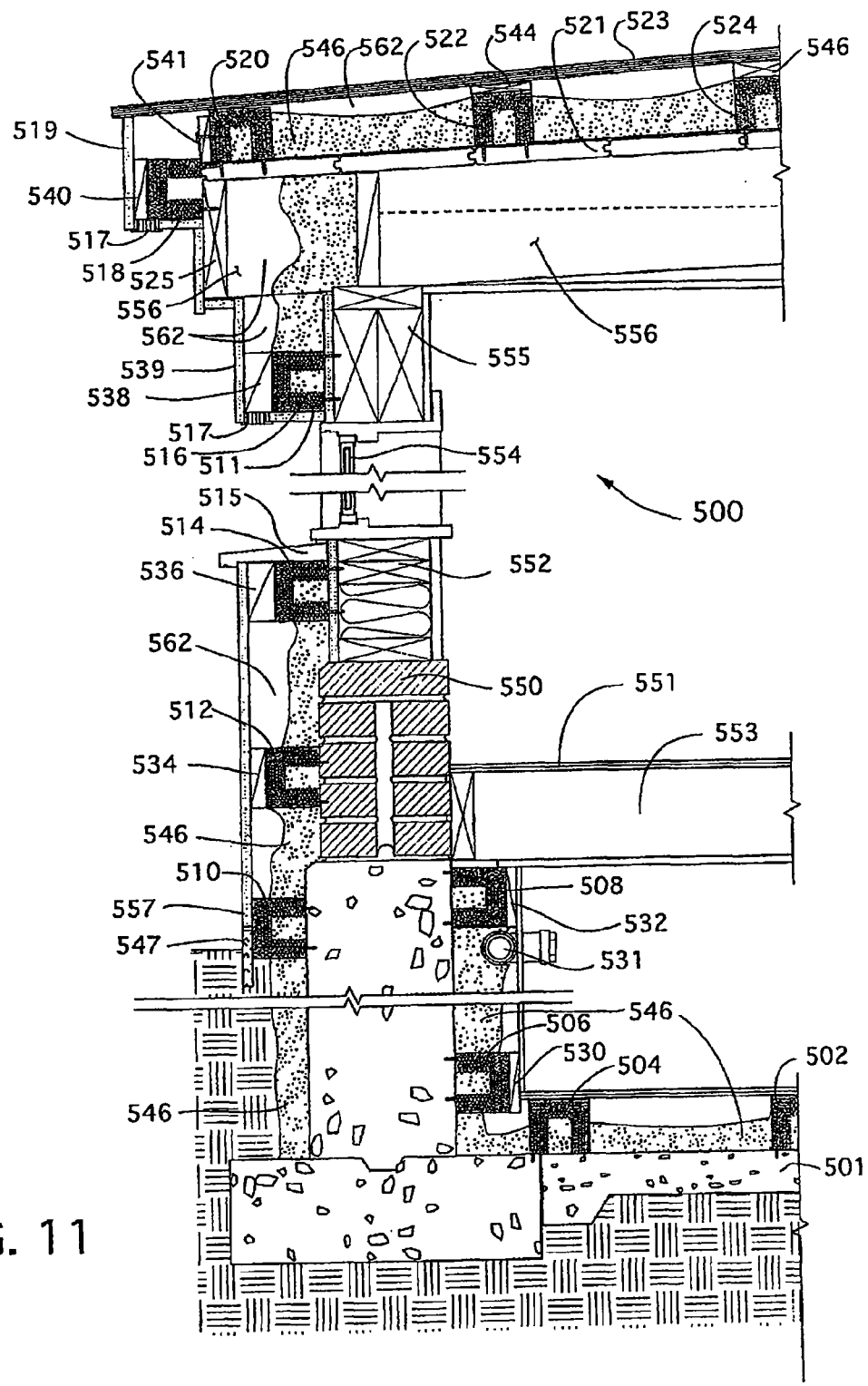
FIG. 11 is a broken, vertical section view of another embodiment of a building module according to the present disclosure utilizing a plurality of the bracket of the type set forth in FIG. 8.

An embodiment of a building module according to the present disclosure is depicted in FIG. 11 and generally referenced by the numeral 500. Module 500 has brackets 502, 504, 506, 508, 510, 512, 514, 516, 518, 520, 522, and 524. The several brackets are of the type depicted in FIG. 8. The several brackets are affixed with various types of screws to planar or uneven surfaces of various construction materials. Brackets 502 and 504 elevate, level, and insulate a floor above a basement slab 501 and are affixed to slab 501 via screws. Insulation and waterproofing is provided throughout module 500 by spray foam 546. Bracket 510 is secured to a cement foundation via screws and provides support for an external panel 557 and a flexible rubber subgrade panel 547. Bracket 512 is secured to masonry 550 via screws and provides support for panel 557 in conjunction with block 534, which allows alignment of external panel 557 from bracket 512. Bracket 514 is secured to block 552 via screws and window sill 515 is fastened to bracket 514 with construction adhesive fastened laterally to window sill 515. Bracket 514 provides support for external panel 557 in conjunction with block 536. Bracket 516 secured to header 555 provides support for external panel 539 in conjunction with block 538 and is used to provide adjustment in bracket depth. Bracket 516 is also secured to and provides lateral support for soffit panel 511. Bracket 520, 522, and 524 are first secured to a roof sheathing 521 and roof panel 523 is attached to bracket 520, 522, and 524. Brackets 522 and 524 have blocks 544 and 546 to provide angled displacement with respect to roof 521.

Block 541 is affixed to roof bracket 520 via a screw and is used to keep foam out of the interface between roof panel 523 and roof bracket 520. Bracket 518 is secured to roof rim joist 525 and roof joist 556 and provides support for roof fascia panel 519 in conjunction with block 540. Vent 517 provides ventilation to the roof structure above foam 546 providing a "cold roof." Building module 500 also shows a window 554 in fragment, a floor 551, a floor joist 553, and a plumbing pipe 531.

Figure 12:
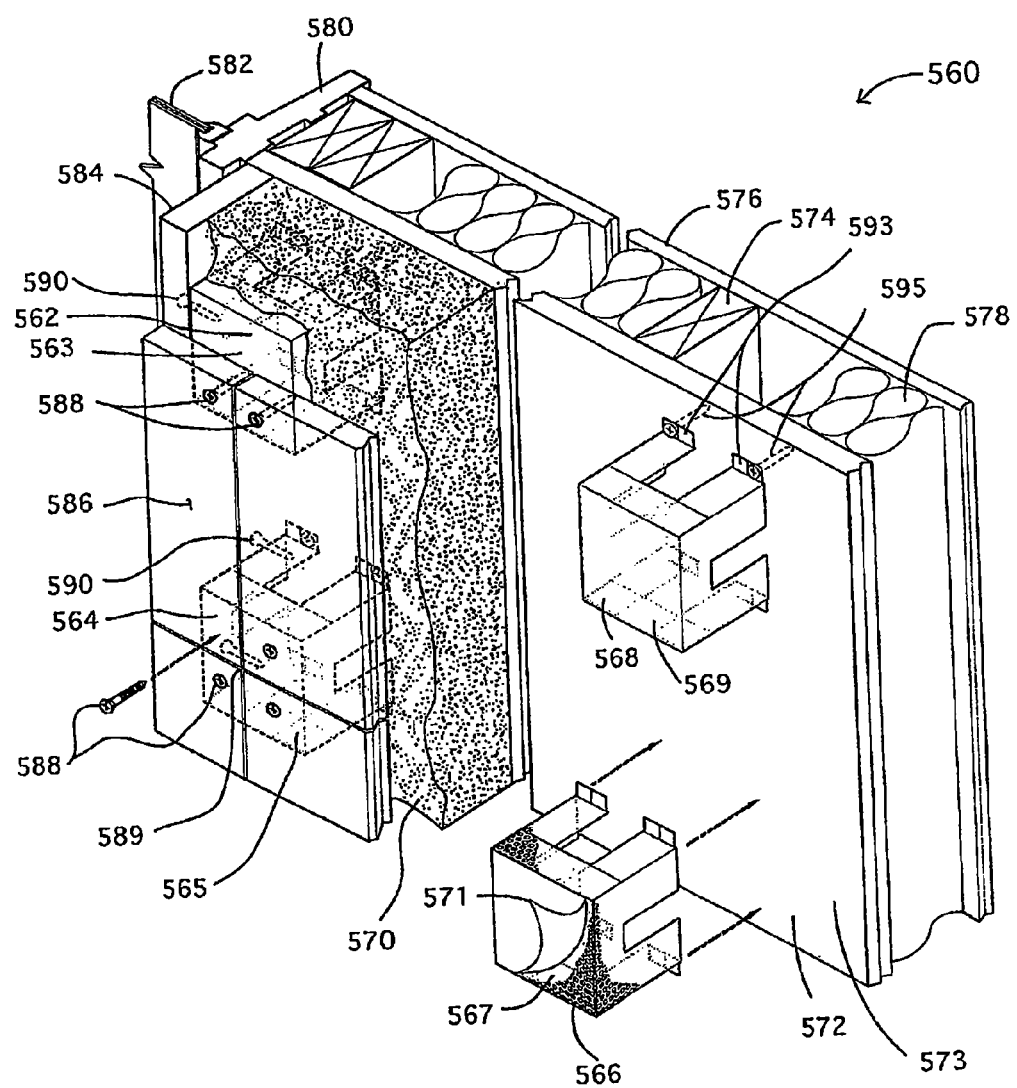
FIG. 12 is a broken, perspective view of yet another embodiment of a building module according to the present disclosure utilizing a plurality of the bracket of the type set forth in FIG. 8.

An embodiment of a building module according to the present disclosure is depicted in FIG. 12 and generally reference by the numeral 560. Module 560 has a rigid inner construction panel 572 defining a planar surface 573. Panel 572 has a plurality of rigid brackets 562, 564, 566, and 568, each of which is affixed to planar surface 573 by screws through fastening tabs on the legs, such as by way of example with screws 595 through fastening tabs 593 in bracket 568. The remaining brackets have corresponding fastening tabs and screws. Exterior construction panel 586 is shown in fragment as affixed to brackets 562 and 564 via screws 588. Panel 586 is also shown in four discrete sections with a point of intersection at 589. Bracket 562 has a side construction panel 584 affixed to it via screws 590. Bracket 562, 564, 566, and 568 correspond in type and structure to bracket 400 in FIG. 8. The four brackets shown are merely illustrative of the number of brackets that can be employed. Fewer or greater numbers of brackets are possible depending on the application. Brackets 562, 564, 567, and 568 define planar surfaces 563, 565, 565, and 569 thereon, respectively, which are adapted to receive panel 586. Bracket 566 shows by way of example the perforated structure of all of the brackets. A rigid, spray foam 570 is contiguous to and substantially covers planar surface 573 of inner panel 572 and contacts and embeds brackets 562, 564, 566, and 568 except for planar surfaces 563, 565, 565, and 569. Bracket 566 also shows by way of example a release or adhesive liner 571, which can be peeled to expose planar surface 567. Liner 571 protects planar surface 567 from being covered over or impinged by foam 570 when foam 570 is applied to planar surface 573. As an alternative to or in addition to a liner, a sheet-like barrier of a paper-based or plastic material can be placed within a bracket on the underside of the planar surface thereof. The embodiment has ancillary structure in the form of interior construction panel 576, studs 574, batt insulation 578, window jamb 580, and window 582.

Figure 13:
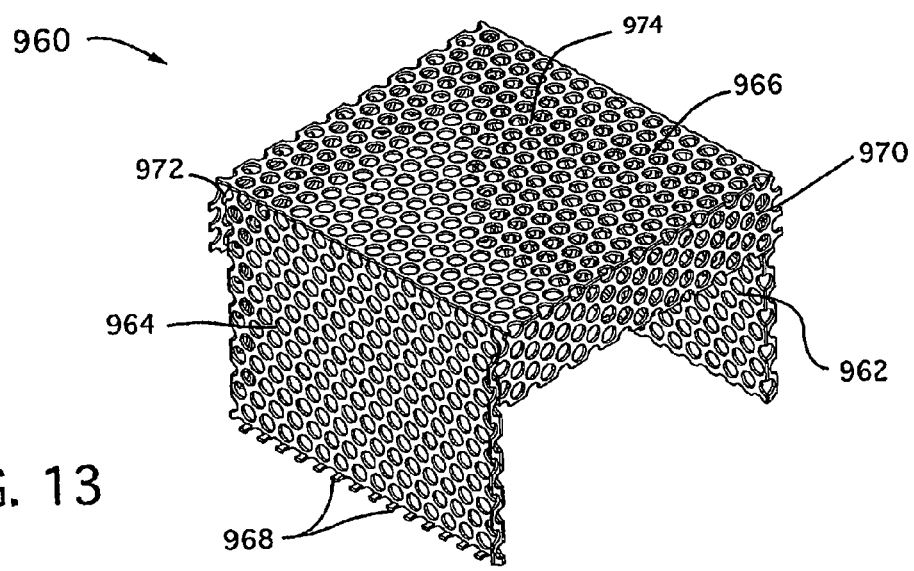
FIG. 13 is a first perspective view of a component of a bracket useful in a building module according to the present disclosure.
Figure 14:
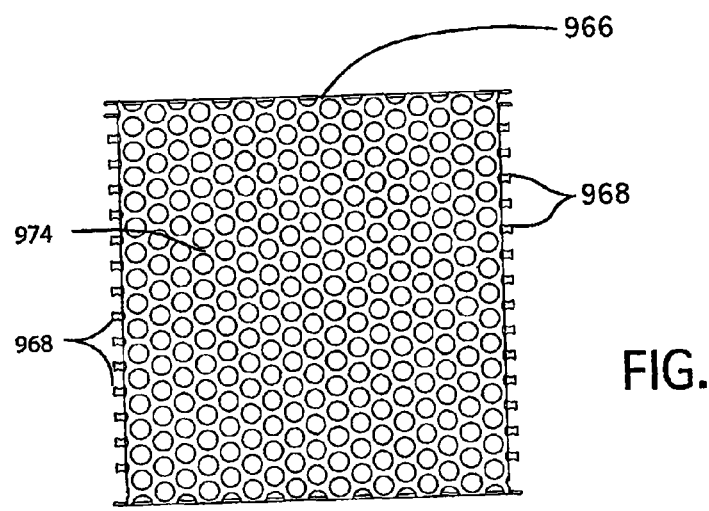
FIG. 14 is a plan view of the component of FIG. 13.

A bracket component useful in forming a bracket useful in a building module of the present disclosure is depicted in FIGS. 13 and 14 and generally referenced by the numeral 960. Bracket component 960 is constructed entirely of a flexible perforated metal, such as galvanized or stainless steel, and is preferably formed from a single, integral piece of perforated metal (not shown). The perforations therein take the form of a plurality of orifices therein and therethrough. Bracket component 960 has a first platform 966 that bears a perforated first planar surface 974. Bracket component 960 has first and second overlap members 970 and 972 that are preferably integral to platform 966 and provide additional strength and rigidity to bracket 960. Bracket component 960 has first and second sides 962 and 964 appending generally perpendicularly from platform 966 and extending away from first planar surface 974. Sides 962 and 964 define first and second groups of protrusions 968, respectively, extending generally perpendicularly therefrom. The first and second groups of protrusions 968 extend generally away from each other.

Figure 15:
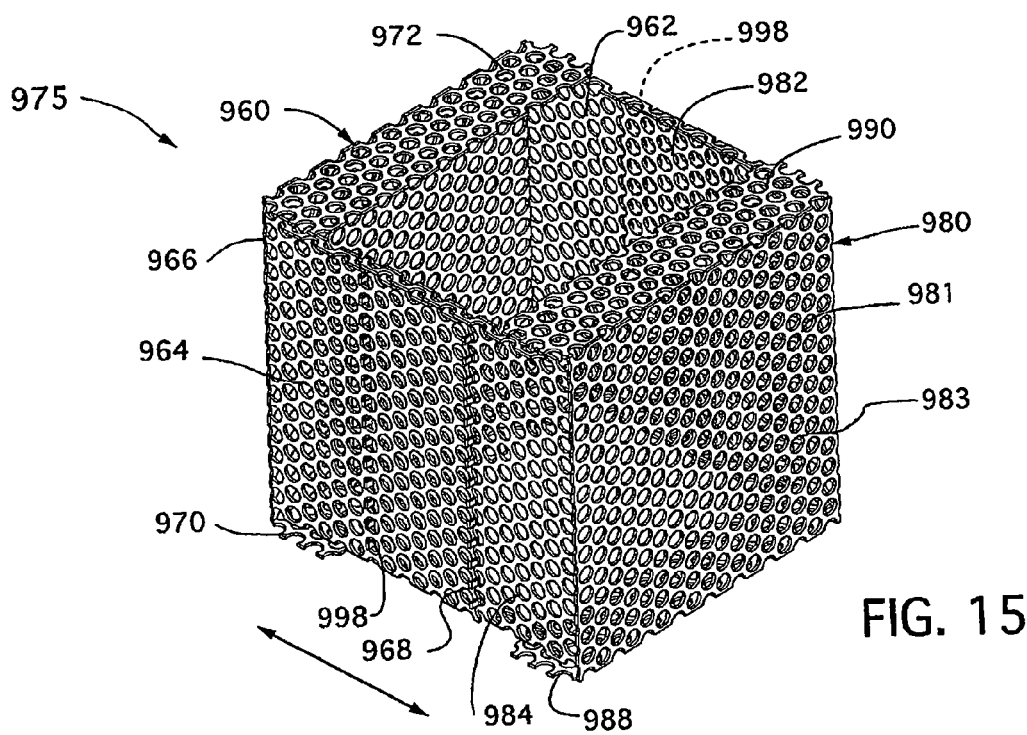
FIG. 15 is a first perspective view of a bracket formed from two of the components of FIG. 13 useful in a building module according to the present disclosure.

Another bracket useful in the building module of the present disclosure is depicted in FIG. 15 and generally referenced by the numeral 975. Bracket 975 is also shown attached to a wall 994 in FIG. 16. Bracket 975 is formed by mating two of bracket component 960 of FIG. 13. For purposes of clarity, only one of the bracket components is indicated by the numeral 960, while the mating bracket component is indicated by the numeral 980 and has a structure analogous to that of bracket 960. Bracket component 980 has a second platform 981 that bears a perforated second planar surface 983. Bracket component 980 has third and fourth overlap members 988 and 990 that are preferably integral to second platform 981 and provide additional strength and rigidity to component 980. Bracket component 980 has third and fourth sides 982 and 984 extending away from second platform 981 and second planar surface 983. Third and fourth sides 982 and 984 have third and fourth groups of protrusions 998 extending therefrom, respectively, preferably generally perpendicularly outward therefrom and the third and fourth groups of protrusions 998 extend generally away from each other. Bracket component 980 is composed of the same material as bracket component 960.

Bracket components 960 and 980 can be interlocked by pressing inward sides 962 and 964 of component 960 and inserting component 960 into component 980. Components 960 and 980 are flexible to a degree sufficient to enable them to be manipulated by hand yet provide a bracket of sufficient strength to function in a building module. Protrusions 998 of inserted component 980 interlock with orifices at sides 962 and 964 of mating component 960 to ensure interlocking of components 960 and 980.

Figure 16:
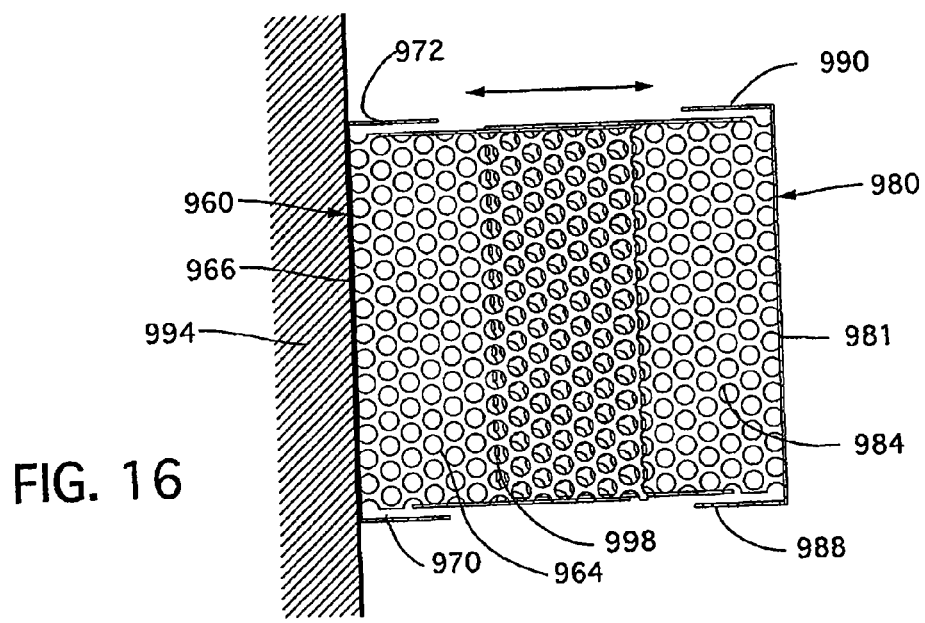
FIG. 16 is a side view of the bracket of FIG. 15 attached to a wall.

The formed bracket 975 can be affixed to wall 994 as shown in FIG. 16. Bracket 975 may be affixed by any means known in the art, such as screws, nails, and staples (not shown) using the plurality of orifices in platform 966. Alternately, adhesives may be employed.

Figure 17:
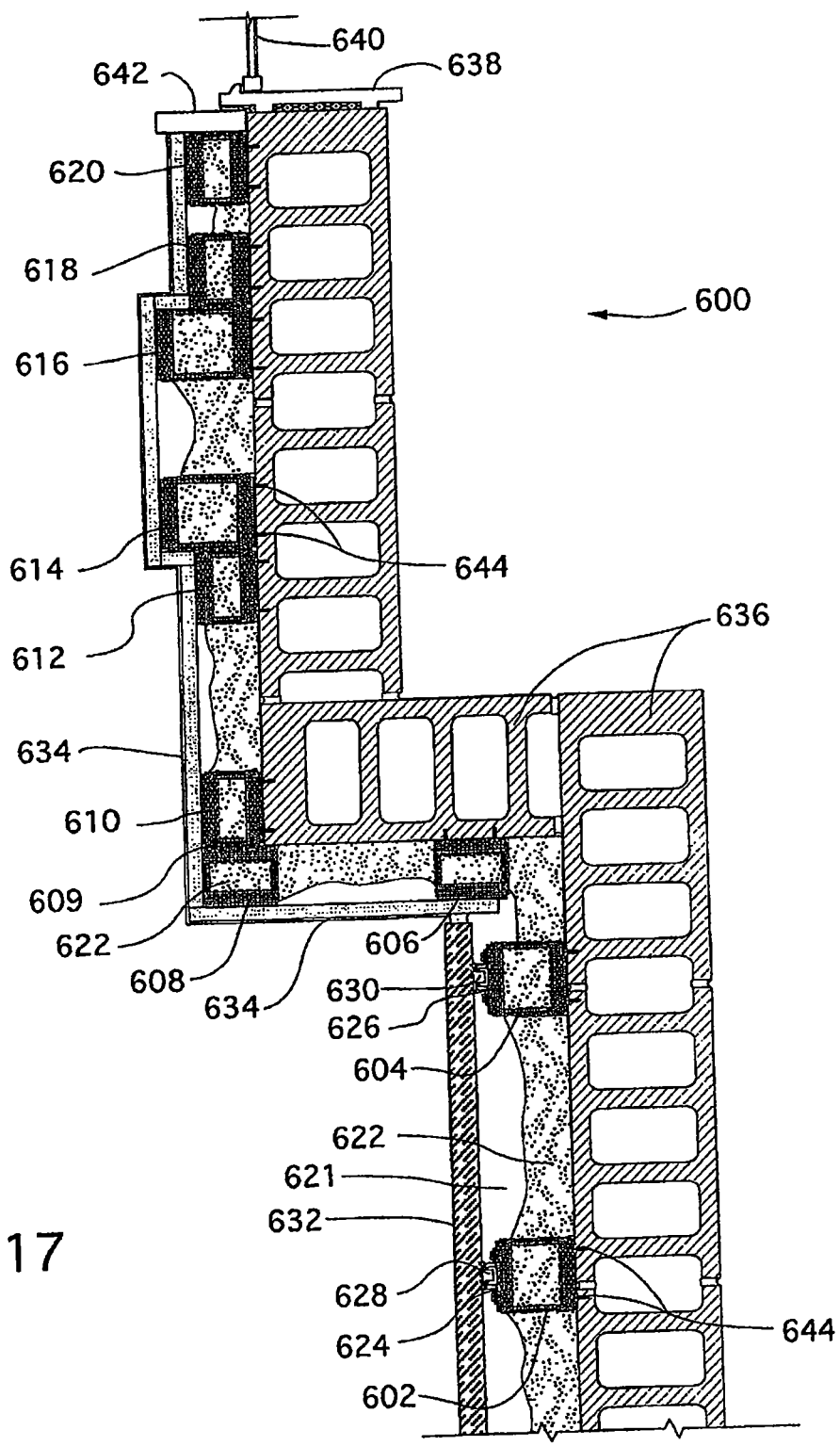
FIG. 17 is a broken, plan view of an embodiment of a building module according to the present disclosure utilizing a plurality of the bracket of the type set forth in FIG. 15.

An embodiment of a building module according to the present disclosure is depicted in FIG. 17 and generally reference by the numeral 600. Module 600 has a rigid wall of a plurality of concrete blocks 636. Module 600 has a plurality of rigid brackets 602, 604, 606, 608, 610, 612, 614, 616, 618, and 620 affixed to a concrete wall formed by a plurality of concrete blocks 636 via a plurality of screws 644. Bracket 608/610, 612/614, and 616/618 are also laterally affixed to each other. The several brackets are of the type depicted in FIG. 15. A rigid, spray foam 625 embeds at least 60% of the depth of brackets 602, 604, 606, 610, 612, 614, 616, 618, and 620 and embeds or fills 100% of the inside of the brackets. The gaps between foam 622 and exterior panels 632 and 634 take the form of airspaces 621, which function as a rainscreen and providing ventilation behind exterior panels 632 and 634. Exterior panel 632 is a heavy marble panel and is affixed to brackets 602 and 604 via male latches 628 and 630, which mate with female grooves 624 and 626 affixed to brackets 602 and 604. There is additional structure shown in FIG. 17 in the form of window 640, window jamb 638, and extension casing 642.

Figure 18:
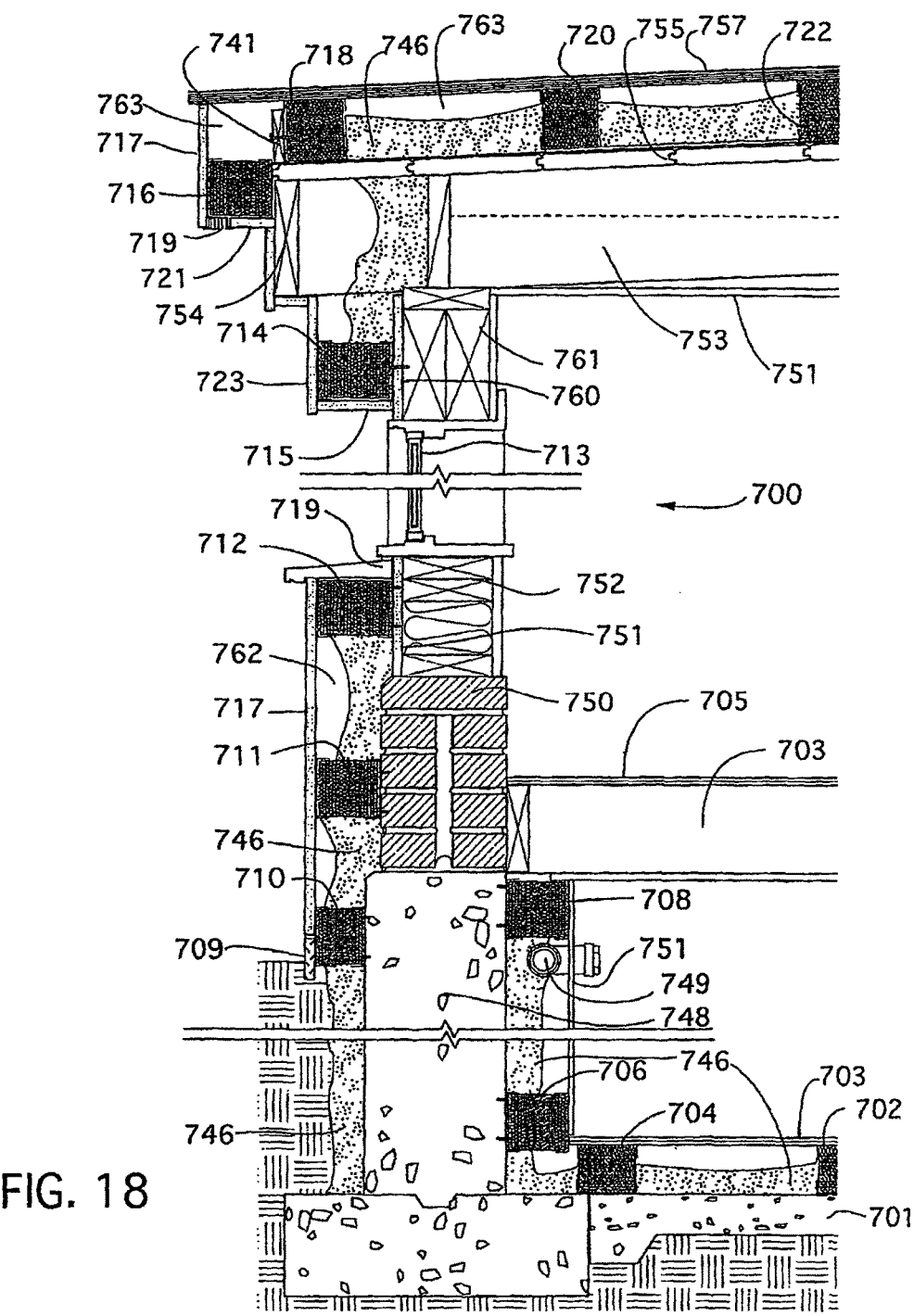
FIG. 18 is a broken, vertical section view of another embodiment of a building module according to the present disclosure re utilizing a plurality of the bracket of the type set forth in FIG. 15.

An embodiment of a building module according to the present disclosure is depicted in FIG. 18 and generally referenced by the numeral 700. Module 700 has brackets 702, 704, 706, 708, 710, 711, 712, 714, 716, 718, 720, and 722. The several brackets are of the type and structure depicted in FIG. 15. The several brackets are affixed with various types of screws to planar or uneven surfaces of various construction materials. Brackets 702 and 704 elevate, level, and insulate a floor 703 above a basement slab 701 and are affixed to slab 701 via screws. Insulation and waterproofing is provided throughout module 700 by spray foam 746. Brackets 706, 708, and 710 are secured to a cement foundation 748 via screws and provide support for exterior panel 717 and interior panel 751. Bracket 711 is secured to masonry 750 via screws and provides support for panel 717. Bracket 712 is secured to interior panel 751 and optionally further to wood blocks 752 via screws or adhesive laterally to window sill 719. Bracket 714 provides support for external panel 721 and lateral support for external soffit panel 715. Bracket 714 is secured to innerpanel 760 and optionally further to wood header 761. Bracket 716 provides support for external panel 717 and lateral support for external soffit panel 723. Brackets 718, 720, and 722 provide support for roof panel 757, and bracket 718 further provides lateral support for foam stop 741. Bracket 716 is secured via screws (not shown) to rim joist 754. Vent 719 provides ventilation to the general roof structure and is considered a cold roof in the industry. The gaps between foam 746 and roof panels 757 take the form of vent space 763, and the gaps between foam 746 and the several exterior panels and structures take the form of vent space 762. The vent spaces act as a rainscreen by providing draining directly to ground below bracket 710. Building module 700 also shows a window 713 in fragment, a floor 70S, a basement floor 703, a ceiling panel 751, a roof joist 753, and a plumbing pipe 749.

Figure 19:
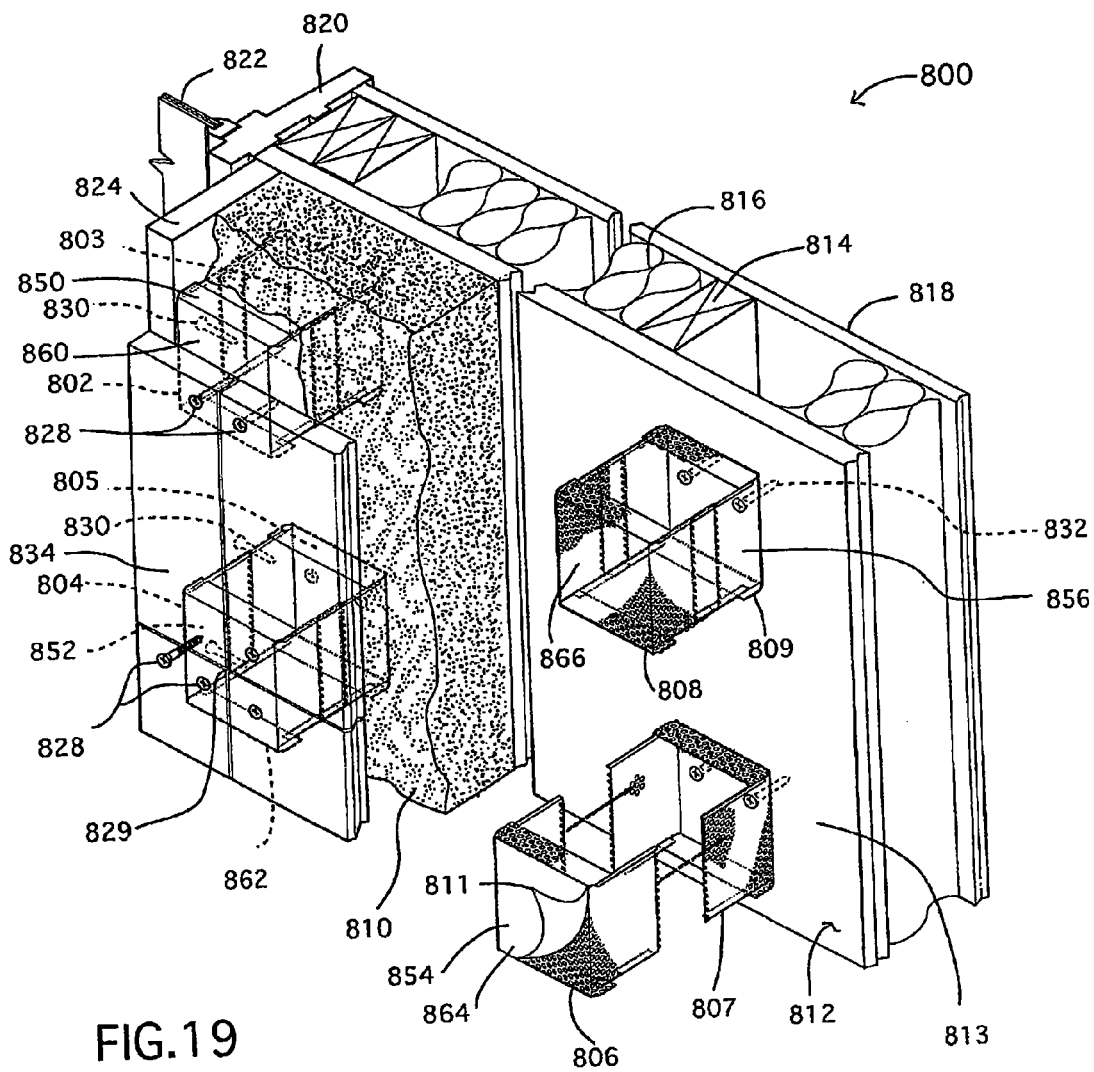
FIG. 19 is a broken, perspective view of yet another embodiment of a building module according to the present disclosure utilizing a plurality of the bracket of the type set forth in FIG. 15.

An embodiment of a building module according to the present disclosure is depicted in FIG. 19 and generally reference by the numeral 800. Module 800 has a rigid interior construction panel 812 defining a planar surface 813. Panel 812 has a plurality of rigid brackets 850, 852, 854, and 856, affixed to planar surface 813 by screws, such as by way of example with screws 832. Exterior construction panel 834 is shown in fragment as affixed to brackets 850 and 852 via screws 828. Panel 834 is also shown in four discrete sections with a point of intersection at 829. Brackets 850 and 852 are also affixed to a side window extension casing construction panel 824 via screws 830. Bracket 850, 852, 854, and 856 correspond in type and structure to bracket 975 in FIG. 15. The four brackets shown are merely illustrative of the number of brackets that can be employed. Fewer or greater numbers of brackets are possible depending on the application. Bracket 850 is made up of mating components 802 and 803. Bracket 852 is made up of mating components 804 and 805. Bracket 854 is made up of mating components 806 and 807. Bracket 856 is made up of mating components 808 and 809. Brackets 850, 852, 854, and 856, define planar surfaces 860, 862, 864, and 866 thereon, respectively, which are adapted to receive external panel 834. Bracket 854 illustrates, by way of example, the perforated structure of all of the brackets. A rigid, spray foam 810 is contiguous to and substantially covers planar surface 813 of inner panel 812 and contacts and embeds brackets 850, 852, 856, and 858 except for planar surfaces 860, 862, 864, and 866.

Bracket 854 also shows be way of example a release or adhesive liner 811, which can be peeled to expose planar surface 864. Liner 811 protects planar surface 864 from being covered over or impinged by foam 810 when foam 810 is applied to planar surface 813. As an alternative to or in addition to a liner, a sheet-like barrier of a paper-based or plastic material can be placed within a bracket on the underside of the planar surface thereof. The embodiment has ancillary structure in the form of interior construction panel 818, studs 814, batt insulation 816, window jamb 820, and window 822.

Figure 20:
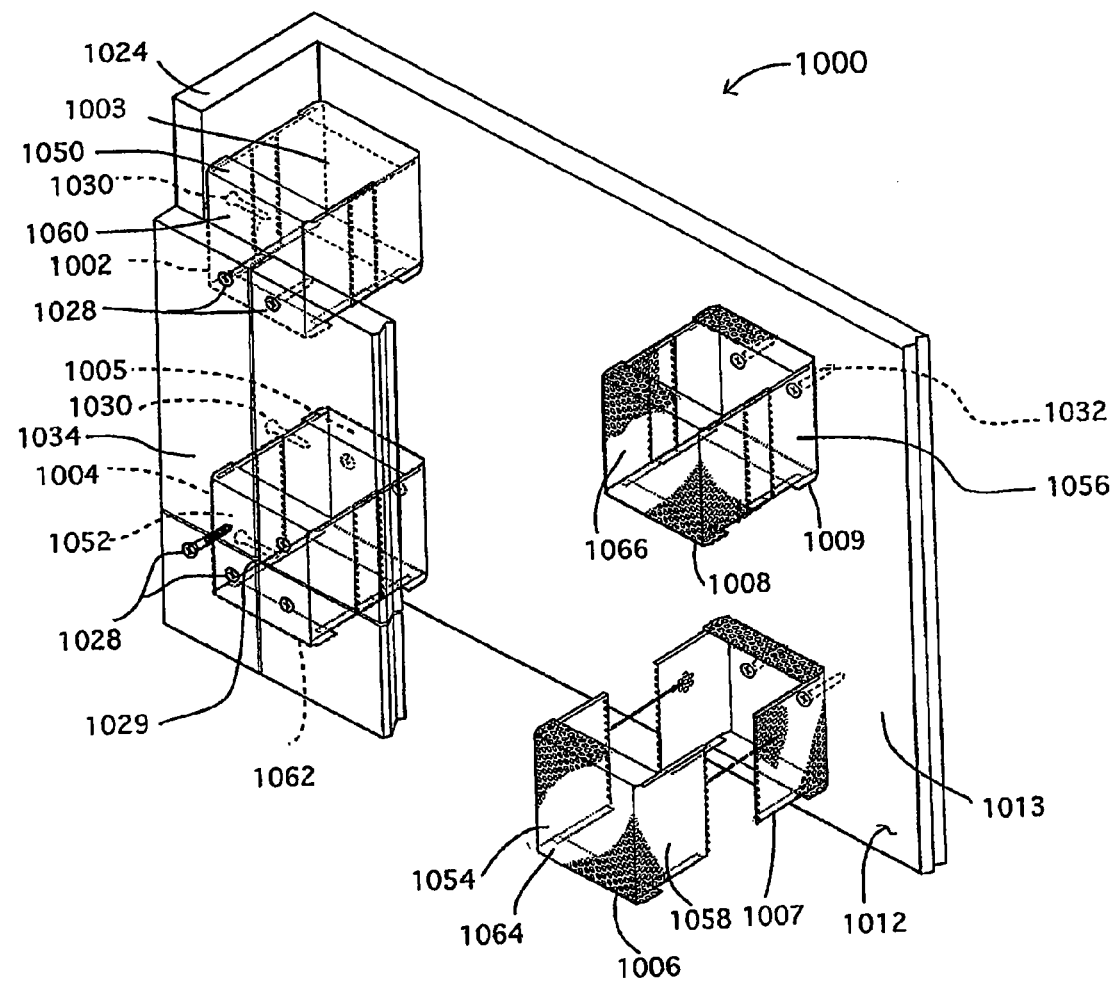
FIG. 20 is a broken, perspective view of another embodiment of a building module according to the present disclosure using a plurality of brackets of the type set forth in FIG. 15.

An embodiment of a building module according to the present disclosure is depicted in FIG. 20 and generally referenced by the numeral 1000. Module 1000 has an inner construction panel 1012 defining a planar surface 1013. Panel 1012 has a plurality of rigid brackets 1050, 1052, 1054, and 1056. Bracket 1050 is made up of mating components 1002 and 1003. Bracket 1052 is made up of mating components 1004 and 1005. Bracket 1054 is made up of mating components 1006 and 1007. Bracket 1050 is made up of mating components 1008 and 1009. Brackets 1050, 1052, 1054, and 1056 define planar surfaces 1060, 1062, 1064, and 1066 thereon, respectively, which are adapted to receive exterior panel 1034.

Brackets 1050, 1052, 1054, and 1056 are affixed to planar surface 1013 by screws 1032. Exterior panel 1034 is affixed to brackets 1050 and 1052 via screws 1028. Panel 1034 is also shown in four discrete sections with a point of intersection 1029. Brackets 1050 and 1052 are also affixed to a side panel 1024 via screws 1030. If desired, screws can be replaced by other mechanical fasteners or by adhesives. Brackets 1050, 1052, 1054, and 1056 depicted in FIG. 20 correspond in type and structure to bracket 975 in FIG. 15. The brackets disclosed in FIGS. 1A/1B, 2A/2B, and FIG. 8 may be substituted for brackets 1050, 1052, 1054, and 1056 as desired. Module 1000 differs from other module embodiments disclosed herein in that no foam or adhesive is used to fill in brackets 1050, 1052, 1054, and 1056 or to cover the remainder of planar surface 1013. In module 1000, brackets 1050, 1052, 1054, and 1056 are used without the structural reinforcing provided structural foam or adhesives. The inherent structural rigidity of brackets 1050, 1052, 1054, and 1056 provides substantially the sole support for external panel 1034. External panel 1034 is merely illustrative of conventional construction and finishing materials and structures that can be attached to the brackets. Examples include walls, roofs, ceilings, and machine or scaffolding.

The planar, exposed face or surface of an individual bracket is typically substantially smaller than the surface of the construction panel to which it is affixed. Preferably, the planar surface of each bracket will be about 9 square inches or more. More preferably, the planar surface of each bracket will be about 16 square inches to about 25 square inches. The planar surface each of the brackets will typically be large enough to provide an area sufficiently large to provide for easy and effective application of mechanical fasteners from the exterior sheathing or finish panel into the bracket. The planar surface of the bracket will typically be small enough to avoid bracket size that is unwieldy to manipulate and to minimize insulation loss as the bracket is typically composed of a solid material that has a higher thermal conductivity than foam.

The bracket can be made of any rigid construction material. Useful materials include metals and plastics. Plastics can be formulated to be rigid and exhibit relatively low thermal conductivity compared to other materials. Useful plastics include acrylonitrile-butadienestyrene (ABS), polypropylene, and polycarbonates. Plastic brackets can be formed by any process known in the art, such as injection molding or stamping. A useful metal is galvanized or stainless steel. Metal brackets can be formed by any process known in the art, such as stamping. Metal brackets are typically formed from metal sheet of a thickness such that it can be stamped and/or bended to form a desired configuration. Perforated metal sheet is a preferred starting material. A useful perforated metal sheet has orifices therein and therethrough such that foam can expand through the orifices to enhance immobilization of the bracket.

The spacing of brackets will vary depending on the application. In conventional applications of exterior sheathing to stud walls and masonry walls, brackets will typically be placed about 16 inches to about 24 inches apart. In module applications when heavy exterior masonry finishes are to be applied, steel brackets of larger gauge are preferably affixed to external sheathing using more fasteners. The brackets and the foam/adhesive matrix together transfer the weight of the finish material to the load bearing structure of the inner panel, e.g., a wall. The bracket allows attachment of exterior sheathing, e.g., finish panels and materials, around corners, windows, doors, columns, roof coping, and ridges. The completed module can provide an insulating, weather-resistant, waterproofing, and air-tight envelope around a building. Brackets are adjustable to plumb walls, level floors and ceilings, and slope roofs.

Any mechanical fastener known in the art may be used in the module to affix the brackets to inner structural panels, exterior sheathing or cladding, or other construction or structural surfaces. Examples of useful mechanical fasteners include screws, bolts, and staples. Alternately, adhesives such as polyurethane foam adhesives may be employed.

The interior construction panel of the module can be a new or existing wall structure. The construction panel of the module can be any rigid structural wall, floor, or roof construction material known in the art to which the bracket can be affixed. Examples of suitable inner panel materials include, but are not limited to, concrete slabs, concrete block walls, wood plank, wood frame, plywood, oriented strand board, roof shingles, tiles, metal roofs, masonry, stucco and concrete. Similarly, the outer surface panel of the module can be any exterior or interior sheathing and finish materials known in the art that can be affixed to the bracket. Examples include, but are not limited to, wood plank, plywood, cement board, stucco finish, gypsum board, masonry, stone, stucco, concrete panels, metal panels, glass, solar panels, and metal panels. Existing loosely attached siding, such as that of vinyl and aluminum, and wood shingles, should be removed to expose the structural surface below before fastening the brackets. If the building module is being constructed over structurally sound existing exterior sheathing or masonry of a building, then the existing exterior sheathing essentially functions as the interior construction panel of the new building module, which will have new sheathing or finish panels at its exterior.

The building module of the present disclosure may be used essentially anywhere in the construction of a building. The module may be used for insulating and finishing floors, walls, ceilings, and roofs. It can frame around corners, windows, doors, columns, basement pipes, and parapets.

Foams useful in the building module of the present disclosure are closed-cell, spray foams, i.e., foam-in-place and pour-in-place thermoset foams. The term "spray foam" is understood herein to be inclusive of any of the foregoing thermoset foams. Such foams are advantageous because they enhance the structural rigidity of the module, as well as provide insulation value. The foams also form a continuous air and water barrier envelope around the structure. Foams physically immobilize and structurally support the brackets and greatly reduce thermal conductivity compared to conventional construction assemblies in which insulation is between studs in walls. Studs are thermal bridges that conduct and waste heat. The foam also prevents deflection of the brackets under stress. Preferred foams are closed-cell polyisocyanurate/polyurethane foams. Preferably, the foam will have a density of about 2 to about 3 pounds per cubic foot with an R-value of 6 to 7 per inch. Preferably, the foam will exhibit a tensile strength of about 25 pounds per square inch or more and exhibit superior adhesive qualities to form permanent bonds to the inner construction surface of the module. When applied properly, spray foam will adhere to surfaces in a manner similar to adhesives. While foam thickness can vary considerably, it is particularly desirable to apply foam at least 1½ inches thick to help prevent condensation and to structurally engage and support the bracket. For most applications, a thickness of 2½ to 4½ inches is particularly desirable to provide a high level of structural strength for the brackets and the foam assembly. It is particularly desirable to embed about 70% of the depth of the bracket with foam, which provides high levels of insulation and structural strength yet provides an air gap for ventilation purposes between the foam and the outer panel. 2½ inches of foam can provide an insulation value of R-16 for walls and floors, while inches can provide R-24 for roofing applications.

Foam-in-place foams can be applied by any means known in the art, such as pouring or spraying. On a building site, spraying will usually be the preferred method of application of a partially complete module if it has already been erected or is otherwise vertically positioned. Pouring is suitable if the module is being manufactured in a flat or horizontal position for subsequent erection or placement. Preferably, the foam is applied such that it first fills the bracket then is applied to the surface of the inner panel of the modules. This will also embed a part or more of the depth of the bracket to a desired depth. Embedding to about 60% to about 90% of the depth of the bracket is preferred. When applying the foam, it may be desirable to use release paper on the planar surface of the bracket to ensure easy removal of overspray and provide a clean surface to attach exterior or finish panels. In some embodiments, it may be desirable to leave an air space between the foam and the external panel or sheathing to allow for the movement of moisture and air. In other embodiments of the module, if the external panel is installed before the foam is poured, it may be desirable to completely fill the bracket and the area surrounding it with foam as there will be the form space between the inner panel and the external panel to be filled with foam.

As an alternative to the use of insulating foams, adhesives may be used. Adhesives may be applied, e.g., sprayed or poured, onto the planar surface of the inner construction panel so as to form a matrix or layer. On a building site, spraying will usually be the preferred method of application of a partially complete module if it has already been erected or is otherwise vertically positioned. Pouring is suitable if the module is being manufactured in a flat or horizontal position for subsequent erection or placement. Preferably, the adhesive is applied such that it surrounds and embeds a major part or more of the depth of the bracket. Preferably, the adhesive is applied so that the planar, exposed surface of the bracket, i.e., the surface facing outward or away from the construction panel, is substantially free of adhesive so that there will be a clean surface against which to affix or attach exterior sheathing. Foams are preferred over adhesives since they provide greater insulation value. When applying foam or an adhesive, it may be desirable to use release paper on the planar surface of the bracket to ensure easy removal of overspray.

Useful classes of adhesives include, for example, polyurethane-based foam adhesives.

As an alternative to using insulating foams and adhesives that supplement the inherent strength of the bracket, the brackets may be used without any additional structural stiffening, providing that the bracket is within the allowable structural tolerance rating of that bracket without the improved strengthening afforded to the module assembly if the bracket was embedded with structural foams or adhesives.

When attached to a structural panel or other surfaces with appropriate fasteners and or adhesives the brackets inherent structural integrity bears the weight of any objects, within the rated capacity of the bracket design. Panels or other objects can be attached to the face plane, or to the top, bottom, or sides of the brackets. The bracket may be first fastened to a floor, or attached to a wall, roof, ceiling, machine or scaffolding. External panels are examples of one of many objects and structures that can be attached to the bracket.

Another bracket useful in the building module of the present disclosure is depicted in FIGS. 21 and 22 and generally referenced by the numeral 1100. Bracket 1100 is constructed entirely of metal, such as aluminum, stainless steel or other rigid material, and is preferably formed by extrusion or casting. Bracket 1100 has a platform 1112 that bears a planar surface 1114.

Bracket 1100 has two sides 1116 and 1118 appending substantially equilaterally from platform 1112 and extending away from planar surface 1114. Sides 1116 and 1118 define base flanges 1120 and 1122 at their distal ends.

Anchor portions 1135 and 1136 are located in proximity to the intersections or interfaces of platform 1112 and sides 1116 and 1118 and run continuously along the width of platform 1112. Anchor portions 1135 and 1136 provide a convenient anchoring position from directions perpendicular to anchor portions 1135 and 1136 for the clamp end of retractable tape measures (not shown in FIGS. 21 and 22), which are commonly used in construction applications in determining proper spacing between brackets. Embodiments of a bracket s showing the interaction of clamp ends of retractable tape measures is shown and described below for FIG. 26.

A measuring aid, in the form of a recess 1113, extends therein and therealong the width of platform 1112 at the center axis thereof and has a raised knob 1115 at the center of the recess 1113, extending therefrom perpendicularly with respect to platform 1112. Raised knob 1115 is useful for measuring to or from the center of bracket 1100 and for positioning outer construction panels or joints adjacent to platform 1112. Raised knob 1115 provides an anchor for caulking and adhesives at joints between outer construction panels commonly placed at the center of platform 1112. An embodiment of a bracket showing the interaction of clamp ends of retractable tape measures and for caulking joints at the raised knob is shown and described below in building modules in FIGS. 26 and 27.

Sides 1116 and 1118 define base flanges 1120 and 1122, respectively, at their distal ends. Base flanges 1120 and 1122 take the general shape of an arcuate well 1121 and 1123, respectively. Sides 1116 and 1118 define inner portions 1128 and 1130, respectively, bottom portions 1124 and 1125, respectively, and outer portions 1126 and 1128, respectively. Base flanges 1120 and 1122 also define a plurality of knob portions 1133 and 1134, respectively, that extend thereunder and therealong. Knob portions 1133 and 1134 provide thermal breaks and airspaces between base flanges 1120 and 1122 and any adjacent substrate (not shown). Additionally, base flanges 1120 and 1122 further define shelf portions 1127 and 1129, respectively, which extend inward and upward within bracket 1100. Self tapping screws (not shown) can be driven through multiple interfaces in base flanges 1120 and 1122 to fasten bracket 1100 to substrates such as inner construction panels. The interface chosen may depend upon which is the easiest to reach with a screw-driving gun or which affords the best angle of screw penetration into the substrate. Embodiments showing brackets fastened to substrates by screws are seen in FIGS. 26 to 29 and are described below.

Figure 28:
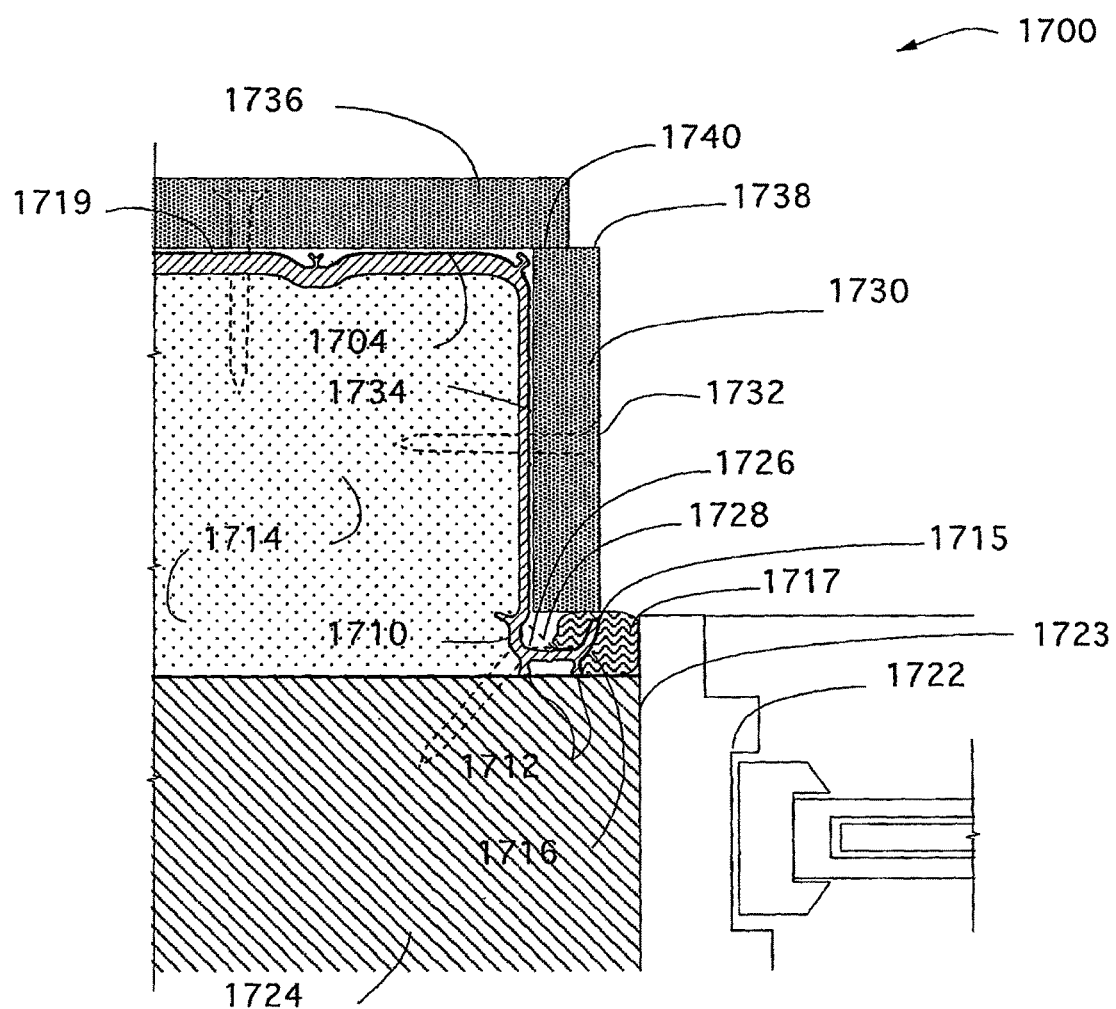
FIG. 28 is a fragmentary, cross-sectional view of another embodiment of a building module according to the present disclosure utilizing a bracket of the type set forth in FIGS. 21 and 22.

Outer portions 1126 and 1128 provide elevated leveling surfaces 1137 and 1138, respectively, at their distal ends for fastening or retention of casing or other finish materials (not shown) to bracket 1100. Elevated leveling surfaces 1137 and 1138 prevent protruding screws heads or other fastener heads in base flanges 1120 and 1122 from interfering with the leveling of casing or other finish materials. An example of a casing perched on a leveling surface of a bracket is shown in FIG. 28 and is described below.

Figure 23:
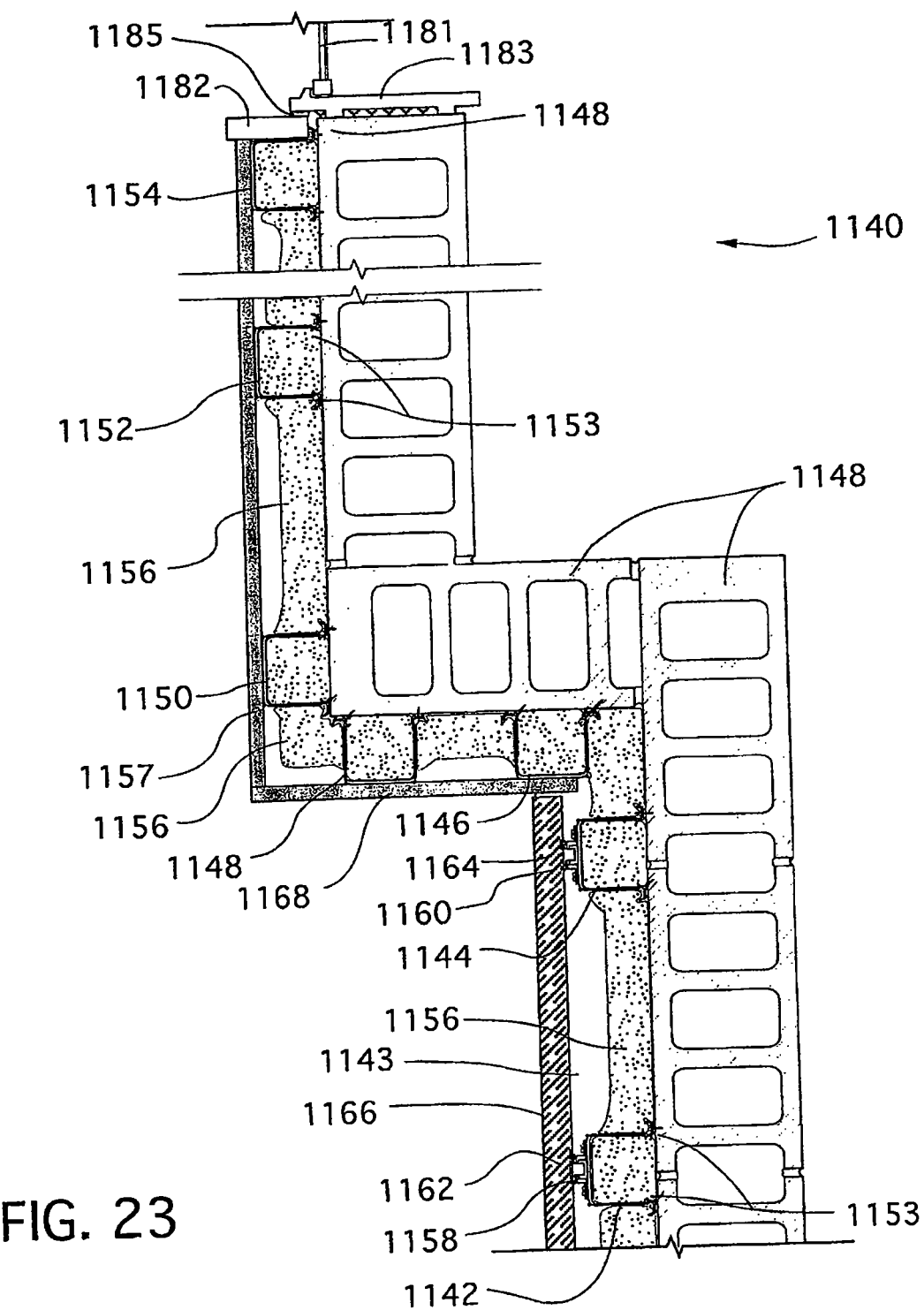
FIG. 23 is a broken, plan view of an embodiment of a building module according to the present disclosure utilizing a plurality of the bracket of the type set forth in FIGS. 21 and 22.

An embodiment of a building module according to the present disclosure is depicted in FIG. 23 and generally reference by the numeral 1140. Module 1140 has a rigid wall of a plurality of concrete blocks 1148. Module 1140 has a plurality of rigid brackets 1142, 1144, 1146, 1148, 1150, 1152, and 1154 affixed to the concrete block wall via a plurality of screws 1153 at the base flanges of the several brackets. The several brackets are of the type and structure depicted in FIGS. 21 and 22. A rigid, spray foam 1156 embeds at least a major part of the depth of the several brackets. The gaps between foam 1156 and exterior panels 1166, 1168, and 1180 take the form of airspaces 1143, which function as a rainscreen behind the exterior panel 1166 and 1168 by providing ventilation behind the exterior panels. Exterior panel 1166 is affixed to brackets 1142 and 1144 via male latches 1162 and 1164, which mate with female grooves 1158 and 1160 affixed to brackets 1142 and 1144. There is additional structure shown in FIG. 23 in the form of a window 1181, a window jamb 1183, and a window jamb extension casing 1182.

Caulking 1185 can be applied between the window jamb extension 1182 and existing block structure 1148. A base flange 1155 of bracket 1154 provides ⅜ inch spacing for waterproof caulking. Base flanges 1151 and 1153 of bracket 1152 define knob portions (not shown) thereunder to provide a ⅛ inch thick air space and thermal break between 90% of the outer flanges bottom and the inner construction panel. This airspace reduces the conductivity of heat from the inner construction panel 1148 through base flanges 1151 and 1153 by approximately 70%.

Figure 24:
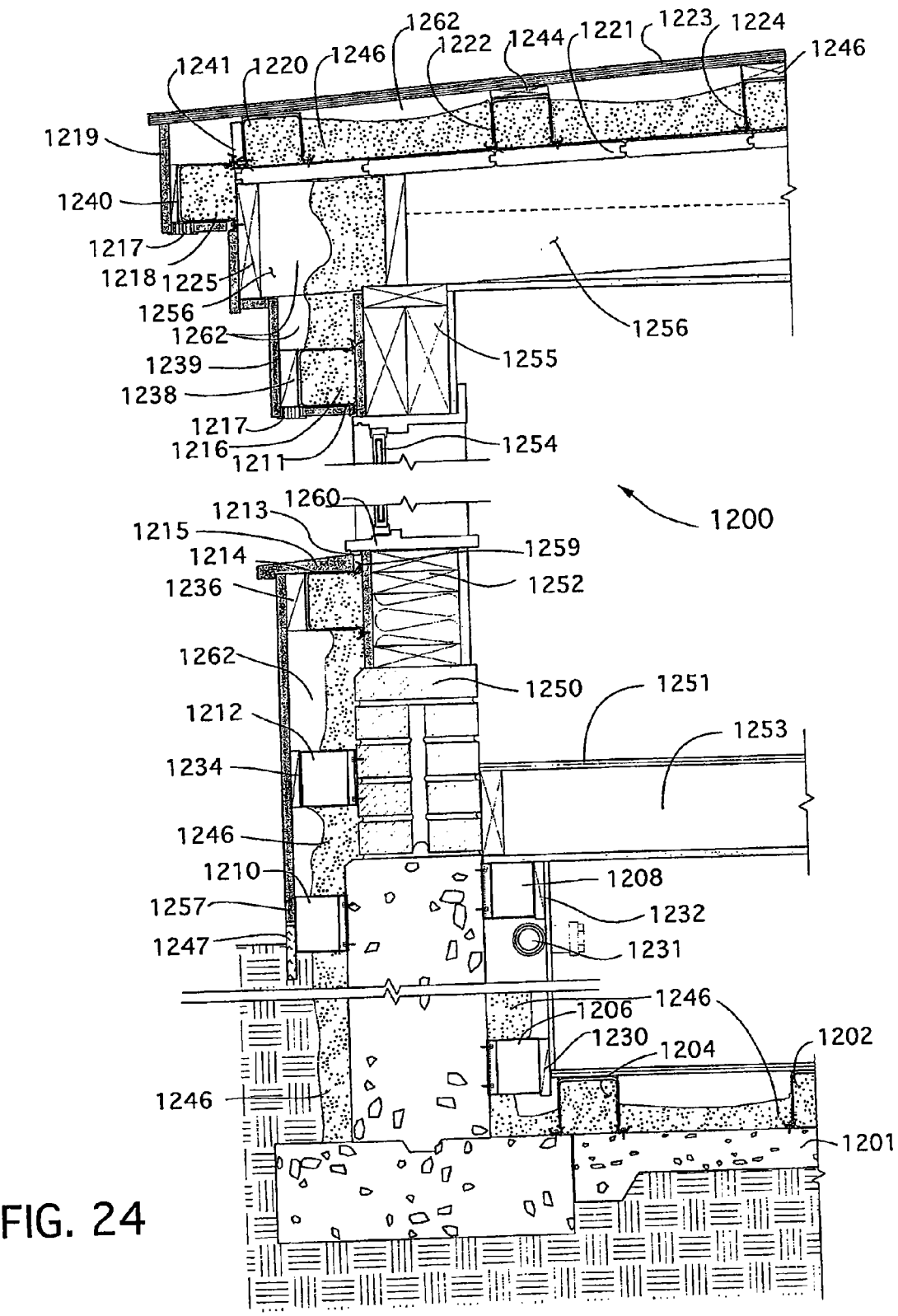
FIG. 24 is a broken, vertical section view of another embodiment of a building module according to the present disclosure utilizing a plurality of the bracket of the type set forth in FIGS. 21 and 22.

An embodiment of a building module according to the present disclosure is depicted in FIG. 24 and generally referenced by the numeral 1200. Module 1200 has brackets 1202, 1204, 1206, 1208, 1210, 1212, 1214, 1216, 1218, 1220, 1222, and 1224. The several brackets are of the type depicted in FIGS. 21 and 22. The several brackets are affixed with various types of screws to planar or uneven surfaces of various construction materials. Brackets 1202 and 1204 elevate, level, and insulate a floor above a basement slab 1201 and are affixed to slab 1201 via screws. Insulation and waterproofing is provided throughout module 1200 by spray foam 1246. Bracket 1210 is secured to a cement foundation via screws and provides support for an external panel 1257 and a flexible rubber sub-grade panel 1247. Bracket 1212 is secured to masonry 1250 via screws and provides support for panel 1257 in conjunction with block 1234, which allows alignment of external panel 1257 from bracket 1212 if necessary. Bracket 1214 is secured in vertical orientation to block 1252 via screws, and window sill 1215 is fastened to bracket 1214 with screws or construction adhesive, fastened laterally to window sill 1215. Bracket 1214 provides support for external panel 1257 in conjunction with block 1236.

Bracket 1216 secured to header 1255 provides support for external panel 1239 in conjunction with block 1238 and is used to provide adjustment in bracket depth, if necessary. Bracket 1216 is also secured to and provides lateral support for soffit panel 1211. Bracket 1220, 1222, and 1224 are first secured to a roof sheathing 1221 and roof panel 1223 is attached to bracket 1220, 1222, and 1224. Brackets 1222 and 1224 have blocks 1244 and 1246 to provide angled displacement with respect to roof 1221. Block 1241 is affixed to roof bracket 1220 via a screw and is used to keep foam out of the interface between roof panel 1223 and roof bracket 1220. Bracket 1218 is secured to roof rim joist 1225 and roof joist 1256 and provides support for roof fascia panel 1219 in conjunction with block 1240. Vent 1217 provides ventilation to the roof structure above foam 1246 providing "a cold roof". Building module 1200 also shows a window 1254 in fragment, a floor 1251, a floor joist 1253, and a plumbing pipe 1231.

Caulking may be applied to a space 1213 between the window sill extension 1215, inner panel structure 1252, and existing window sill 1260. A ⅜ inch caulking space is also provided by base flange 1259 of bracket 1214.

Figure 25:
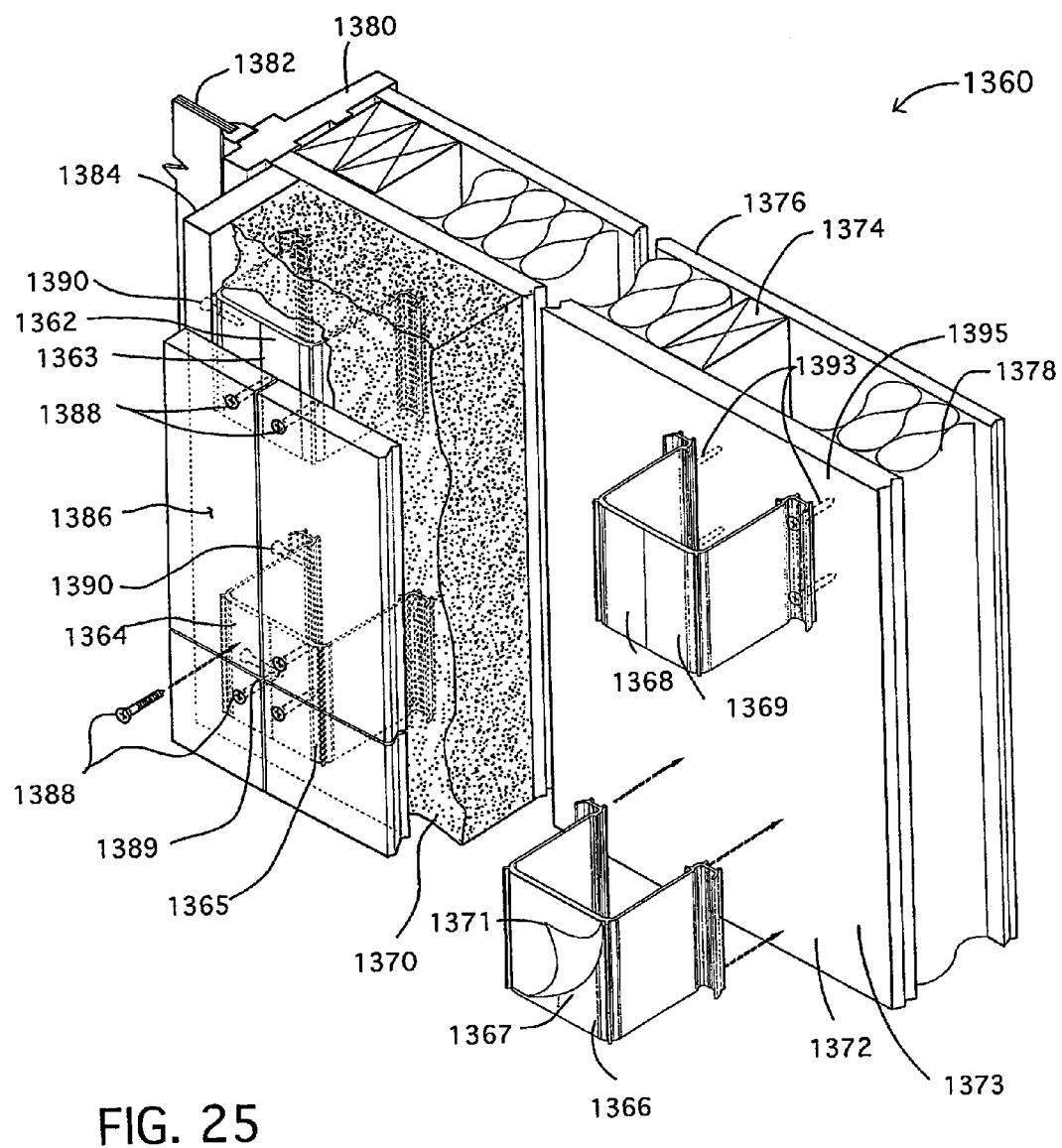
FIG. 25 is a broken, perspective view of another embodiment of a building module according to the present disclosure utilizing a plurality of the bracket of the type set forth in FIGS. 21 and 22.

An embodiment of a building module according to the present disclosure is depicted in FIG. 25 and generally reference by the numeral 1360. Module 1360 has a rigid inner construction panel 1372 defining a planar surface 1373. Panel 1372 has a plurality of rigid brackets 1362, 1364, 1366, and 1368, each of which is affixed to planar surface 1373 by screws through fastening surfaces on the base flanges, such as by way of example with screws 1393 through fastening tabs at the base flange of bracket 1368 and into inner construction panel 1395. The remaining brackets have corresponding fastening surfaces and screws.

Exterior construction panel 1386 is shown in fragment as affixed to brackets 1362 and 1364 via screws 1388. Panel 1386 is also shown in four discrete sections with a point of intersection at 1389. Bracket 1362 has a side construction panel 1384 affixed to it via screws 1390. Bracket 1362, 1364, 1366, and 1368 correspond in type and structure to bracket 1100 in FIG. 21. The four brackets shown are merely illustrative of the number of brackets that can be employed. Fewer or greater numbers of brackets are possible depending on the application. Brackets 1362, 1364, 1367, and 1368 define planar surfaces 1363, 1365, 1365, and 1369 thereon, respectively, which are adapted to receive panel 1386. A rigid, spray foam 1370 is contiguous to and substantially covers planar surface 1373 of inner panel 1372 and contacts and embeds brackets 1362, 1364, 1366, and 1368 except for planar surfaces 1363, 1365, 1367, and 1369. Bracket 1366 also shows by way of example a release or adhesive liner 1371, which can be peeled to expose planar surface 1367. Liner 1371 protects planar surface 1367 from being covered over or impinged by foam 1370 when foam 1370 is applied to planar surface 1373. The embodiment has ancillary structure in the form of interior construction panel 1376, studs 1374, existing batt insulation 1378, window jamb 1380, and window 1382.

Figure 26:
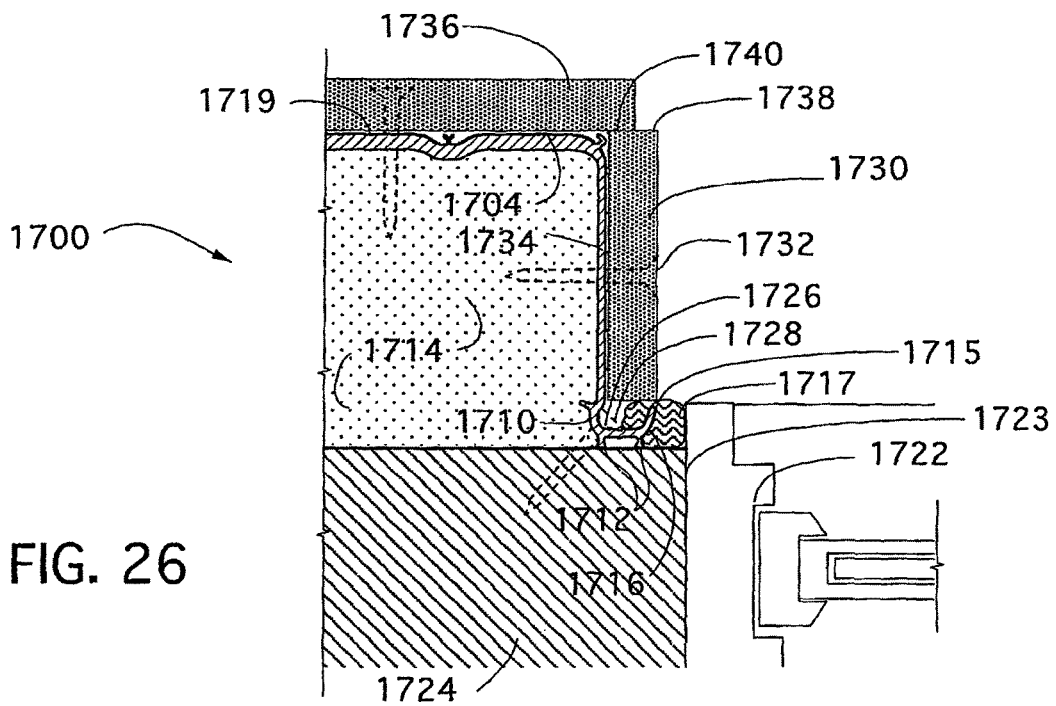
FIG. 26 is a fragmentary, cross-sectional view of another embodiment of a building module according to the present disclosure utilizing a bracket of the type set forth in FIGS. 21 and 22.
Figure 27:
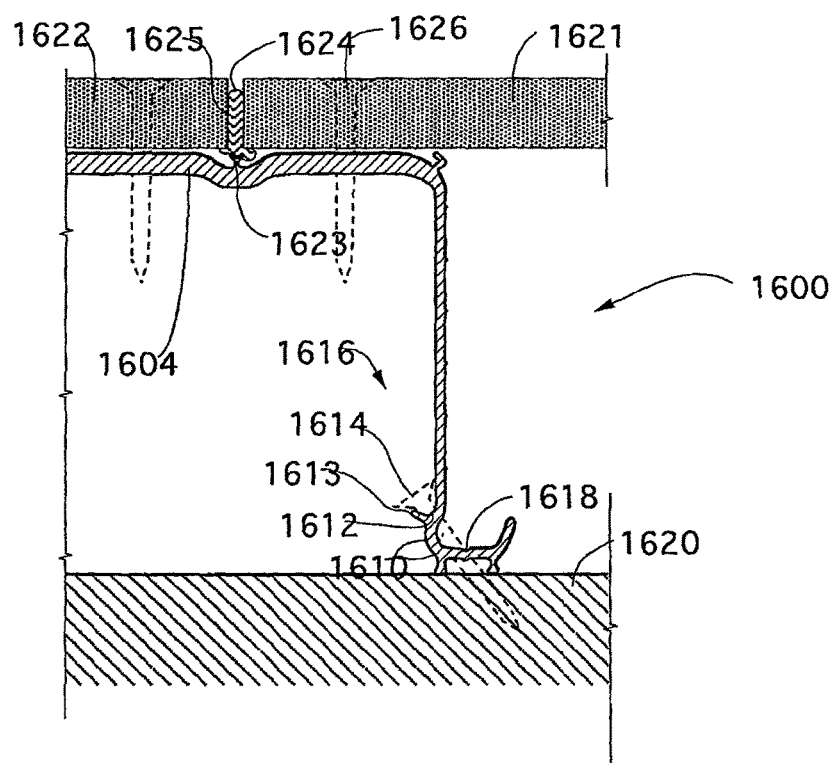
FIG. 27 is a fragmentary, cross-sectional view of another embodiment of a building module according to the present disclosure utilizing a bracket of the type set forth in FIGS. 21 and 22.

An embodiment of a building module according to the present disclosure is depicted in fragment in FIG. 26 and is generally referenced by the numeral 1500. Module 1500 has a bracket 1501. Bracket 1501 has a platform 1504 and sides 1506 and 1507. Platform 1504 and sides 1506 and 1507 transition at a curved intersections/interfaces 1502 and 1503. In proximity to interfaces 1502 and 1503 are arcuate-shaped anchor portions 1508 and 1512. There is also a raised knob 1516 in a recess 1517 that runs the width of platform 1504. Anchors 1508 and 1512 as well as raised knob 1516 are adapted to temporarily catch or restrain clasp ends of a tape measuring device (not a component of the module or the bracket) as shown. FIG. 26 shows clasp 1510 of measuring tape 1511 restrained by anchor portion 1508 when a pulling force is applied laterally. Similarly, FIG. 26 shows a clasp 1518 of a measuring tape 1519 restrained by raised knob 1517 when a pulling force is applied laterally. Similarly, FIG. 26 shows a clasp 1514 of a measuring tape 1515 restrained by anchor portion 1512 when a pulling force is applied laterally.

Side 1506 defines a base flange 1509 at its distal end. Base flange 1509 includes a shelf portion 1513 and a bottom portion 1507. A self-tapping screw 1509 is shown in dashed lines penetrating perpendicularly through bottom portion 1507 into an inner construction panel 1520. Screw 1507 structurally fastens bracket 1501 to panel 1520.

Bracket 1501 bears a center knob/anchor 1516, which is adapted to temporarily catch or restrain clasp 1518 of a tape measure 1519 when anchor 1516 is subjected to tension by clasp 1518 to the right of the center of bracket 1501. Anchors 1508, 1512, and 1516 are able to anchor clasps from the opposite side as illustrated in FIG. 26. (not shown). Side 1506 defines a base flange 1509 at its distal end. Base flange 1509 includes a shelf portion 1513 and a bottom portion 1507. A self-tapping screw 1509 is shown in dashed lines penetrating perpendicularly through bottom portion 1507 into an inner construction panel 1520. Screw 1509 structurally fastens bracket 1501 to inner construction panel 1520.

The sides 1506 and 1507 of bracket 1501 bear small indicator ridges 1511 not shown on right side) spaced at one-half inch intervals to enable a spray foam applicator (not shown) to gauge the thickness of the foam 1522, as it is being applied. This measurement of the foam's thickness will help quantify the insulating value of the foam being applied. After the bracket is secured through the outer flange and all casing is attached to sides of the bracket as shown in FIG. 28, polyurethane spray foam is then spray applied to the inside of the bracket 1501 and onto the planar surface of inner panel 1520, to an ideal depth of 3 inches, mostly embedding the sides of the bracket 1506 as indicated by the outer surface of the foam 1524.

An embodiment of a building module according to the present disclosure is depicted in FIG. 28 as a fragment of the bracket and generally referenced by the numeral 1600. The inner fastening shelf 1612 bears an arcuate shape projection 1613, that guides the point of fasteners such as 1614, to target surface 1612. The target surface 1612, is pierced by self tapping screw 1614, shown in dashed line, or other fasteners, that may be driven at an angle from a position 1616 inside of the bracket. After fastener 1614 pierces through target surface 1612, it also pierces through target area 1618, before it penetrates the inner construction panel 1620 and secures bracket 1600 with fastener 1614.

After the foam is sprayed in place (not shown), two outer construction panels 1621 and 1622 either abut each other or are spaced to form control joint 1624 at the center of the brackets outer planer face 1604 where the center and form control joint. They are held in place by self tapping screws 1626, other fasteners, or a construction adhesive not shown.

Figure 29:
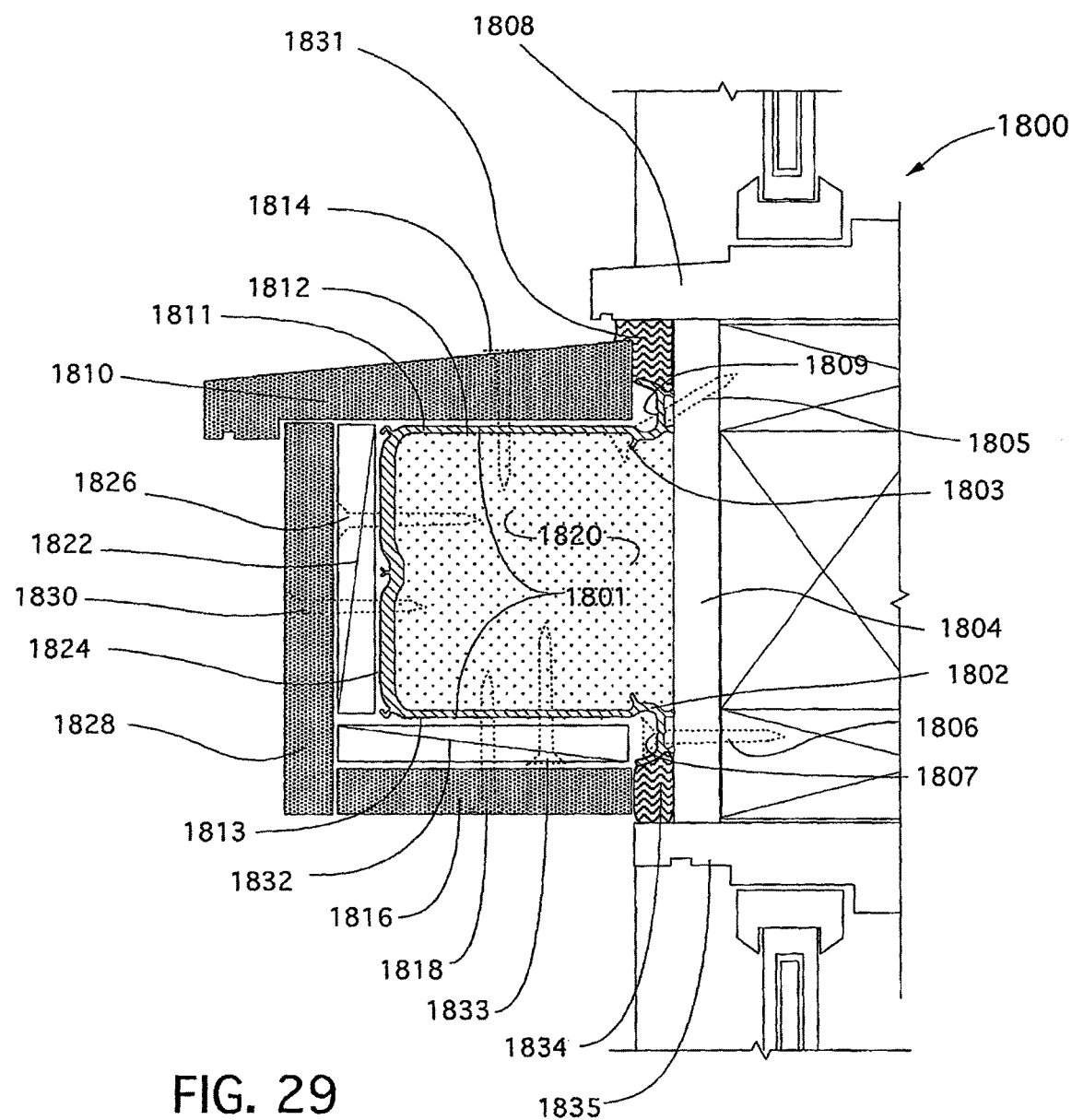
FIG. 29 is a fragmentary, cross-sectional view of another embodiment of a building module according to the present disclosure utilizing a bracket of the type set forth in FIGS. 21 and 22.

An embodiment of a building module according to the present disclosure is depicted in FIG. 29 as a bracket and generally referenced by the numeral 1800. Bracket base flange 1710 bears on two tracks 1712 and has an arcuate terminus 1714. Very small ridges 1716 around all the surfaces of the base flange are manufactured with very small ridges. The ridge surfaces provide excellent physical properties for adhesion of waterproof caulking 1718 shown in dashed lines or other construction adhesives used in the assembly of the module.

Screw 1728 is driven through fastener target 1726 to penetrate inner construction panel 1724 at an angle, to avoid damaging the end of inner construction panel 1723 and window jamb 1722. Window casing extension 1730 is held in place by screw 1732, driven through casing extension 1720 and through the side of the bracket 1734. Construction adhesive may also be used, but it is not shown. Brackets spaced at 16 inches on center, only occupy a quarter of the area around the window or door openings. The brackets secure the window casing extension, while the casing provides a container for the foam before the poly urethane foam is sprayed. The dense foam also serves as a bonding agent. After the spray foam is applied (not shown) is the outer panel 1736 attached to the outer planer surface 1704, and to the top of window jamb extension 1738 with construction adhesive 1740, or fasteners not shown.

An embodiment of a building module 1800 according to the present disclosure is depicted in FIG. 29, and generally referenced by the numeral 1800. In FIG. 30, bracket 1801 is shown vertically arranged. Bracket 1801 differs from the more common horizontal positioning of the brackets as illustrated in FIGS. 26, 27, 28, and 29, brackets 1400, 1500, 1600 and 1700, which are all arrayed horizontally, with their sides facing left to right.

Module 1801 is constructed below window sill 1808, or other similar termination of the inner construction panel 1804, such as at a parapet (not shown). Module 1800 forms an extension of existing window sill 1808. Extension sill 1810 also forms the top enclosure of module 1800. The sill extension 1810 must be fastened to the top of module 1801, which is arrayed in a vertical position for that specific purpose, with one side facing up 1811 and the opposing side 1813, facing down. This arrangement uses these two sides of bracket 1801, as fastening platforms to anchor the extension sill 1810 from above. Similarly, bottom bracket side 1813 provides anchoring platform for enclosing soffit 1816 from below.

Vertically disposed bracket 1801 also has an inner shelf 1803 that serves as a target for self tapping screws 1805, fastened through the inner shelf 1809 at an angle, (for ease of installer fastening), the screw continues through the outer flange center fastening target 1805 and finally penetrates the inner construction panel 1804 to anchor bracket 1801.

Vertically disposed bracket 1801 also has outer flange 1802 which is has a screw 1806 driven through the outer flanges center fastening target 1807, penetrating and anchoring bracket 1801 to the inner construction panel 1804. The top extension sill 1810 and bottom soffit 1816 are fastened to bracket 1801. The majority of the length of the extension sill and bottom soffit, will not be fastened to bracket 1801, as brackets are generally spaced 16 inches or more apart, both vertically and horizontally. Therefore, extension sill 1810 and soffit 1816 span between bracket 1801 and the brackets arrayed on either side of bracket 1801. All are aligned and fastened below original sill 1808 and above the window head 1835 below.

Before the outer construction panel 1828 is fastened to the bracket to enclose the module 1800, dense foam is sprayed first inside the bracket and then against the inner construction panel 1804. Extension sill 1810, and soffit 1816, form barriers that contain the foam 1820 inside the module, as it is sprayed against the inner construction panel 1804. The extension sill and soffit are embedded and rigidly connected to the dense foam in the process, (not shown). In FIG. 3D, the foam is shown filling the bracket 1801. In between the brackets the foam touches the sill and the soffit directly.

Additional spacing between the top sill and bottom soffit can be formed by using additional brackets like 1801, or by fastening any variety of thickness blocks to the bottom 1832 or to the top side of bracket 1801 (not shown) in a similar way as a block 1822 is shown fixed to the outer planer face 1824 of the bracket to widen the module, including the outer construction panel 1828.

The extension sill 1810 is installed ⅜ to ½ inch below the original sill 1808 as the bottom soffit 1816 is installed ⅜ to ½ inch above the window head 1835 to provide room for the application of waterproof caulking.

Another bracket useful in the building module of the present disclosure is depicted in FIGS. 30 and 31 and generally referenced by the numeral 2100. Bracket 2100 is constructed entirely of a metal, such as aluminum or stainless steel, or other rigid material, and is preferably formed by extrusion or casting.

Bracket 2100 has a platform 2112 that bears a planar surface 2114. Bracket 2100 has two sides 2116 and 2118 appending substantially equilaterally from platform 2112 and extending away from planar surface 2114. Sides 2116 and 2118 define articulated base flanges 2120 and 2122 at their distal ends.

Bracket 2100 has anchor portions 2135 and 2136 located in proximity to the intersections or interfaces of platform 2112 and sides 2116 and 2118 and run continuously along the width of platform 2112. Anchor portions 2135 and 2136 provide convenient anchoring positions for the angled ends of retractable tape measures (not shown in FIGS. 21 and 22), which are commonly used in construction applications in determining proper spacing between brackets. Embodiments of brackets showing the interaction of angled ends of retractable tape measures are shown and described below for FIGS. 35 and 36.

Platform 2112 has a recess 2111 extending therein and therealong its width at its center axis. Recess 2111 has a raised knob 2113 extending perpendicularly therefrom with respect to planar surface 2114 along the length of recess 2111. Knob 2113 is useful for measuring to or from the center of bracket 2100 and for positioning outer construction panels or joints thereof (not shown) adjacent to platform 2112. Knob 2113 provides an anchor for caulking and adhesives at joints between outer construction panels commonly positioned at the center of platform 1112.

Sides 2116 and 2118 define base flanges 2120 and 2122, respectively, at their distal ends. Base flange 2120 defines an outer arcuate well 2121 and an inner arcuate well 2124. Base flange 2122 defines an outer arcuate well 2123 and an inner arcuate well 2125. Outer arcuate well 2121 is bounded by and formed by the confluence of side 2116, a bottom portion 2106, and an outer portion 2102. Outer arcuate well 2123 is bounded by and formed by the confluence of side 2118, a bottom portion 2107, and an outer portion 2103. Inner arcuate well 2124 is bounded by and formed by the confluence of side 2116, a bottom portion 2108, and an outer portion 2110. Inner arcuate well 2125 is bounded by and formed by the confluence of side 2118, a bottom portion 2109, and an outer portion 2104. Base flanges 2120 and 2122 also define a plurality of knob portions 2133 and 2134, respectively, that extend thereunder and therealong. Knob portions 2133 and 2134 provide thermal breaks and spacing between base flanges 2120 and 2122 and any adjacent substrate (not shown). Additionally, double-sided adhesive foam tapes 2140 and 2141 may be permanently affixed to the bottom of the base flange 2120 and 2122 between each of the plurality of knob portions 2133 and 2134. Foam tapes 2140 and 2141 provide temporary adhesion to the substrate. Self tapping screws (not shown) can be driven through multiple interfaces in base flanges 2120 and 2122 to permanently fasten bracket 2100 to substrates such as casings and/or construction panels. The interface chosen may depend upon which is the easiest to reach with a screw-driving gun or whichever affords the best angle of screw penetration into the substrate. Embodiments showing brackets fastened to substrates by screws are seen in FIG. 35 through FIG. 39 and are described below.

Figure 38:
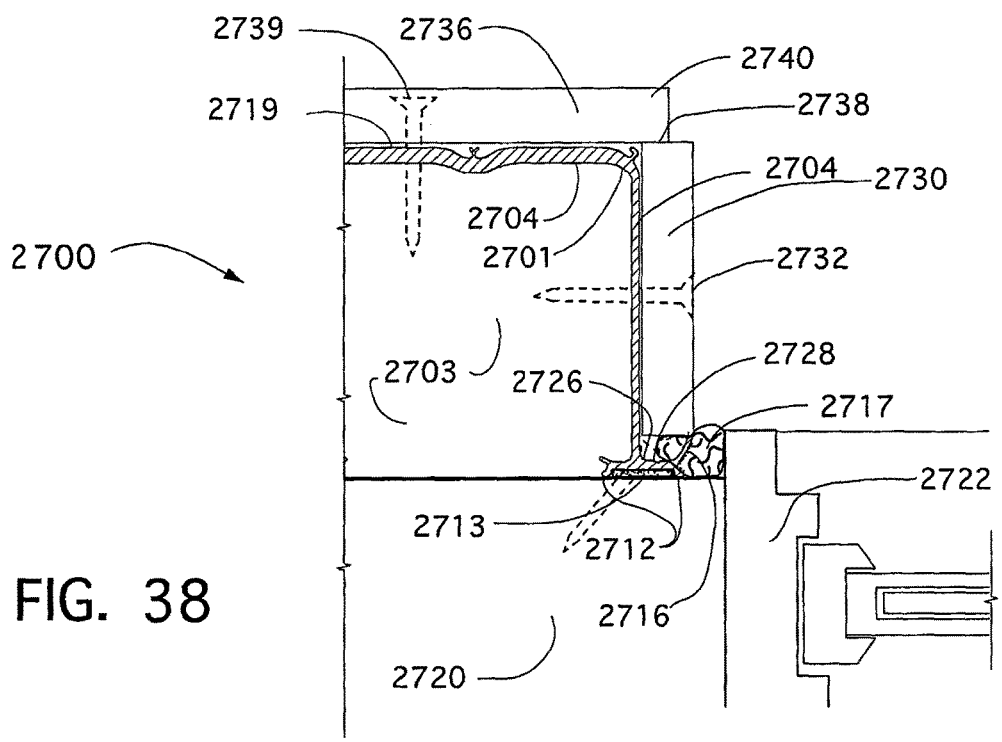
FIG. 38 is a broken, side sectional view of another embodiment of a building module according to the present disclosure.

Outer portions of base flanges 2102 and 2103 provide elevated leveling surfaces 2137 and 2138, respectively, at their distal ends for fastening or retention of casing or other finish materials (not shown) to bracket 2100. Elevated leveling surfaces 2137 and 2138 prevent protruding screws heads or other fastener heads from interfering with leveling of casing or other finish materials. An example of a casing perched on a leveling surface of a bracket is shown in FIG. 38 and described below.

Bracket 2100 is protected from overspray of foam by a shield 2142. Shield 2142 bears a planer surface 2143. Shield 2142 is attached to bracket 2100 at planar surface 2114 of by application of hand pressure. Shield 2142 defines curved snap ends 2145 and 2146 at opposing ends thereof. When shield 2142 is pressed onto bracket 2100, snap ends 2045 and 2046 fit behind anchor portions 2135 and 2136 of bracket 2100 and snap into place. Shield 2142 has a raised knob 2147 extending continuously across the width of its bottom surface. Raised knob 2142 fits into a groove 2113 within raised knob 2113 and provides center bearing support for shield 2142 when attached to bracket 2100. Shield 2142 can be attached to or removed from bracket 2100 as needed. Shield 2142 is typically fitted or attached to bracket 2100 prior to application of spray insulation foam (not shown) to protect planar surface 2143 from foam accumulation. After application of the foam, shield 2142 is removed to expose planar surface 2143 for application of a construction panel (not shown) thereto.

Figure 32:
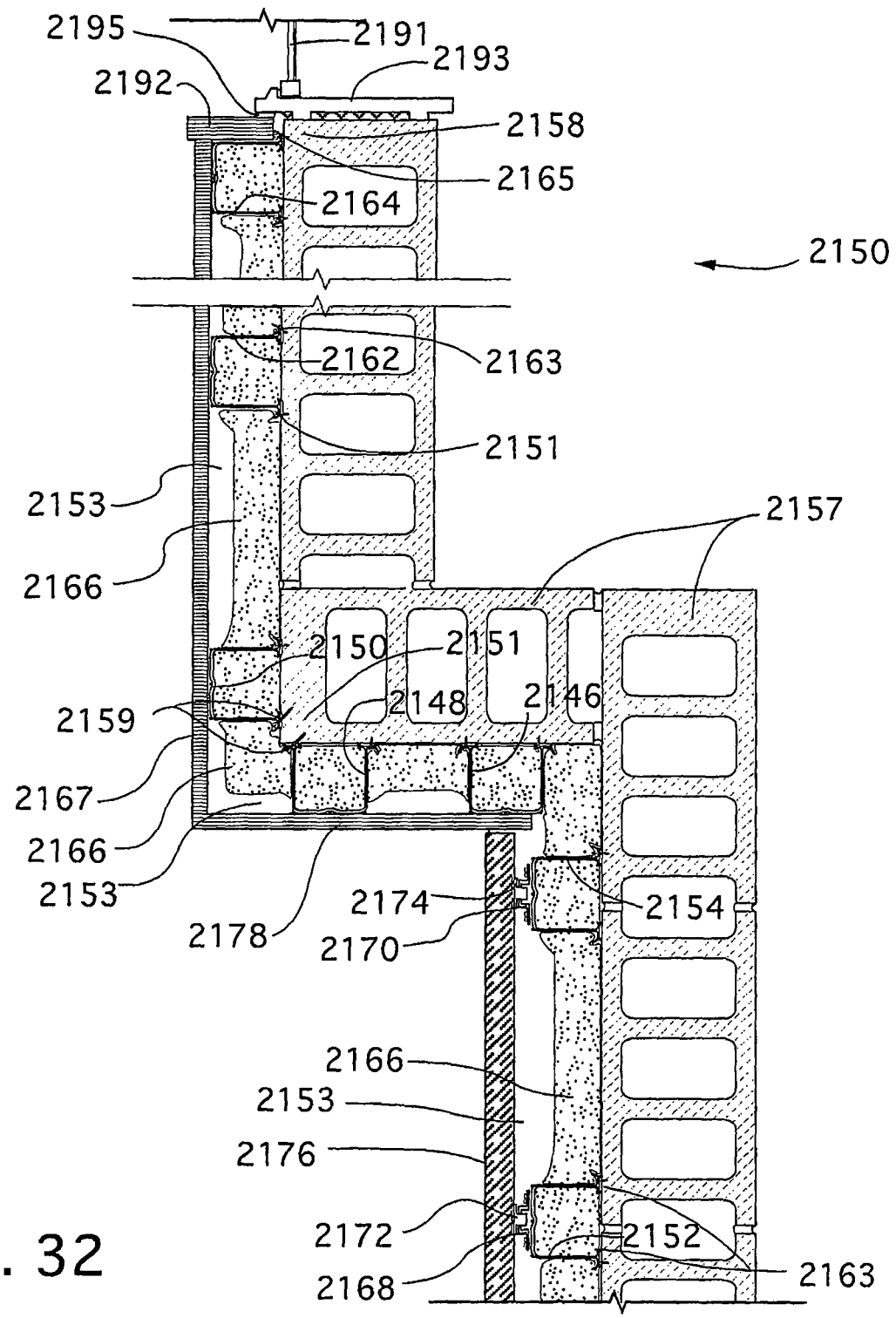
FIG. 32 is a broken, vertical section view of another embodiment of a building module according to the present disclosure utilizing a plurality of the bracket shown in FIG. 30.

An embodiment of a building module according to the present disclosure is depicted in FIG. 32 and generally reference by the numeral 2150. Module 2150 has a rigid masonry wall of a plurality of concrete blocks 2157. Module 2150 has a plurality of rigid brackets 2152, 2154, 2156, 2158, 2160, 2162, and 2164 affixed to the concrete block wall via a plurality of screws 2163 at the base flanges of the several brackets. The several brackets are of the type and structure depicted in FIGS. 30 and 31. A rigid insulating spray foam 2166 embeds at least a major part of the depth of the several brackets. The gaps between foam 2166 and exterior panels 2176, 2178, and 2167 take the form of airspaces 2153, which function as a rainscreen behind the exterior panel 2176, 2178, and 2167 by providing ventilation and drainage behind the exterior panels. Exterior panel 2176 is affixed to brackets 2152 and 2154 via male latches 2172 and 2174, which mate with female grooves 2168 and 2170 affixed to brackets 2152 and 2154. There is additional structure shown in FIG. 23 in the form of a window 2191, a window jamb 2193, and a window jamb extension casing 2192.

Bracket 2158 and 2160 form the structure for the outer corner junction of 2178 and 2167. The two screws 2161 that fasten brackets 2158 and 2160 at the block wall outside corner 2159 are installed through the brackets base flange at an angle to prevent cracking the corner of masonry wall at corner 2159.

Caulking 2195 is applied between the window jamb extension 2192 and existing masonry wall. A base flange 2165 of bracket 2164 provides ⅜ inch spacing for waterproof caulking. A detail of the caulking of a similar window, may be seen on another embodiment 2700 on FIG. 38.

On FIG. 32, Base flanges 2161 and 2163 of bracket 2162 define knob portions (not readily visible on small scale drawing) thereunder to provide a ⅛ inch thick air space and thermal break between 90% of the outer flanges bottom and the adjacent masonry wall 2457. This airspace reduces the conductivity of heat from the masonry wall through base flanges 2161 and 2163 by approximately 70%.

Figure 33:
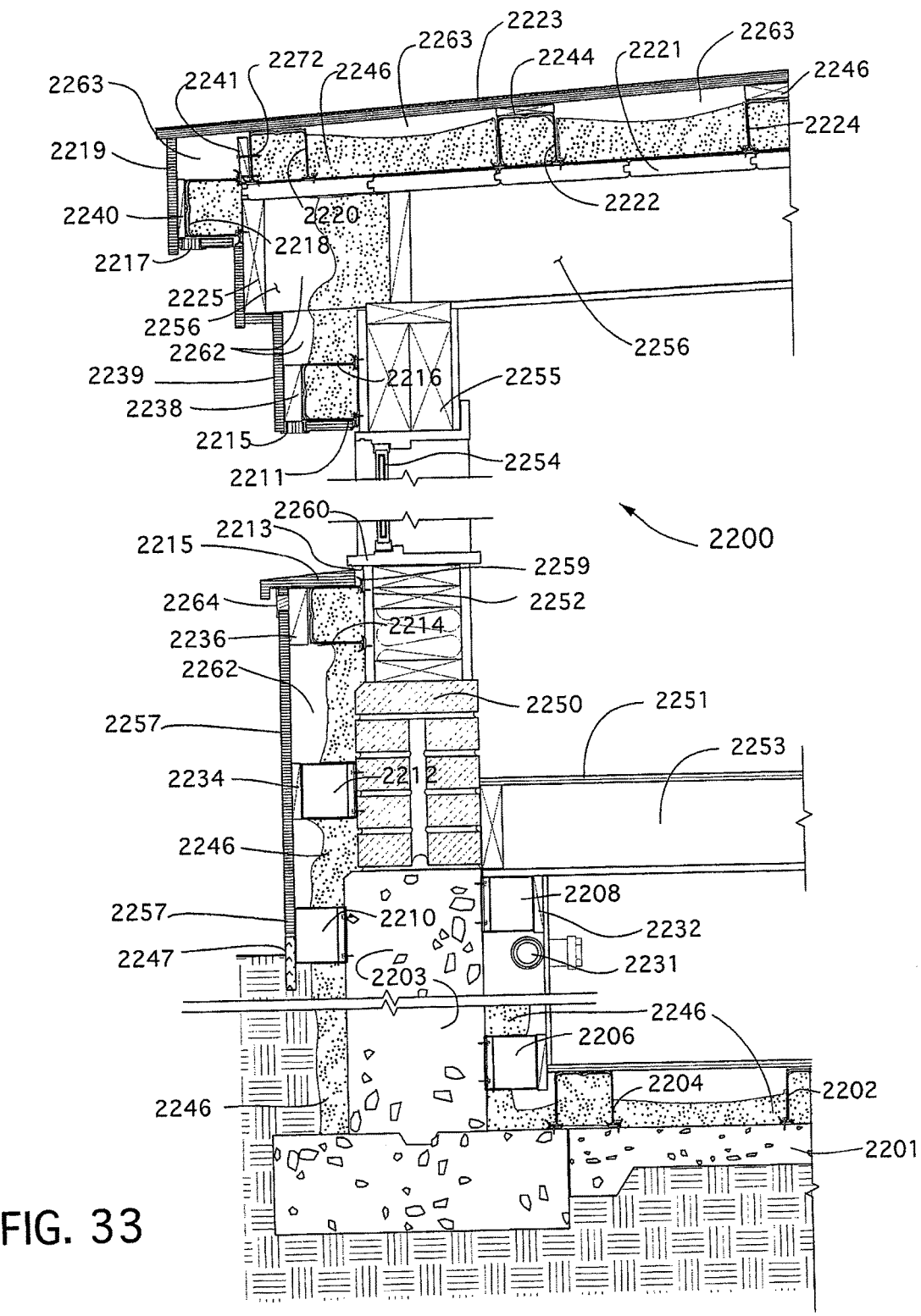
FIG. 33 is a broken, vertical section view of another embodiment of a building module according to the present disclosure utilizing a plurality of the bracket shown in FIG. 30.

An embodiment of a building module according to the present disclosure is depicted in FIG. 33, and generally referenced by the numeral 2200. Module 2200 has brackets 2202, 2204, 2206, 2208, 2210, 2212, 2214, 2216, 2218, 2220, 2222, and 2224. The several brackets are of the type depicted in FIGS. 30 and 31. The several brackets are affixed with various types of screws to planar or uneven surfaces of various construction materials. Brackets 2202 and 2204 elevate, level, and insulate a floor above a basement slab 2201 and are affixed to slab 2201 via screws. Insulation and waterproofing is provided throughout module 2200 by spray foam 2246. Bracket 2210 is secured to a concrete foundation wall 2203 via screws and provides support for an external panel 2257 and a flexible rubber sub-grade panel 2247. Bracket 2212 is secured to masonry 2250 via screws and provides support for an external panel 2257 in conjunction with spacing block 2234, which allows alignment of external panel 2257 from bracket 2212 to bracket 2210 below and as necessary to adjust for any recess in masonry wall 2250 from concrete foundation wall. Bracket 2214 is secured in vertical orientation to a wood wall 2252 via screws. A window extension sill 2215 is fastened to bracket 2214 with screws or construction adhesive. Bracket 2214 is oriented vertically with the bracket's two sides facing up and down. The vertical orientation in order to provide a structural fastening surface to attach window extension sill 2215 and provides support for external panel 2257 in conjunction with a spacing block 2236 that is used to provide adjustment in bracket depth, as necessary. Bracket 2216 is secured to a wood window header 2255 and provides support for an external panel 2239 in conjunction with a spacer block 2238 that is used to provide adjustment in external panel distance from wall, as necessary. Vents 2215 and 2264 provide ventilation to the wall structure above and below the vents through an airway space 2262. Brackets 2210, 2212, 2214, and 2216 provide an airway space 2262 between the outside surface of the spray foam 2246, and the inside surface of outer construction panels 2257 and 2259. The ventilation is only partially obstructed by the structural brackets, which fill approximately 8% of the area of the wall.

The resulting ventilation behind outer panels 2257 and 2239, when coupled with a water proof barrier in the form of dense foam 2246 with drainage at grade penetration 2247 forms a "rain screen". The "rain screen" is known as an effective method of providing a water resistant weatherization shield around a building. Bracket 2216 is also secured to and provides lateral support for a soffit panel 2211. Brackets 2220, 2222, and 2224 are first secured to a roof sheathing 2221, and a roof panel 2223 is attached to brackets 2220, 2222, and 2224. Brackets 2222 and 2224 have spacing blocks 2244 and 2246 to provide angled displacement with respect to roof 2221. Block 2241 is affixed to roof bracket 2220 via a screw 2272 and is used to keep foam out of the interface between roof panel 2223 and roof bracket 2220. Bracket 2218 is secured to a roof rim joist 2225 and a roof joist 2256 and provides support for a roof fascia panel 2219 in conjunction with a spacer block 2240.

Brackets 2218 and 2220, 2222 and 2224 form the roof insulation and enclosure and weatherization for the building and for the roof ventilation outside of the insulation 2246. Air flows from vent 2217 on the underside of the roof through a roof airway 2263 to a ridge vent (not shown), or to a similar vent on the opposite side of the roof not shown). Air moves under a roof panel 2223 except for the approximately 8% of the roof area that is blocked by the brackets that connect inner construction panel 2221 to roof panel 2223. Airway space 2263 provides ventilation that maintains a unique method of creating a "cold roof". Ventilation space 2263 maintains outdoor temperatures beneath roof panel 2223 preventing conduction of heat from inside the building, which otherwise would conduct through insulation and melt snow and possibly create ice dams and water infiltration. It also prevents conduction of heat from outside through roofing and insulation to the interior. Building module 2200 also shows a window 2254 in fragment, a floor 2251, a floor joist 2253, and a plumbing pipe 2231.

Waterproof caulking and flashing (not shown) is to be applied to a ⅜ inch caulking space 2213 between window sill 2260, the window sill extension 2215 and the inner construction panels 2252. Caulking space 2213 is provided by the raised end of the base flange 2259 of bracket 1214. A similar caulking space is illustrated as numeral 2831 in FIG. 39.

Figure 34:
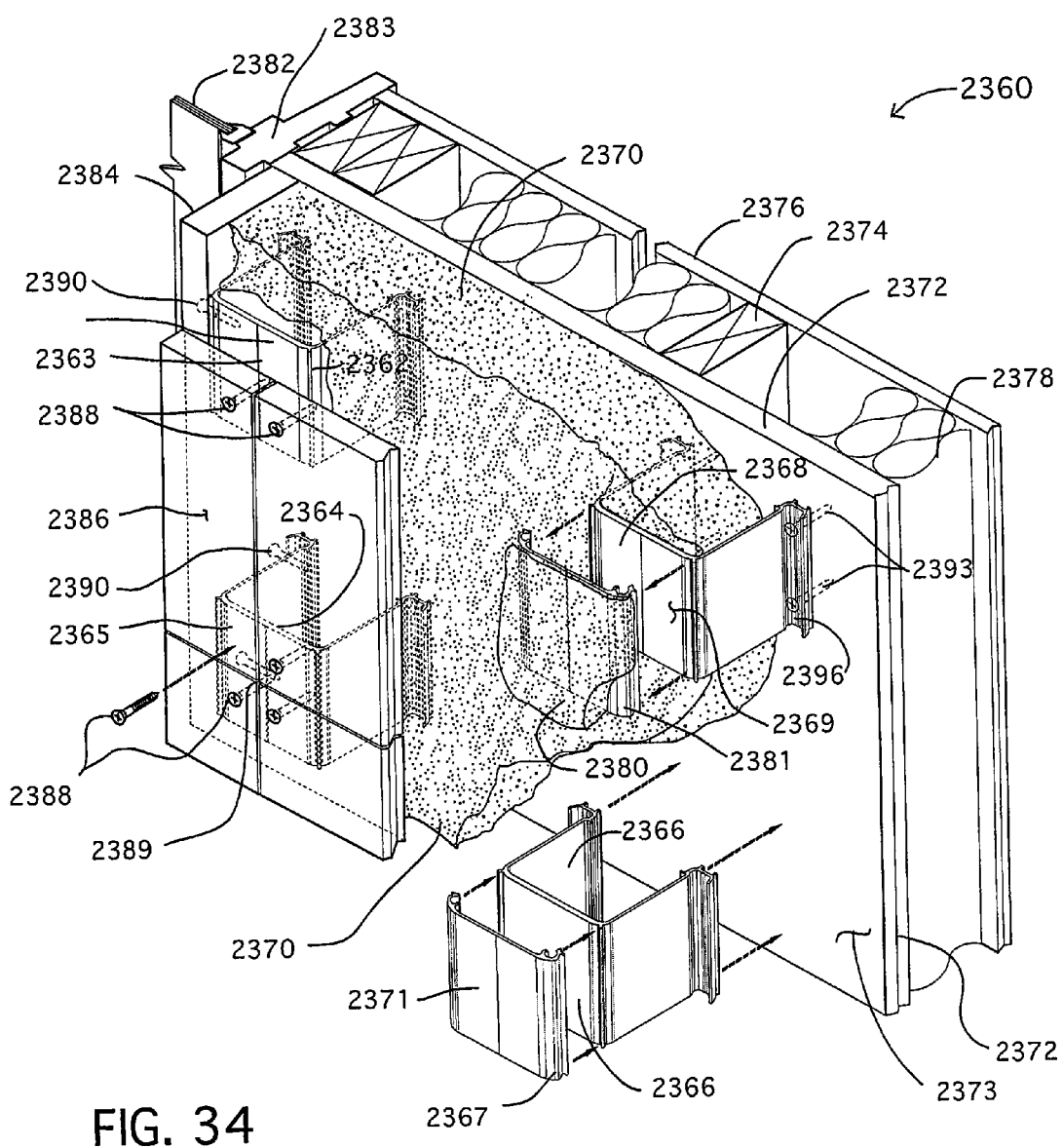
FIG. 34 is a broken, perspective section view of another embodiment of a building module according to the present disclosure utilizing a plurality of the bracket shown in FIG. 30.

An embodiment of a building module according to the present disclosure is depicted in FIG. 34 and generally reference by the numeral 2360. Module 2360 has a rigid inner construction panel 2372 defining a planar surface 2373. Module 2360 has a plurality of rigid brackets 2362, 2364, 2366, and 2368, each of which is affixed to inner construction panel 2373 by screws through base flanges of those brackets. By way of example, screws 2393 are inserted through base flange 2396 of bracket 2368 and into inner construction panel 2372. The remaining brackets have corresponding fastening surfaces and screws.

Exterior construction panel 2386 is shown in fragment as affixed to brackets 2362 and 2364 via screws 2388. Panel 2386 is also shown in four discrete sections with a point of intersection at 2389. A side construction panel 2384 is affixed to bracket 2362 via screws 2390. Bracket 2362, 2364, 2366, and 2368 correspond in type and structure to bracket 2100 of FIG. 30. The four brackets shown are merely illustrative of the number of brackets that can be employed. Fewer or greater numbers of brackets are possible depending on the application. Brackets 2362, 2364, 2367, and 2368 define planar surfaces 2363, 2365, 2367, and 2369 thereon, respectively, which are adapted to receive panel 2386. A rigid, spray foam 2370 is contiguous to and substantially covers planar surface 2373 of inner panel 2372 and contacts and embeds brackets 2362, 2364, 2366, and 2368 except for planar surfaces 2363, 2365, 2367, and 2369. A shield 2371 is shown in conjunction with bracket 2366 and in position to be attached. When attached, If attached to bracket 2366, shield 2371 would protect planar surface 2367 from being covered over by foam 2370 when spray foam 2370 is applied to planar surface 2373. Bracket 2368 illustrates an example of a foam release shield 2381 that has been covered by overspray of foam 2380. As shown in FIG. 34, shield 2381 has been pulled off to expose planar surface 2369 as a clean surface. The embodiment has ancillary structure in the form of an interior construction panel 2376, studs 2374, a batt insulation 2378, a window jamb 2383, and a window 2382.

Figure 35:
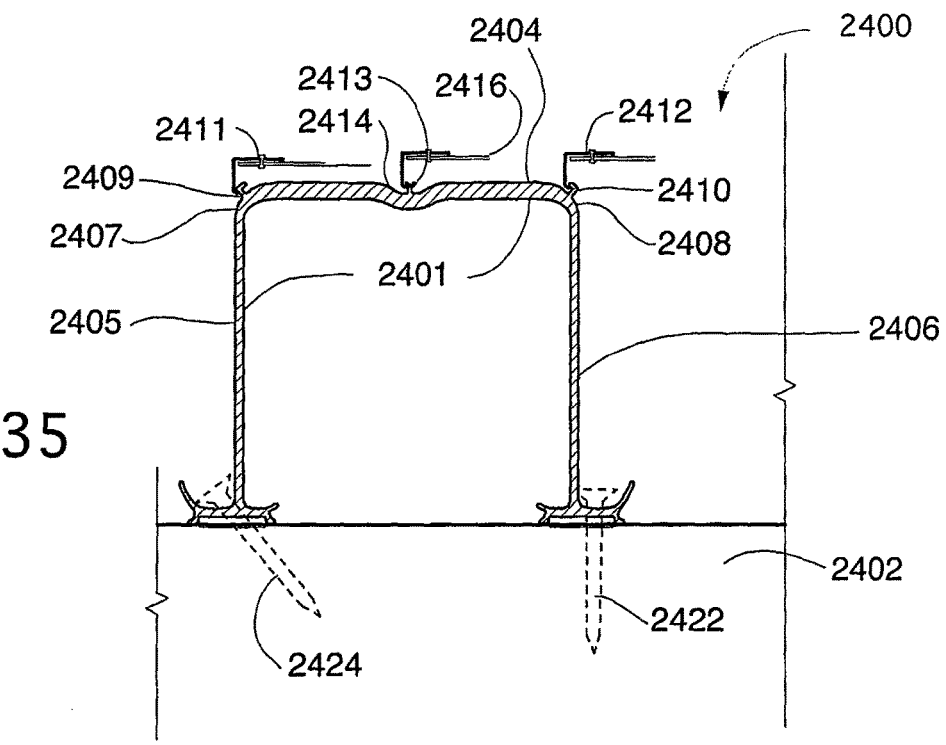
FIG. 35 is a broken, side sectional view of another embodiment of a building module according to the present disclosure.

An embodiment of a building module according to the present disclosure is depicted in fragment in FIG. 35 and is generally referenced by the numeral 2400. Module 2400 has a bracket 2401 and a construction panel 2402. Bracket 2401 has a platform 2404 and sides 2405 and 2406 that transition at a curved sections 2407 and 2408. In proximity to curved sections 2407 and 2408 are arcuate-shaped anchor portions 2409 and 2410, which are adapted to temporarily catch or restrain clasps 2410 and 2412 of a tape measure (not a component of the module) when clasps 2411 and 2412 are engaged with anchor portions 2409 and 2410 and subjected to a backward pulling or pressure motion. Along the width and the center line of platform 2404 is a continuous arcuate recess 2114. A raised knob 2413 extends from and along the length of recess 2114 perpendicularly with respect to platform 2404 FIG. 35 also shows screws 2422 and 2424 in various positions facilitating attachment of bracket 2401 to inner construction panel 2402.

Figure 36:
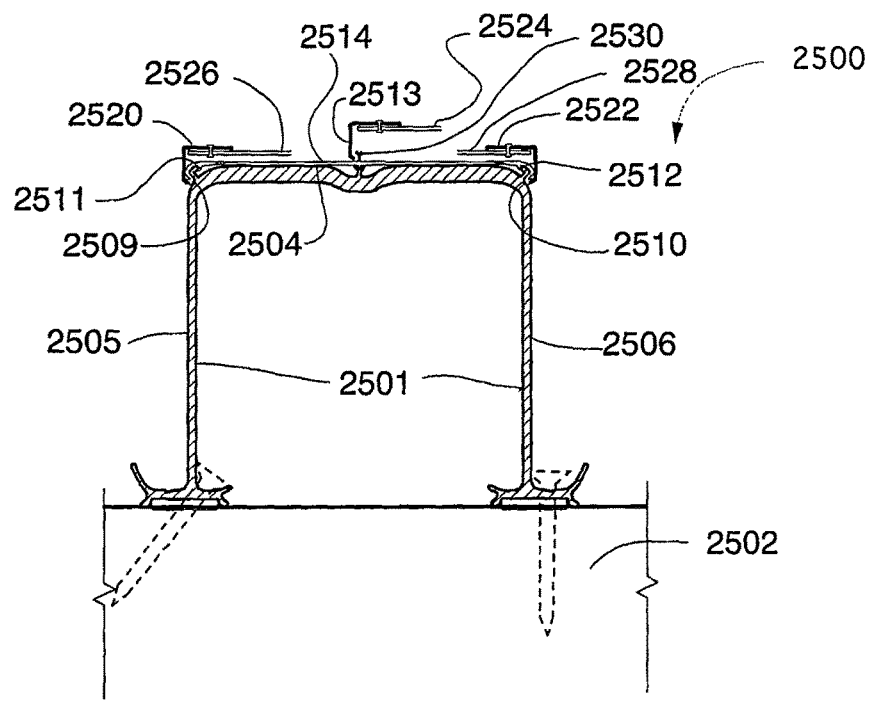
FIG. 36 is a broken, side sectional view of another embodiment of a building module according to the present disclosure.

Another embodiment of a building module according to the present disclosure is depicted in FIG. 36 and is generally referenced by the numeral 2500. Module 2500 has a bracket 2501 and an inner construction panel 2502. Bracket 2501 has a platform 2504 and sides 2405 and 2506. Bracket 2501 has arcuate-shaped anchor portions 2509 and 2510. Bracket 2501 is shown coupled and in attachment with a shield 2514. Shield 2514 has cupped ends 2511 and 2512. The cupped ends 2511 and 2512 have been placed over arcuate-shaped anchor portion 2509 and 2510 and downward pressure is exerted, the cupped ends slide over the arcuate anchors and fasten the shield 2514 on top of the bracket platform 2504. This shield protects the platform 2504 from being impinged by overspray when spray foam insulation is applied to the surfaces of the module. Shield 2514 additionally provides measuring aids in the same locations as those illustrated in module 2400 in FIG. 35. Shield 2514 defines curved snap ends 2511 and 2512, which are depicted in FIG. 36 as anchoring clasp ends 2520 and 2522 of tapes 2526 and 2528, respectively. A raised knob 2530 extends perpendicularly from platform 2404 continuously along a center line along the width of shield 2514. Knob 2530 is useful for anchoring a clasp 2513 of a tape measure 2524 as shown in FIG. 36.

Figure 37:
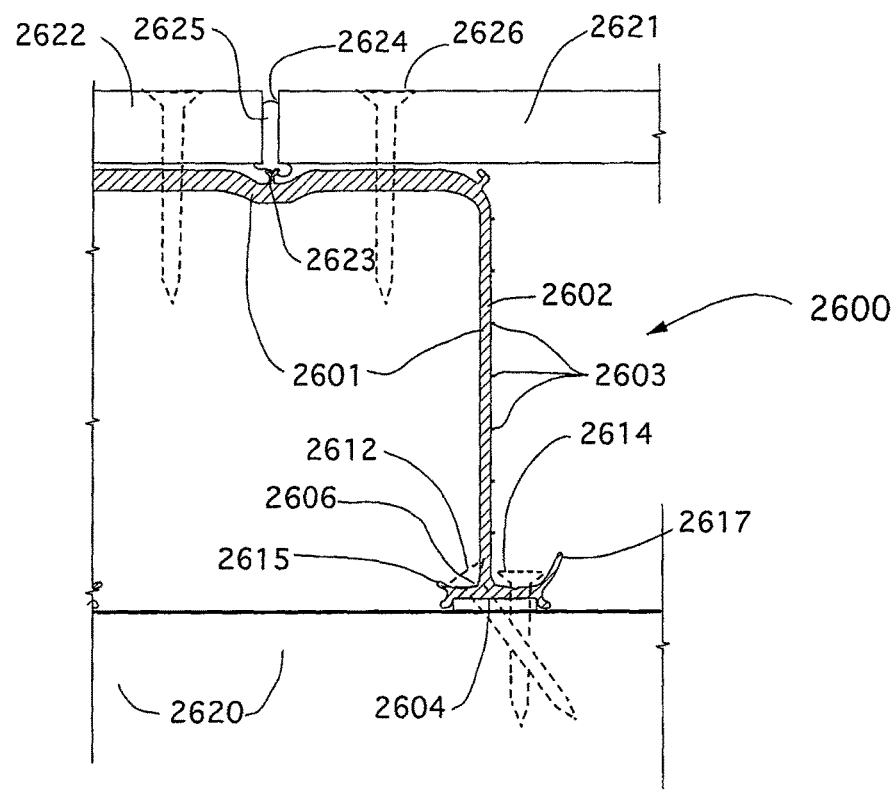
FIG. 37 is a broken, side sectional view of another embodiment of a building module according to the present disclosure.

An embodiment of a building module according to the present disclosure is depicted in FIG. 37 and is generally referenced by the numeral 2600. Module 2600 has a bracket 2601 that is affixed to construction panels 2620, 2621, and 2622, all of which are shown in fragment in FIG. 37. Bracket 2601 has a side 2602 that defines and terminates at a base flange 2604. Base flange 2604 defines an inner arcuate well 2606 and an outer arcuate well 2608. Well 2606 is bounded by an outer portion 2615. The shape of well 2606 and outer portion 2615 provides a guide for diagonal application of a fastener. In FIG. 37, a self tapping screw 2612 is shown penetrating diagonally through well 2606 and through base flange 2604 into panel 2620. Well 2608 is bounded by an outer portion 2608. The shape of well 2608 and outer portion 2608 provides a guide for vertical application of a fastener. In FIG. 37, a self-tapping screw 2614 is shown penetrating vertically through well 2608 and through base flange 2604 into panel 2620. Screws 2612 and 2614 fasten bracket 2601 to panel 2620. The sides of the bracket 2601, including side 2602, bear indicator ridges 2603 spaced at one half inch intervals that enable a person spraying a foam (not shown) to gauge the thickness of the foam as it is being applied. Measurement of the foam's thickness will help the applicator to target a particular insulation thickness. Preferably the foam is sprayed to a depth of 3 inches, preferably embedding the sides of bracket 2601.

After the foam has been sprayed in place (not shown), outer construction panels 2621 and 2622 can be attached to bracket 2601. Pandels 2621 and 2622 are spaced to form a flexible control joint 2624 along the center of bracket 2601. Control joint 2624 has a bead 2625 of adhesive therein and therealong the center knob helps to anchor control joint 2624. Construction panels 2621 and 2622 can be affixed by self tapping screws 2626 as shown in FIG. 37 other fasteners or a construction adhesive can be used.

Another embodiment of a building module according to the present disclosure is depicted in FIG. 38 and is generally referenced by the numeral 2700. Module 2700 has a bracket 2701, an inner construction panel 2720, a window or door casing extension 2730, a window jamb 2722, and an outer construction panel 2736. Bracket 2701 has a base flange 2713. At the bottom of the base flange 2713 are knob portions 2712 extending therefrom which serve to separate and provide a thermal break between base flange 2713 and inner construction panel 2720. Very small ridges 2716 around exterior surfaces base flange 2713 surfaces to enhance adhesion of waterproof caulking 2717 or a construction adhesive used in the assembly of module 2700. Base flange 2713 is affixed to inner construction panel 2720 via a screw 2714 driven through a fastener target 2726 within base flange 2713 to penetrate at an angle to avoid damaging the outer end of inner construction panel 2720 and window jamb 1722.

Figure 39:
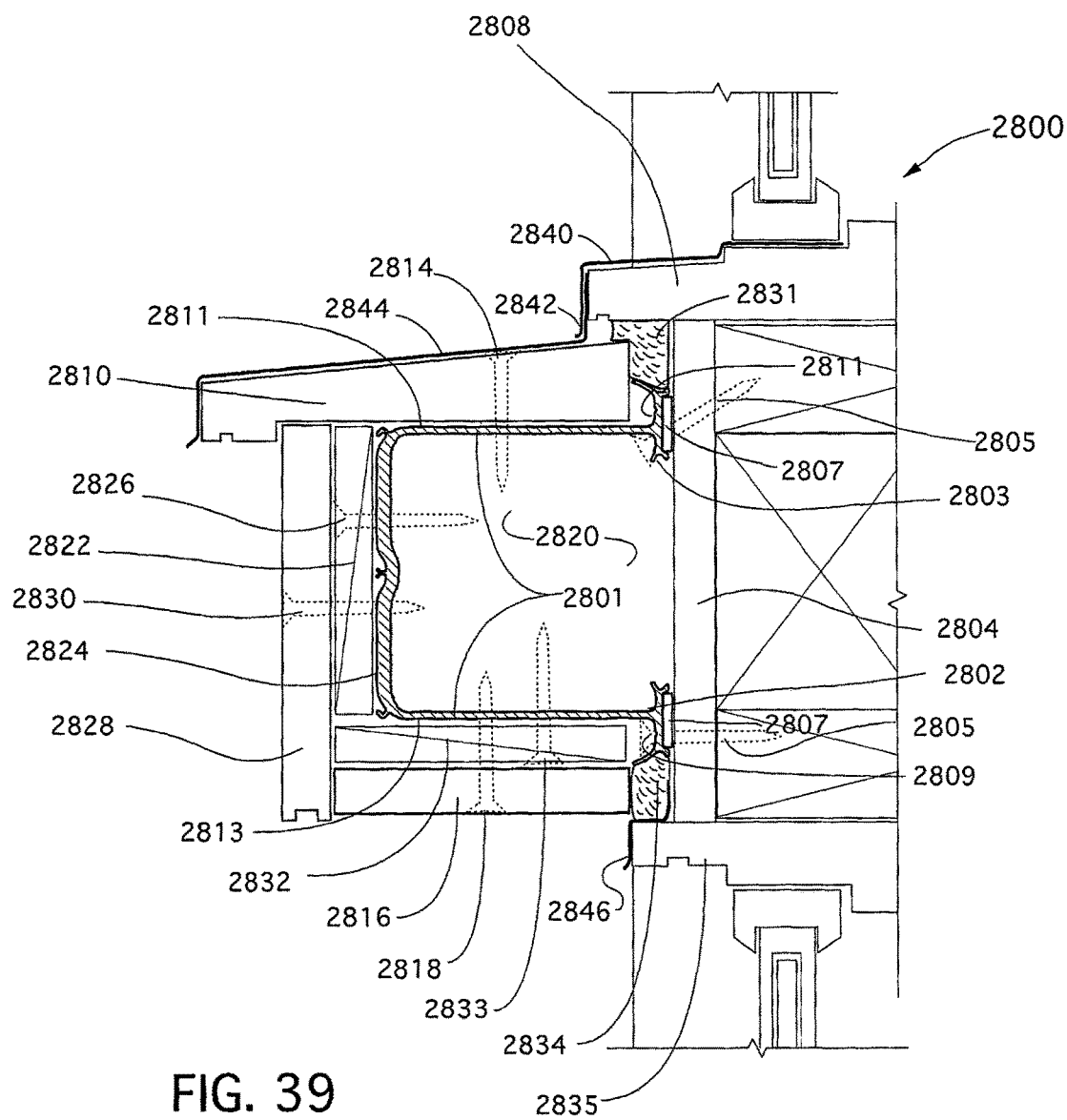
FIG. 39 is a broken, vertical view of another embodiment of a building module according to the present disclosure.

Window casing extension 2730 is held in place by a screw 2732, driven through casing extension 2730 and through a side 2704 of bracket 2701. Alternately, construction adhesive may be used (not shown). Brackets spaced at 16 inches on center will generally occupy a quarter of the area around window or door openings (not shown). Bracket 2701 secures window casing extension 2730, while window casing extension 2730 provides a container to retain foam 2703 inside module 2700 in line with bracket 2701. This securement is completed before a foam 2703 (polyurethane or other insulating foam) is sprayed or poured. After foam 2703 is applied, then outer panels such as panel 2736 is attached to bracket 2701 at an outer planer surface 2704 via a screw 2739, and to the top of window jamb extension 2730 either with construction adhesive 2738 or fasteners (not shown An embodiment of a building module 2800 according to the present disclosure is depicted in FIG. 39, and generally referenced by the numeral 2800. In FIG. 39, a bracket 2801 is shown vertically arranged. Bracket 2801 differs from the more common horizontal positioning with sides facing left to right as illustrated in FIGS. 32 and 34. FIG. 32 has brackets in multiple positions. Bracket 2801 has sides 2812 and 2813. Bracket 2801 also has base flanges 2802 and 2803 at the distal ends of sides 2812 and 2813. Base flanges 2802 and 2803 define outer arcuate wells, respectively, therein.

Module 2800 has a window sill 2808, or other similar termination, of an inner construction panel 2804, such as at a parapet (not shown). Module 2800 forms an extension of window sill 2808 with an extension sill 2810. Extension sill 2810 forms the top enclosure of module 2800. Sill extension 2810 is fastened to the top of module 2801, which is arrayed in a vertical position for that specific purpose, with one side facing up 2811 and the opposing side 2813, facing down. This configuration uses sides 2812 and 2813 of bracket 2801 as anchoring platforms to anchor extension sill 2810 from above and enclosing soffit 2816 from below. A portion of a foam core double-sided adhesive tape 2807 is used at the base or bottom of bracket 2801 to temporarily fasten the bracket to an inner construction panel 2804.

Base flanges 2802 and 2803 serve as targets or guides for self tapping screws 2805 and 2606 respectively. Screws 2805 and 2806 are fastened through base flange 2805 and 2606 either perpendicular 2805 or at an angle 2806 (for ease of installer fastening) and penetrate inner construction panel 2804 to anchor bracket 2801.

Top extension sill 2810 and bottom soffit 2816 are fastened to bracket 2801. The majority of the length of extension sill 2810 and bottom soffit 2816 will not be fastened to bracket 2801, as brackets are generally spaced 16 inches or more apart, both vertically and horizontally. Therefore, extension sill 2810 and soffit 2816 span between bracket 2801 and other brackets (not shown) arrayed on either side of bracket 2801. All are aligned and fastened below window sill 2808 and above the window head 2835 below. A pan flashing 2840 on window sill 2808 terminates below the sill 2842 over caulked counter-pan flashing 2844. A head flashing 2846 is applied to the surface of inner construction panel 2804, and extended around window or doorhead 2835 to divert water.

Before a construction panel 2828 is fastened to bracket 2801 to enclose module 2800, a dense foam 2820 is sprayed inside the bracket and then against inner construction panel 2804. Extension sill 2810 and soffit 2816, form barriers that contain the insulating foam 2820 inside module 2800 as it is sprayed against inner construction panel 2804. Extension sill 2010 and soffit 2816 are embedded and rigidly connected to the dense foam in the process, (not shown). Where the sill and soffit extend In between the brackets the foam touches the sill and the soffit directly.

Additional spacing between the top sill and bottom soffit can be formed by using additional brackets like 2801, or by fastening any variety of thickness blocks to the bottom 2832 or to the top side of bracket 2801 (not shown) in a similar way as a block 2822 is shown fixed to the outer planer face 2824 of the bracket to widen the module, including the outer construction panel 2828.

Extension sill 2810 is installed ⅜ to ½ inch below window sill 2808 as the bottom soffit 2816 is installed ⅜ to ½ inch above window head 2835 to provide room for the application of waterproof caulking. 2831 and 2834 Self-tapping screws 2814, 2818, 2826, 2830, and 2833 are to fasten together various components as shown in FIG. 39.

Figure 40:
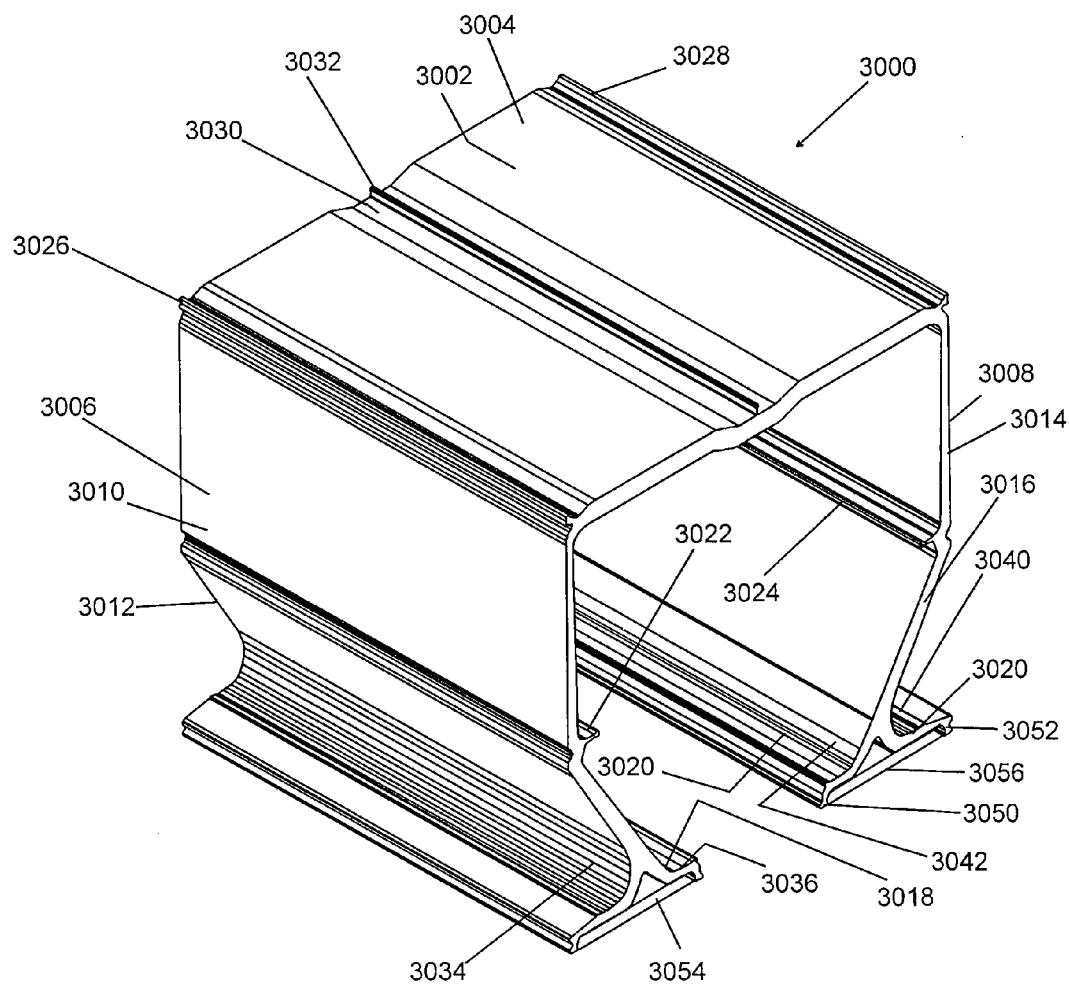
FIG. 40 is a first perspective view of another embodiment of a bracket useful in a building module according to the present disclosure.
Figure 41:
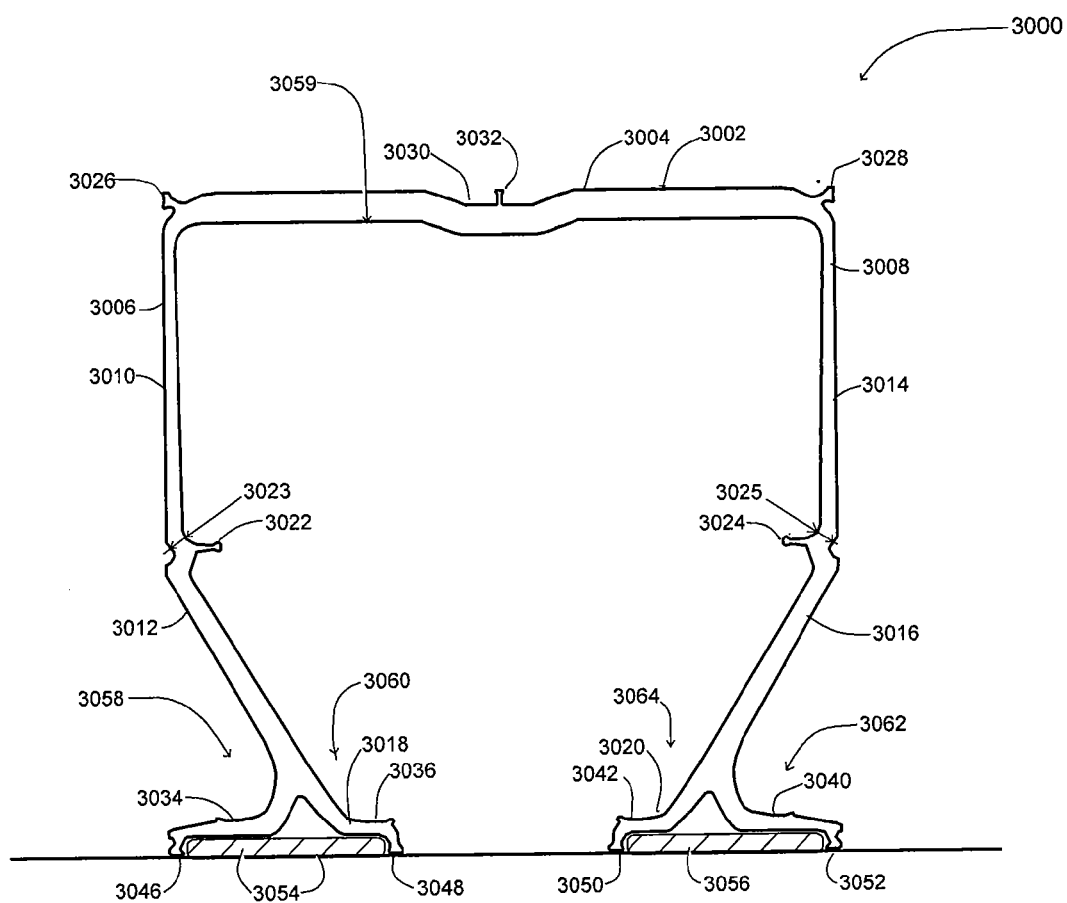
FIG. 41 is a cross-section view of the bracket shown in FIG. 40.

Another bracket useful in the building module of the present disclosure is depicted in FIGS. 40 and 41 and generally referenced by the numeral 3000. Bracket 3000 is constructed entirely of a metal, such as aluminum or stainless steel, or other rigid material, and is preferably formed by extrusion or casting.

Bracket 3000 has a platform 3002 that bears a planar surface 3004. Bracket 3000 has two sides 3006 and 3008 appending from platform 3002 and extending away from planar surface 3004. Sides 3006 and 3008 define proximal portions 3010 and 3014 and inwardly directed distal portions 3012 and 3016 along their respective lengths thereof. Sides 3006 and 3008 further define inwardly directed projections 3022 and 3024 proximal to the interfaces of proximal portions 3010 and 3014 and distal portions 3012 and 3016, respectively. Projections 3012 and 3016 provide convenient interfaces through which screws or other fasteners can be driven through sides 3006 and 3008 into adjacent brackets (not shown) or side panels (not shown) and is particularly useful surrounding windows and doors (not shown). Sides 3006 and 3008 further define articulated base flanges 3018 and 3020 at their distal ends.

Bracket 3000 has anchor portions 3026 and 3028 located in proximity to the intersections or interfaces of platform 3002 and sides 3006 and 3008 and run continuously along the width of platform 3002. Anchor portions 3026 and 3028 provide convenient anchoring positions for the angled ends of retractable tape measures (not shown in FIGS. 31 and 32), which are commonly used in construction applications in determining proper spacing between brackets. Embodiments of brackets showing the interaction of angled ends of retractable tape measures are shown and described below for FIGS. 35 and 36. Anchor portions 3026 and 3028 also provide locations for receiving snap fittings for a shield (not shown). A different embodiment of a bracket with a shield is shown in FIGS. 30 and 31.

Platform 3002 has a recess 3030 extending therein and therealong its width at its center axis. Recess 3030 has a raised knob 3032 extending perpendicularly therefrom with respect to planar surface 3004 along the length of recess 3030. Knob 3032 is useful for measuring to or from the center of bracket 3000 and for positioning outer construction panels or joints thereof (not shown) adjacent to platform 3002. Knob 3032 provides an anchor for caulking and adhesives at joints between outer construction panels commonly positioned at the center of platform 3002.

Base flange 3018 defines an outer portion 3034 and an inner portion 3036. Base flange 3018 further defines a plurality of knob portions 3046 and 3048, respectively, that extend thereunder and therealong the length of bracket 3000. Knob portions 3046 and 3048 provide thermal breaks and spacing between base flange 3018 and any adjacent substrate (not shown).

Base flange 3020 defines an outer portion 3040 and an inner portion 3042. Outer portion 3040 defines a detachable portion 3042, which may be optionally detached via hand by a user. Base flange 3020 further defines a plurality of knob portions 3050 and 3052, respectively, that extend thereunder and therealong the length of bracket 3000. Knob portions 3050 and 3052 provide thermal breaks and spacing between base flange 3020 and any adjacent structural substrate (not shown).

Additionally, double-sided adhesive foam tapes 3054 and 3056 may be permanently affixed to the bottoms of base flange 3018 and 3020 between knob portions. Foam tapes 3054 and 3056 provide temporary adhesion to the substrate. Self tapping screws or other fasteners (not shown) can be driven through multiple interfaces in base flanges 3018 and 3020 to permanently fasten bracket 3000 to substrates such as new or existing masonry surfaces or metal or wood construction panels. The interface chosen may depend upon which is the easiest to reach with a screw-driving gun or whichever affords the best angle of screw or fastener penetration into the substrate. Embodiments showing fastening of brackets to substrates by screws are seen in FIG. 35 through FIG. 39. The type and number of screws or other fasteners employed may be determined by applying fastener strength data to both the composition of the structural substrate to which the bracket is affixed as well as to wind load structural requirements for the location of the building.

Base flange 3018 defines an outer arcuate well 3058 and an inner arcuate well 3060. Outer arcuate well 3058 is bounded by and formed by the confluence of distal portion 3012 of side 3006 and outer portion 3034. Inner arcuate well 3060 is bounded by and formed by the confluence of distal portion 3012 of side 3006 and inner portion 3036. Base flange 3020 defines an outer arcuate well 3062 and an inner arcuate well 3064. Outer arcuate well 3062 is bounded by and formed by the confluence of distal portion 3016 of side 3008 and outer portion 3040. Inner arcuate well 3064 is bounded by and formed by the confluence of distal portion 3016 of side 3008 and inner portion 3042.

As disclosed herein, the various embodiments of modules are inclusive of those that are pre-manufactured in their entirety as well as those constructed using at least in part pre-existing components and materials from pre-existing buildings. For instance, brackets can be affixed to exterior construction panels/siding or surfaces of existing buildings.

The disclosure of U.S. Ser. No. 13/026,020, filed Feb. 11, 2011, is incorporated herein in its entirety.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances which fall within the scope of the appended claims.

What is claimed is:
1. A bracket, comprising:
a platform bearing a top surface that is substantially planar over the entirety of the top surface and
two sides appending from the platform away from the top surface, wherein each of the two sides defines a proximal portion and a distal portion therealong wherein the distal portion is contiguous with and appends from the proximal portion, wherein each of the proximal portions appends from the platform in the same direction,
wherein the bracket is generally U-shaped,
wherein the two sides each define a base flange at the end of their respective distal portion, wherein each of the base flanges extend inwardly and outwardly with respect to the distal portion from which they extend, and wherein each of the base flanges define a first arcuate well inside and a second arcuate well outside of the distal portion from which they extend, wherein each of the base flanges include an inner portion and an outer portion forking from the distal portion, wherein the inner portion and the distal portion define the first arcuate well, wherein the outer portion and the distal portion together define the second arcuate well, wherein the bracket is of unitary structure, wherein the bracket takes the form of a single, discrete piece, and wherein the bracket is of monolithic structure, wherein the distal portion of the first side is inwardly directed at a non-right, obtuse angle toward the distal portion of the second side, wherein the distal portion of the second side is inwardly directed at a non-right, obtuse angle toward the distal portion of the first side.

2. The bracket of claim 1, further comprising a shield having a substantially planar bottom surface, wherein the shield is detachably fitted to the platform at the top surface thereof and substantially covers the top surface thereof, wherein the shield has a substantially planar bottom surface that is substantially coextensive in shape with the top surface of the platform.

3. The bracket of claim 1, wherein the each of the base flanges has a bottom surface directed away from the platform, wherein each of the bottom surfaces has double-sided adhesive foam tape adhered thereto.

4. The bracket of claim 1, wherein each of the base flanges define a knob portion extending from a bottom of each of the inner portion and the outer portion.

5. The bracket of claim 1, wherein the distal portions of the two sides are inwardly directed toward each other.

6. The bracket of claim 1, wherein the top surface of the platform has a surface area of about 9 square inches to about 25 square inches.

7. A bracket, comprising:
a platform bearing a top surface that is substantially planar over the entirety of the top surface and
first and second sides appending from the platform away from the top surface,
wherein each of the first and second sides defines a proximal portion and a distal portion therealong wherein the distal portion is contiguous with and appends from the proximal portion, wherein each of the proximal portions appends from the platform in the same direction, wherein the distal portion of the first side is inwardly directed at a non-right, obtuse angle toward the distal portion of the second side, wherein the distal portion of the second side is inwardly directed at a non-right, obtuse angle toward the distal portion of the first side, wherein the two sides each define a base flange at the end of their respective distal portion, wherein each of the base flanges extend inwardly and outwardly with respect to the distal portion from which they extend, and wherein each of the base flanges define a first arcuate well inside and a second arcuate well outside of the distal portion from which they extend, wherein each of the base flanges include an inner portion and an outer portion forking from the distal portion, wherein the inner portion and the distal portion define the first arcuate well, wherein the outer portion and the distal portion together define the second arcuate well, wherein the bracket is of unitary structure, wherein the bracket takes the form of a single, discrete piece and wherein the bracket is of monolithic structure.

8. The bracket of claim 7, wherein each proximal portion is parallel to the other proximal portion.

9. The bracket of claim 7, wherein each of the base flanges define a knob portion extending from a bottom of each of the inner portion and the outer portion.

10. The bracket of claim 7, wherein the top surface of the platform has a surface area of about 9 square inches to about 25 square inches.

* * * * *